United States Patent
Kim

(10) Patent No.: US 12,133,125 B2
(45) Date of Patent: Oct. 29, 2024

(54) METHOD AND APPARATUS FOR PERFORMING MIMO OPERATION ON A SET OF CELLS BASED ON LAYER 2 MOBILITY IN MOBILE WIRELESS COMMUNICATION SYSTEM

(71) Applicants: BLACKPIN INC., Seoul (KR); Soenghun Kim, Hanam-si (KR); SIGNALIS CO., LTD., Daejeon (KR)

(72) Inventor: Soenghun Kim, Hanam-si (KR)

(73) Assignees: BLACKPIN Inc., Seoul (KR); Soenghun Kim, Hanam-si (KR); SIGNALIS CO., LTD., Daejeon (KR)

( * ) Notice: Subject to any disclaimer, the term of this patent is extended or adjusted under 35 U.S.C. 154(b) by 0 days.

(21) Appl. No.: 18/613,153

(22) Filed: Mar. 22, 2024

(65) Prior Publication Data

US 2024/0236781 A1 Jul. 11, 2024

Related U.S. Application Data

(63) Continuation of application No. 18/217,988, filed on Jul. 3, 2023.

(30) Foreign Application Priority Data

Jul. 4, 2022 (KR) .......................... 10-2022-0081874

(51) Int. Cl.
H04W 36/00 (2009.01)
H04W 36/08 (2009.01)

(52) U.S. Cl.
CPC ....... *H04W 36/0072* (2013.01); *H04W 36/08* (2013.01)

(58) Field of Classification Search
CPC .......... H04W 36/005; H04W 36/0072; H04W 36/0069; H04W 36/08; H04W 36/32;
(Continued)

(56) References Cited

U.S. PATENT DOCUMENTS

2022/0329364 A1* 10/2022 Lee .................. H04L 1/1861
2023/0217458 A1* 7/2023 Bang ................ H04J 11/00
370/329

OTHER PUBLICATIONS

Vivo, "Discussion on L1 L2-Centric Inter-Cell Mobility," 3GPP TSG-RAN WG2 Meeting #114-e Electronic, R2-2104908, May 19-27, 2021.
(Continued)

*Primary Examiner* — Chi H Pham
*Assistant Examiner* — Ji-Hae Yea
(74) *Attorney, Agent, or Firm* — PnK IP LLC

(57) ABSTRACT

A method performed by a wireless device may comprise: receiving, from a base station, at least one Radio Resource Control (RRC) message, wherein the at least one RRC message comprises: first configuration information indicating a Transmission Configuration Index (TCI) state list of a first cell; and second configuration information indicating a TCI state list of a second cell; receiving, from the base station and via the second cell, a first Medium Access Control (MAC) Control Element (CE), wherein the first MAC CE comprises an identifier associated with the first configuration information and associated with a first TCI state identifier, and wherein the first TCI state identifier indicates a first TCI state of the TCI state list of the first cell; monitoring, based on the first MAC CE and based on the first TCI state, Physical Downlink Control Channel (PDCCH) associated with the first cell; receiving, from the base station and via the first cell, a second MAC CE, wherein the second MAC CE comprises an identifier associated with the second configuration information and associated with a second TCI state identifier, and wherein the second TCI state identifier indicates a second TCI state of the TCI state list of the second cell; and monitoring, based on the second MAC CE and based on the second TCI state, PDCCH associated with the second cell.

17 Claims, 11 Drawing Sheets

(58) Field of Classification Search
CPC ........... H04W 36/38; H04W 36/00692; H04W 36/00695; H04W 36/00698; H04W 36/00725; H04W 36/083; H04W 36/085; H04W 36/087; H04W 36/13; H04W 36/249; H04W 36/322; H04W 36/324; H04W 36/326; H04W 36/328
See application file for complete search history.

(56) References Cited

OTHER PUBLICATIONS

Nokia et al., "Multi-cell support for multi-TRP and L1 mobility," 3GPP TSG-RAN WG2 Meeting #114 Electronic, Elbonia, R2-2104988, May 19-27, 2021.
Intel Corporation, "Further aspects on L1/L2-Centric Inter-Cell Mobility,"3GPP TSG-RAN WG2 Meeting #114-e Electronic meeting, R2-2105026, May 19-27, 2021.
Intel Corporation, "Enhanced MAC CE for PDCCH in multi-TRP deployment,"3GPP TSG-RAN WG2 Meeting #114-e Electronic meeting, R2-2105027, May 19-27, 2021.
OPPO, "Discussion on L1/2 centric mobility," 3GPP TSG-RAN WG2 Meeting #112-3, 113-bis-E-meeting, R2-2105033, Apr. 12-20, 2021.
Apple, "L1/L2-centric inter-cell mobility," 3GPP TSG-RAN WG2 Meeting #114 bis Electronic, E-meeting, R2-2105103, May 19-27, 2021.
MediaTek Inc., "Procedures of L1/L2-Centric Inter-Cell Mobility," 3GPP TSG-RAN WG2 Meeting #114 Electronic, Online, R2-2105294, May 19-27, 2021.
OPPO, "Discussion on RAN2 specification impacts of TRP-based BFR," 3GPP TSG-RAN WG2 Meeting #114 Electronic, Online, R2-2105341, May 2021.
Qualcomm Incorporated, "L1/L2 Mobility Overview," 3GPP TSG-RAN WG2 Meeting #114-e Electronic, R2-2105354, May 19-27, 2021.
Qualcomm Incorporated, "Responses to RAN1 Ls for L1/L2 Mobility," 3GPP TSG-RAN WG2 Meeting #114-e Electronic, R2-2105355, May 19-27, 2021.
CATT, "On Scenarios for L1/L2 mobility for FeMIMO," 3GPP TSG-RAN WG2 Meeting #114 Electronic, Online, R2-2105621, May 19-27, 2021.
CATT, "Discussions on L1/L2 mobility for FeMIMO without serving cell change,"3GPP TSG-RAN WG2 Meeting #114 Electronic, Online, R2-2105622, May 19-27, 2021.
Xiaomi Communications, "Enhanced TCI State Indication for UE-specific PDCCH MAC CE," 3GPP TSG-RAN WG2 Meeting #114 Electronic, E-Meeting, R2-2105731, May 19-27, 2021.
Lenovo et al., "Discussion on the support of inter-cell multi-TRP operation," 3GPP TSG-RAN WG2 Meeting #114 Electronic, e-Meeting, R2-2105826, May 19-27, 2021.
Lenovo et al., "Discussion on the support of L1/L2 centric inter-cell mobility," 3GPP TSG-RAN WG2 Meeting #114 Electronic, e-Meeting, R2-2105827, May 19-27, 2021.
ZTE Corporation et al., "Consideration on L1/L2 centric mobility," 3GPP TSG-RAN WG2 Meeting #114 Electronic, e-Meeting, R2-2105857, May 19-27, 2021.
ZTE Corporation et al., "MAC CE enhancement to support two TCI states for PDCCH," 3GPP TSG-RAN WG2 Meeting #114 Electronic, R2-2105858, May 19-27, 2021.
Nokia et al., "Beam failure with mTRP,"3GPP TSG-RAN WG2 Meeting #114 Electronic, Elbonia, R2-2105870, May 19-27, 2021.
Ericsson, "On the LS about Activating two TCI states with a MAC CE," 3GPP TSG-RAN WG2 Meeting #114 Electronic, Electronic Meeting, R2-2105907, May 19-28, 2021.
Huawei et al., "L1/L2 centric-mobility: Multi-TRP," 3GPP TSG-RAN WG2 Meeting #114-e Electronic, R2-2105991, May 19-27, 2021.
Huawei et al., "Handover-like mechanism for L1/L2-centric inter-cell mobility,"3GPP TSG-RAN WG2 Meeting #114-e Electronic, R2-2105992, May 19-27, 2021.
Ericsson, "On L1/L2 centric inter-cell mobility," 3GPP TSG-RAN WG2 Meeting #114-e Electronic meeting, R2-2105999, May 19-27, 2021.
LG Electronics Inc., "Potential RAN2 work for feMIMO," 3GPP TSG-RAN WG2 Meeting #114 Electronic meeting, R2-2106295, May 19-27, 2021.
Samsung, "Summary of email discussion [Post113bis-e][061][feMIMO] InterCell mTRP and L1L2 mobility (Samsung)," 3GPP TSG-RAN WG2 Meeting #114 Electronic, Online, R2-2106314, May 19-27, 2021.
Samsung, "LS Reply on TCI State Update for L1/L2-Centric Inter-Cell Mobility," 3GPP TSG-RAN WG2 Meeting #114 Electronic, Online, R2-2106315, May 19-27, 2021.
Samsung, "[AT 114-e][036][feMIMO] InterCell mTRP and L1/L2 mobility (Samsung)," 3GPP TSG-RAN WG2 Meeting #114-e Electronic, Electronic Meeting, R2-2106664, May 19-27, 2021.
Samsung, "LS Reply on TCI State Update for L1/L2-Centric Inter-Cell Mobility," 3GPP TSG-RAN WG2 Meeting #114 Electronic, Online, R2-2106768, May 19-27, 2021.
3GPP TS 38.300 V17.0.0 (Mar. 2022); Technical Specification; 3rd Generation Partnership Project; Technical Specification Group Radio Access Network; NR; NR and NG-RAN Overall Description; Stage 2(Release 17).
3GPP TS 38.321 V17.0.0 (Mar. 2022); Technical Specification; 3rd Generation Partnership Project; Technical Specification Group Radio Access Network; NR; Medium Access Control (MAC) protocol specification (Release 17).
3GPP TS 38.331 V17.0.0 (Mar. 2022); Technical Specification; 3rd Generation Partnership Project; Technical Specification Group Radio Access Network; NR; Radio Resource Control (RRC) protocol specification (Release 17).
3GPP TS 38.211 V17.2.0 (Jun. 2022); Technical Specification; 3rd Generation Partnership Project; Technical Specification Group Radio Access Network; NR; Physical channels and modulation (Release 17).
3GPP TS 38.212 V17.2.0 (Jun. 2022); Technical Specification; 3rd Generation Partnership Project; Technical Specification Group Radio Access Network; NR; Multiplexing and channel coding (Release 17).
3GPP TS 38.213 V17.2.0 (Jun. 2022); Technical Specification; 3rd Generation Partnership Project; Technical Specification Group Radio Access Network; NR; Physical layer procedures for control (Release 17).
3GPP TS 38.214 V17.2.0 (Jun. 2022); Technical Specification; 3rd Generation Partnership Project; Technical Specification Group Radio Access Network; NR; Physical layer procedures for data (Release 17).
3GPP TS 38.413 V17.1.1 (Jun. 2022); Technical Specification; 3rd Generation Partnership Project; Technical Specification Group Radio Access Network; NG-RAN; NG Application Protocol (NGAP) (Release 17).
3GPP TS 38.423 V17.1.0 (Jun. 2022); Technical Specification; 3rd Generation Partnership Project; Technical Specification Group Radio Access Network; NG-RAN; Xn application protocol (XnAP) (Release 17).
3GPP TS 38.473 V17.1.0 (Jun. 2022); Technical Specification; 3rd Generation Partnership Project; Technical Specification Group Radio Access Network; NG-RAN; F1 application protocol (F1AP) (Release 17).

* cited by examiner

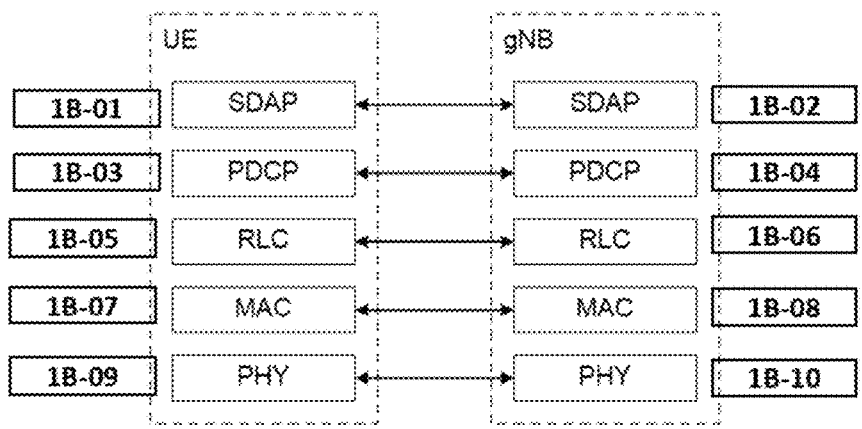
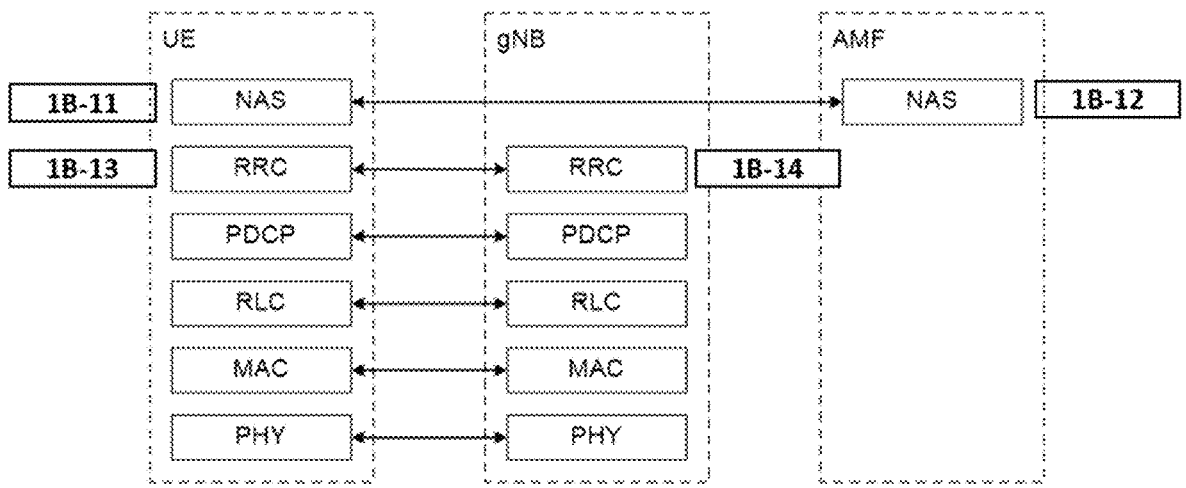
FIG. 1B

3A-05 receiving a first RRCReconfiguration in a third cell. The first RRCReconfiguration includes a first configuration and a third configuration.

3A-10 receiving a second RRCReconfiguration in the first cell. The second RRCReconfiguration includes a second configuration.

3A-15 performing L2 mobility operation between the first cell and a second cell based on a received MAC CE and the first configuration and the second configuration and the third configuration.

switching from the second cell to the first cell at the first point of time if UE receives a first MAC CE at a third point of time.
switching from the first cell to the second cell at the second point of time if UE receives a second MAC CE at a third point of time.

FIG. 3A

3B-05 transmitting a first RRCReconfiguration to a UE in a third cell

3B-10 transmitting a second RRCReconfiguration to a UE in a first cell

3B-15 performing with UE L2 mobility operation between the first cell and the second cell based on a transmitted MAC CE and the first configuration and the second configuration and the third configuration.
switching UE from the second cell to the first cell at the first point of time if GNB transmits a first MAC CE at a third point of time.
switching UE from the first cell to the second cell at the second point of time if GNB transmits a second MAC CE at a third point of time.

FIG. 3B

METHOD AND APPARATUS FOR PERFORMING MIMO OPERATION ON A SET OF CELLS BASED ON LAYER 2 MOBILITY IN MOBILE WIRELESS COMMUNICATION SYSTEM

CROSS-REFERENCE TO RELATED APPLICATION

This application is a continuation of U.S. patent application Ser. No. 18/217,988, filed on Jul. 3, 2023, which claims priority to and the benefit of Korean Patent Application Nos. 10-2022-0081874, filed on Jul. 4, 2022, the disclosure of which is incorporated herein by reference in their entireties.

BACKGROUND

Technical Field

The present disclosure relates to wireless communication.

Discussion of the Background

To meet the increasing demand for wireless data traffic since the commercialization of 4th generation (4G communication systems), the 5th generation (5G system) is being developed. 5G system introduced millimeter wave (mmW) frequency bands (e.g., 60 GHz bands). In order to increase the propagation distance by mitigating propagation loss in the 5G communication system, various techniques have been introduced such as beamforming, massive multiple-input multiple output (MIMO), full dimensional MIMO (FD-MIMO), array antenna, analog beamforming, and large-scale antenna. In addition, base station is divided into a central unit and a plurality of distribute units for better scalability. To facilitate deployment of various services, 5G communication system targets supporting higher data rate and smaller latency.

When the UE moves from the coverage area of one cell to another cell, at some point a serving cell change needs to be performed. Some serving cell change is triggered by Layer-3 (L3) measurements and is performed by Radio Resource Control (RRC) signalling-triggered reconfiguration with synchronization (Synch) for change of a primary cell (PCell) and/or a primary secondary cell (PSCell), as well as release and addition of secondary cells (SCells) when applicable. All cases such serving cell change involves complete Layer-2 (L2) (and/or Layer-1 (L1)) resets, thereby involving more latency, more overhead, and more interruption time (e.g., than those of beam switch mobility).

To meet the strict service requirements for the future mobile communication system, new mobility mechanism with less interruption time may be required.

SUMMARY

A method performed by a wireless device may comprise: receiving, from a base station, at least one Radio Resource Control (RRC) message, wherein the at least one RRC message comprises: first configuration information indicating a Transmission Configuration Index (TCI) state list of a first cell; and second configuration information indicating a TCJ state list of a second cell; receiving, from the base station and via the second cell, a first Medium Access Control (MAC) Control Element (CE), wherein the first MAC CE comprises an identifier associated with the first configuration information and associated with a first TCJ state identifier, and wherein the first TCJ state identifier indicates a first TCJ state of the TCJ state list of the first cell; monitoring, based on the first MAC CE and based on the first TCJ state, Physical Downlink Control Channel (PDCCH) associated with the first cell; receiving, from the base station and via the first cell, a second MAC CE, wherein the second MAC CE comprises an identifier associated with the second configuration information and associated with a second TCJ state identifier, and wherein the second TCJ state identifier indicates a second TCJ state of the TCJ state list of the second cell; and monitoring, based on the second MAC CE and based on the second TCJ state, PDCCH associated with the second cell.

A method performed by a wireless device may comprise: receiving, from a base station, at least one Radio Resource Control (RRC) message, wherein the at least one RRC message comprises: first configuration information associated with at least one first cell; and second configuration information associated with at least one second cell; and while the first configuration information and the second configuration information are configured for the wireless device: performing, based on the second configuration information, wireless communication via at least one cell of the at least one second cell; after performing the wireless communication via at least one cell of the at least one second cell, receiving a first Medium Access Control (MAC) Control Element (CE), wherein the first MAC CE comprises an identifier associated with the first configuration information and associated with a Transmission Configuration Index (TCI) state list of the at least one first cell; and based on the first MAC CE, performing, using at least one TCJ state of the TCJ state list of the at least one first cell, wireless communication via at least one cell of the at least one first cell.

The wireless device may comprise one or more controllers (e.g., processors), a wireless transceiver, and a memory storing programs and/or instructions that, when executed by the one or more controllers, cause the wireless device to perform the methods and/or operations described herein, and additional operations. A computer-readable medium (e.g., a non-transitory computer-readable medium) may store the programs and/or the instructions. The wireless device may include additional elements and/or may implement features and/or functions described herein. The wireless device may be configured to communicate with one or more base stations and/or other devices. A base station may comprise one or more controllers (e.g., processors), a wireless transceiver, and a memory storing programs and/or instructions that, when executed by the one or more controllers, cause the base station to perform steps complementary to the steps performed by the wireless device. A system may comprise the base station and the wireless device.

BRIEF DESCRIPTION OF THE DRAWINGS

FIG. 1B is a diagram illustrating an example wireless protocol architecture in a wireless system.

FIG. 3A is a flow diagram illustrating an operation of a terminal.

FIG. 3B is a flow diagram illustrating an operation of a base station.

DETAILED DESCRIPTION

Figure 1A:
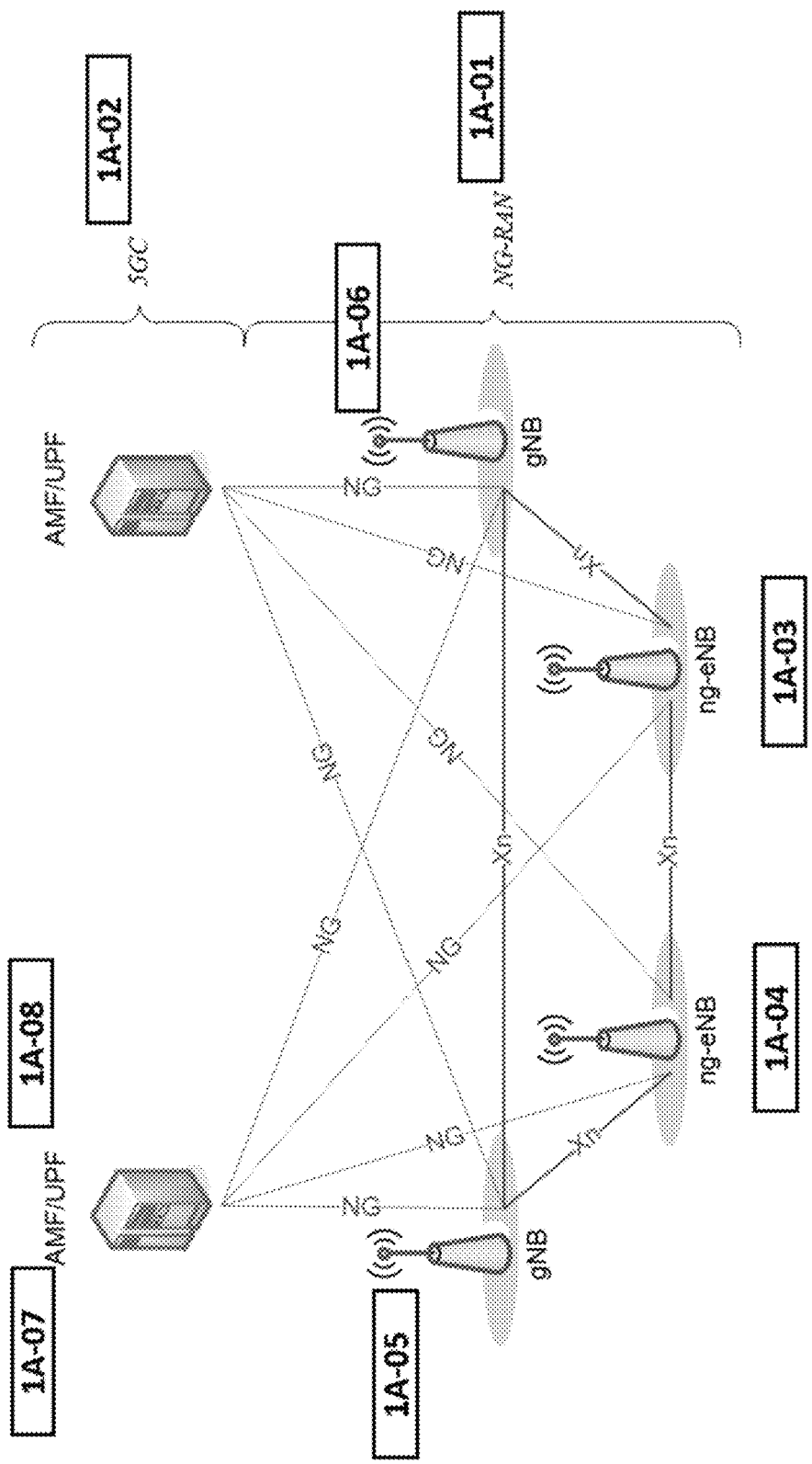
FIG. 1A is a diagram illustrating an example architecture of a wireless communication system.

Hereinafter, various example of the present disclosure will be described in detail with reference to the accompanying drawings. In addition, in the description of the present disclosure, if it is determined that a detailed description of a related known function or configuration may unnecessarily obscure the gist of the present disclosure, the detailed description thereof may be omitted. In addition, the terms to be described later are terms defined in consideration of functions in the present disclosure, which may vary according to intentions or customs of users and operators. Therefore, the definition should be made based on the content throughout this specification.

The terms used, in the following description, for indicating access nodes, network entities, messages, interfaces between network entities, and diverse identity information is provided for convenience of explanation. Accordingly, the terms used in the following description are not limited to specific meanings but may be replaced by other terms equivalent in technical meanings.

In the following descriptions, the terms and definitions given in the latest 3GPP standards (e.g., including 3GPP TR38.331) are used for convenience of explanation. However, aspects of the present disclosure are not limited by use of these terms and definitions and other arbitrary terms and definitions may be employed instead.

Table 1 lists the acronyms used throughout the present disclosure,

TABLE 1

| Acronym | Full name | Acronym | Full name |
|---|---|---|---|
| 5GC | 5G Core Network | RACH | Random Access Channel |
| ACK | Acknowledgement | RAN | Radio Access Network |
| AM | Acknowledged Mode | RA-RNTI | Random Access RNTI |
| AMF | Access and Mobility Management Function | RAT | Radio Access Technology |
| ARQ | Automatic Repeat Request | RB | Radio Bearer |
| AS | Access Stratum | RLC | Radio Link Control |
| ASN.1 | Abstract Syntax Notation One | RNA | RAN-based Notification Area |
| BSR | Buffer Status Report | RNAU | RAN-based Notification Area Update |
| BWP | Bandwidth Part | RNTI | Radio Network Temporary Identifier |
| CA | Carrier Aggregation | RRC | Radio Resource Control |
| CAG | Closed Access Group | RRM | Radio Resource Management |
| CG | Cell Group | RSRP | Reference Signal Received Power |
| C-RNTI | Cell RNTI | RSRQ | Reference Signal Received Quality |
| CSI | Channel State Information | RSSI | Received Signal Strength Indicator |
| DCI | Downlink Control Information | SCell | Secondary Cell |
| DRB | (user) Data Radio Bearer | SCS | Subcarrier Spacing |
| DRX | Discontinuous Reception | SDAP | Service Data Adaptation Protocol |
| HARQ | Hybrid Automatic Repeat Request | SDU | Service Data Unit |
| IE | Information element | SFN | System Frame Number |
| LCG | Logical Channel Group | S-GW | Serving Gateway |
| MAC | Medium Access Control | SI | System Information |
| MIB | Master Information Block | SIB | System Information Block |
| NAS | Non-Access Stratum | SpCell | Special Cell (e.g., a primary cell of a master or secondary cell group) |
| NG-RAN | New Generation Radio Access Network | SRB | Signalling Radio Bearer |
| NR | New Radio Radio Access | SRS | Sounding Reference Signal |
| PBR | Prioritised Bit Rate | SSB | SS/PBCH block |
| PCell | Primary Cell | SSS | Secondary Synchronisation Signal |
| PCI | Physical Cell Identifier | SUL | Supplementary Uplink |
| PDCCH | Physical Downlink Control Channel | TM | Transparent Mode |
| PDCP | Packet Data Convergence Protocol | UCI | Uplink Control Information |
| PDSCH | Physical Downlink Shared Channel | UE | User Equipment |
| PDU | Protocol Data Unit | UM | Unacknowledged Mode |
| PHR | Power Headroom Report | CRP | Cell Reselection Priority |
| PLMN | Public Land Mobile Network | PRS | Positioning Reference Signal |
| PRACH | Physical Random Access Channel | CS-RNTI | Configured Scheduling-RNTI |
| PRB | Physical Resource Block | TAG | Timing Advance Group |

TABLE 1-continued

| Acronym | Full name | Acronym | Full name |
|---|---|---|---|
| PSS | Primary Synchronisation Signal | SDT | Small Data Transmission |
| PUCCH | Physical Uplink Control Channel | RA-SDT | Random Access-SDT |
| PUSCH | Physical Uplink Shared Channel | CG-SDT | Configured Grant-SDT |

Table 2 lists the terminologies and their definition used throughout the present disclosure.

TABLE 2

| Terminology | Definition |
|---|---|
| allowedCG-List | List of configured grants for the corresponding logical channel. This restriction applies only when the UL grant is a configured grant. If present, UL MAC SDUs from this logical channel can only be mapped to the indicated configured grant configuration. If the size of the sequence is zero, then UL MAC SDUs from this logical channel cannot be mapped to any configured grant configurations. If the field is not present, UL MAC SDUs from this logical channel can be mapped to any configured grant configurations. |
| allowedSCS-List | List of allowed sub-carrier spacings for the corresponding logical channel. If present, UL MAC SDUs from this logical channel can only be mapped to the indicated numerology. Otherwise, UL MAC SDUs from this logical channel can be mapped to any configured numerology. |
| allowedServingCells | List of allowed serving cells for the corresponding logical channel. If present, UL MAC SDUs from this logical channel can only be mapped to the serving cells indicated in this list. Otherwise, UL MAC SDUs from this logical channel can be mapped to any configured serving cell of this cell group. |
| Carrier frequency | center frequency of the cell. |
| Cell | combination of downlink and optionally uplink resources. The linking between the carrier frequency of the downlink resources and the carrier frequency of the uplink resources is indicated in the system information transmitted on the downlink resources. |
| Cell Group | A group of serving cells. For example, in dual connectivity, a group of serving cells associated with either the MeNB or the SeNB. |
| Cell reselection | A process to find a better suitable cell than the current serving cell based on the system information received in the current serving cell |
| Cell selection | A process to find a suitable cell either blindly or based on the stored information |
| Dedicated signalling | Signalling sent on DCCH logical channel between the network and a single UE. |
| discardTimer | Timer to control the discard of a PDCP SDU. Starting when the SDU arrives. Upon expiry, the SDU is discarded. |
| F | The Format field in MAC subheader indicates the size of the Length field. |
| Field | The individual contents of an information element are referred to as fields. |
| Frequency layer | set of cells with the same carrier frequency. |
| Global cell identity | An identity to uniquely identifying a cell (e.g., an NR cell). It is consisted of cellIdentity and plmn-Identity of the first PLMN-Identity in plmn-IdentityList in SIB1. |
| gNB | node providing user plane (e.g., NR user plane) and control plane protocol terminations towards a UE, and connected via the NG interface to the 5GC. |
| Handover | procedure that changes the serving cell of a UE (e.g., in RRC_CONNECTED). |
| Information element | A structural element containing single or multiple fields is referred as information element. |
| L | The Length field in MAC subheader indicates the length of the corresponding MAC SDU or of the corresponding MAC CE |
| LCID | 6 bit logical channel identity in MAC subheader to denote which logical channel traffic or which MAC CE is included in the MAC subPDU |
| MAC-I | Message Authentication Code - Integrity. 16 bit or 32 bit bit string calculated by NR Integrity Algorithm based on the security key and various fresh inputs |
| Logical channel | a logical path between a RLC entity and a MAC entity. There are multiple logical channel types depending on what type of information is transferred e.g. CCCH (Common Control Channel), DCCH (Dedicate Control Channel), DTCH (Dedicate Traffic Channel), PCCH (Paging Control Channel) |
| LogicalChannelConfig | The IE LogicalChannelConfig is used to configure the logical channel parameters. It includes priority, prioritisedBitRate, allowedServingCells, allowedSCS-List, maxPUSCH-Duration, logicalChannelGroup, allowedCG-List, etc. |
| logicalChannelGroup | ID of the logical channel group, as specified in TS 38.321, which the logical channel belongs to |
| MAC CE | Control Element generated by a MAC entity. Multiple types of MAC CEs are defined, each of which is indicated by corresponding LCID. A MAC CE and a corresponding MAC sub-header comprises MAC subPDU |
| Master Cell Group | in MR-DC, a group of serving cells associated with the Master Node, comprising the SpCell (PCell) and optionally one or more SCells. |

TABLE 2-continued

| Terminology | Definition |
| --- | --- |
| maxPUSCH-Duration | Restriction on PUSCH-duration for the corresponding logical channel. If present, UL MAC SDUs from this logical channel can only be transmitted using uplink grants that result in a PUSCH duration shorter than or equal to the duration indicated by this field. Otherwise, UL MAC SDUs from this logical channel can be transmitted using an uplink grant resulting in any PUSCH duration. |
| NR | NR radio access |
| PCell | SpCell of a master cell group. |
| PDCP entity reestablishment | The process triggered upon upper layer request. It includes the initialization of state variables, reset of header compression and manipulating of stored PDCP SDUs and PDCP PDUs. The details can be found in 5.1.2 of 38.323 |
| PDCP suspend | The process triggered upon upper layer request. When triggered, transmitting PDCP entity set TX_NEXT to the initial value and discard all stored PDCP PDUs. The receiving entity stop and reset t-Reordering, deliver all stored PDCP SDUs to the upper layer and set RX_NEXT and RX_DELIV to the initial value |
| PDCP-config | The IE PDCP-Config is used to set the configurable PDCP parameters for signalling and data radio bearers. For a data radio bearer, discardTimer, pdcp-SN-Size, header compression parameters, t-Reordering and whether integrity protection is enabled are configured. For a signaling radio bearer, t-Reordering can be configured |
| PLMN ID Check | the process that checks whether a PLMN ID is the RPLMN identity or an EPLMN identity of the UE. |
| Primary Cell | The MCG cell, operating on the primary frequency, in which the UE either performs the initial connection establishment procedure or initiates the connection re-establishment procedure. |
| Primary SCG Cell | For dual connectivity operation, the SCG cell in which the UE performs random access when performing the Reconfiguration with Sync procedure. |
| priority | Logical channel priority, as specified in TS 38.321. an integer between 0 and 7. 0 means the highest priority and 7 means the lowest priority |
| PUCCHSCell | a Secondary Cell configured with PUCCH. |
| Radio Bearer | Logical path between a PDCP entity and upper layer (i.e. SDAP entity or RRC) |
| RLC bearer | RLC and MAC logical channel configuration of a radio bearer in one cell group. |
| RLC bearer configuration | The lower layer part of the radio bearer configuration comprising the RLC and logical channel configurations. |
| RX_DELIV | This state variable indicates the COUNT value of the first PDCP SDU not delivered to the upper layers, but still waited for. |
| RX_NEXT | This state variable indicates the COUNT value of the next PDCP SDU expected to be received. |
| RX_REORD | This state variable indicates the COUNT value following the COUNT value associated with the PDCP Data PDU which triggered t-Reordering. |
| Serving Cell | For a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. |
| SpCell | primary cell of a master or secondary cell group. |
| Special Cell | For Dual Connectivity operation the term Special Cell refers to the PCell of the MCG or the PSCell of the SCG, otherwise the term Special Cell refers to the PCell. |
| SRB | Signalling Radio Bearers (SRBs) are defined as Radio Bearers (RBs) that are used only for the transmission of RRC and NAS messages. |
| SRB0 | SRB0 is for RRC messages using the CCCH logical channel |
| SRB1 | SRB1 is for RRC messages (which may include a piggybacked NAS message) as well as for NAS messages prior to the establishment of SRB2, all using DCCH logical channel; |
| SRB2 | SRB2 is for NAS messages and for RRC messages which include logged measurement information, all using DCCH logical channel. SRB2 has a lower priority than SRB1 and may be configured by the network after AS security activation; |
| SRB3 | SRB3 is for specific RRC messages when UE is in (NG)EN-DC or NR-DC, all using DCCH logical channel |
| SRB4 | SRB4 is for RRC messages which include application layer measurement reporting information, all using DCCH logical channel. |
| Suitable cell | A cell on which a UE may camp. Following criteria apply<br>The cell is part of either the selected PLMN or the registered PLMN or PLMN of the Equivalent PLMN list<br>The cell is not barred<br>The cell is part of at least one TA that is not part of the list of "Forbidden Tracking Areas for Roaming" (TS 22.011 [18]), which belongs to a PLMN that fulfils the first bullet above.<br>The cell selection criterion S is fulfilled (i.e., RSRP and/or RSRQ are better than specific values) |
| t-Reordering | Timer to control the reordering operation of received PDCP packets. Upon expiry, PDCP packets are processed and delivered to the upper layers. |
| TX_NEXT | This state variable indicates the COUNT value of the next PDCP SDU to be transmitted. |
| UE Inactive AS Context | UE Inactive AS Context is stored when the connection is suspended and restored when the connection is resumed. It includes information below.<br>the current KgNB and KRRCint keys, the ROHC state, the stored QoS flow to DRB mapping rules, the C-RNTI used in the source PCell, the cellIdentity and the physical cell identity of the source PCell, the spCellConfigCommon within Reconfiguration WithSync of the NR PSCell (if configured) and all other parameters |

TABLE 2-continued

| Terminology | Definition |
|---|---|
| | configured except for:<br>parameters within ReconfigurationWithSync of the PCell;<br>parameters within ReconfigurationWithSync of the NR PSCell, if configured;<br>parameters within MobilityControlInfoSCG of the E-UTRA PSCell, if configured;<br>servingCellConfigCommonSIB; |

In the present disclosure, "trigger" or "triggered" and "initiate" or "initiated" may be used in the same meaning.

In the present disclosure, "radio bearers allowed for the second resume procedure", "radio bearers for which the second resume procedure is set", and "radio bearers for which the second resume procedure is enabled" may all have the same meaning.

FIG. 1A is a diagram illustrating an example architecture of a wireless communication system (e.g., 2G/3G/4G systems, an 5G system, etc.) and a NG-RAN.

5G system may include NG-RAN 1A-01 and 5GC 1A-02. An NG-RAN node may be either:
- a gNB, providing NR user plane and control plane protocol terminations towards one or more UEs; or
- an ng-eNB, providing E-UTRA user plane and control plane protocol terminations towards one or more UEs.

The gNBs 1A-05 or 1A-06 and ng-eNBs 1A-03 or 1A-04 may be interconnected with each other (e.g., via the Xn interface). The gNBs and ng-eNBs may also be connected via the NG interfaces to the 5GC (e.g., to the AMF (Access and Mobility Management Function) and to the UPF (User Plane Function)). AMF 1A-07 and UPF 1A-08 may be implemented as a physical node or as separate physical nodes.

The gNBs 1A-05 or 1A-06 or the ng-eNBs 1A-03 or 1A-04 may host the functions listed below.
  Functions for Radio Resource Management such as Radio Bearer Control, Radio Admission Control, Connection Mobility Control, Dynamic allocation of resources to UEs in uplink, downlink and sidelink (scheduling); and
  IP and Ethernet header compression, uplink data decompression and encryption of user data stream; and
  Selection of an AMF at UE attachment when no routing to an MME can be determined from the information provided by the UE; and
  Routing of User Plane data towards UPF; and
  Scheduling and transmission of paging messages; and
  Scheduling and transmission of broadcast information (originated from the AMF or O&M); and
  Measurement and measurement reporting configuration for mobility and scheduling; and
  Session Management; and
  QoS Flow management and mapping to data radio bearers; and
  Support of UEs in RRC_INACTIVE state; and
  Radio access network sharing; and
  Tight interworking between NR and E-UTRA; and
  Support of Network Slicing.

The AMF 1A-07 may host the functions such as NAS signaling, NAS signaling security, AS security control, SF selection, Authentication, Mobility management and positioning management.

The UPF 1A-08 may host the functions such as packet routing and forwarding, transport level packet marking in the uplink, QoS handling and the downlink, mobility anchoring for mobility etc.

FIG. 1B is a diagram illustrating an example wireless protocol architecture in a wireless communication system (e.g., 2G/3G/4G systems, an 5G system, etc.).

User plane protocol stack may include SDAP 1B-01 or 1B-02, PDCP 1B-03 or 1B-04, RLC 1B-05 or 1B-06, MAC 1B-07 or 1B-08 and PHY 1B-09 or 1B-10. Control plane protocol stack may include NAS 1B-11 or 1B-12, RRC 1B-13 or 1B-14,PDCP, RLC, MAC and PHY Each protocol sublayer may perform functions related to the operations listed in the table 3.

TABLE 3

| Sublayer | Functions |
|---|---|
| NAS | authentication, mobility management, security control, etc. |
| RRC | System Information, Paging, Establishment, maintenance and release of an RRC connection, Security functions, Establishment, configuration, maintenance and release of Signalling Radio Bearers (SRBs) and Data Radio Bearers (DRBs), Mobility, QoS management, Detection of and recovery from radio link failure, NAS message transfer etc. |
| SDAP | Mapping between a QoS flow and a data radio bearer, Marking QoS flow ID (QFI) in both DL and UL packets. |
| PDCP | Transfer of data, Header compression and decompression, Ciphering and deciphering, Integrity protection and integrity verification, Duplication, Reordering and in-order delivery, Out-of-order delivery etc. |
| RLC | Transfer of upper layer PDUs, Error Correction through ARQ, Segmentation and re-segmentation of RLC SDUs, Reassembly of SDU, RLC re-establishment etc. |
| MAC | Mapping between logical channels and transport channels, Multiplexing/demultiplexing of MAC SDUs belonging to one or different logical channels into/from transport blocks (TB) delivered to/from the physical layer on transport channels, Scheduling information reporting, Priority handling between UEs, Priority handling between logical channels of one UE etc. |
| PHY | Channel coding, Physical-layer hybrid-ARQ processing, Rate matching, Scrambling, Modulation, Layer mapping, Downlink Control Information, Uplink Control Information etc. |

The terminal supports three RRC states. Table 4 lists the characteristics of each state.

TABLE 4

| RRC state | Characteristic |
|---|---|
| RRC_IDLE | PLMN selection; Broadcast of system information; Cell re-selection mobility; Paging for mobile terminated data is initiated by 5GC; DRX for CN paging configured by NAS. |
| RRC_INACTIVE | PLMN selection; Broadcast of system information; Cell re-selection mobility; Paging is initiated by NG-RAN (RAN paging; RAN-based notification area (RNA is managed by NG-RAN; DRX for RAN paging configured by NG-RAN; 5GC - NG-RAN connection (both C/U-planes is established for UE; The UE AS context is stored in NG-RAN and the UE; NG-RAN knows the RNA which the UE belongs to. |

TABLE 4-continued

| RRC state | Characteristic |
| --- | --- |
| RRC_CONNECTED | 5GC - NG-RAN connection (both C/U-planes is established for UE; The UE AS context is stored in NG-RAN and the UE; NG-RAN knows the cell which the UE belongs to; Transfer of unicast data to/from the UE; Network controlled mobility including measurements. |

Figure 1C:
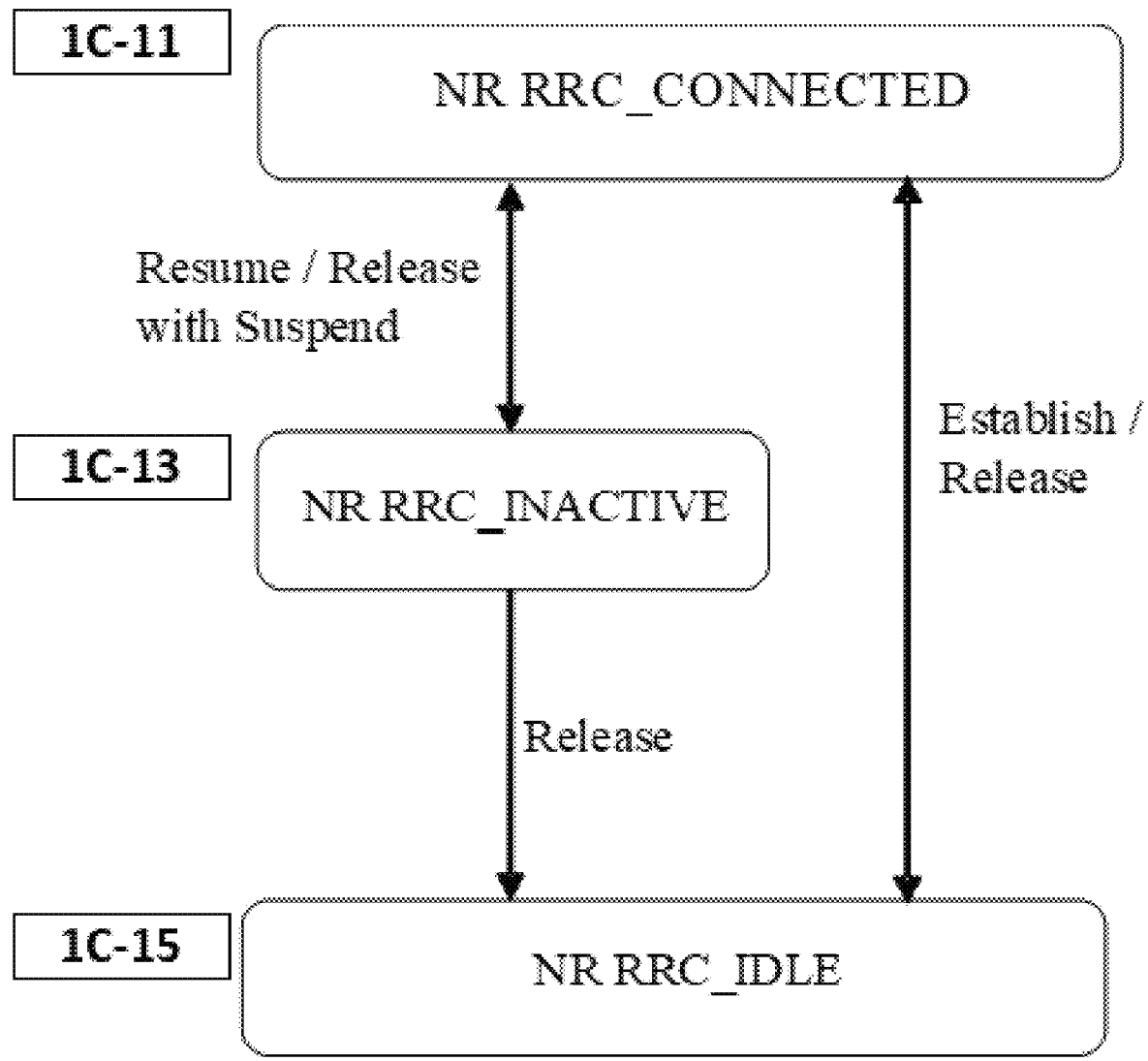
FIG. 1C is a diagram illustrating an example RRC state transition.
Figure 1D:
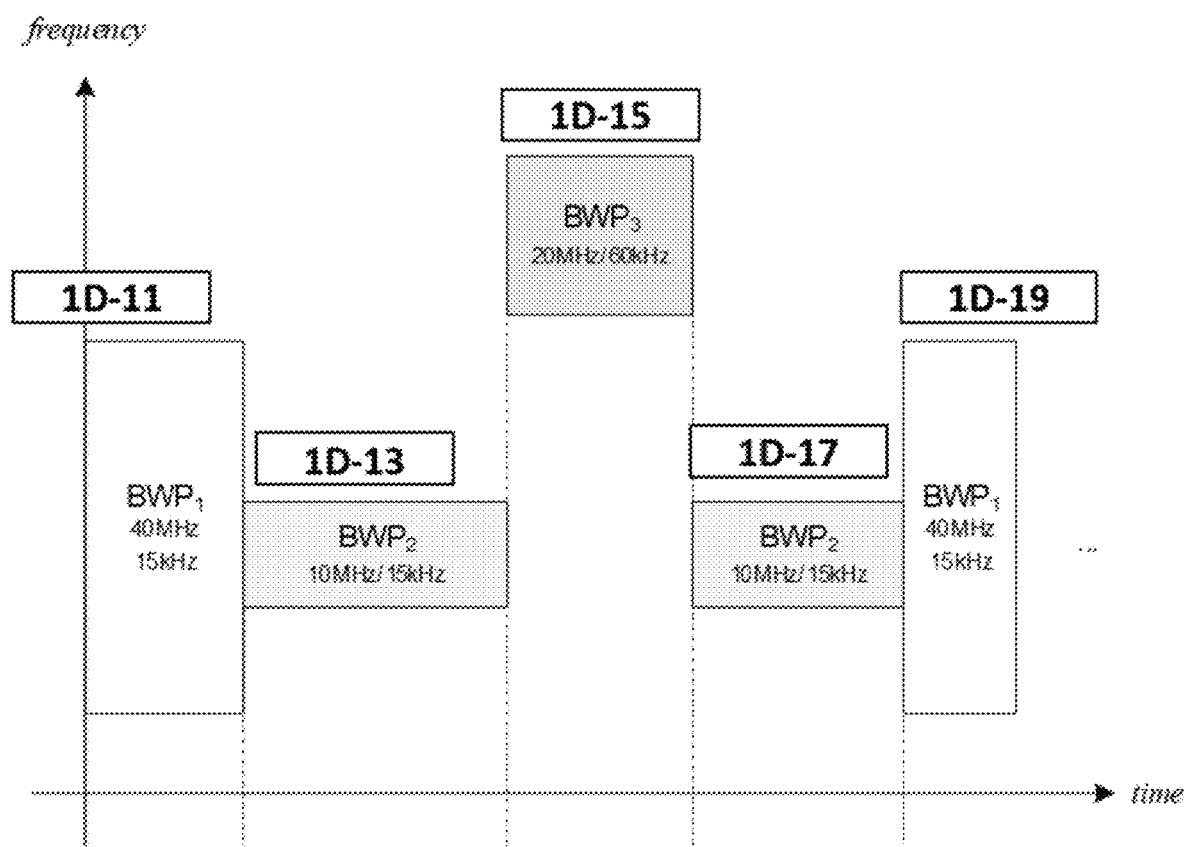
FIG. 1D is a diagram illustrating an example of a bandwidth part configuration.
Figure 1E:
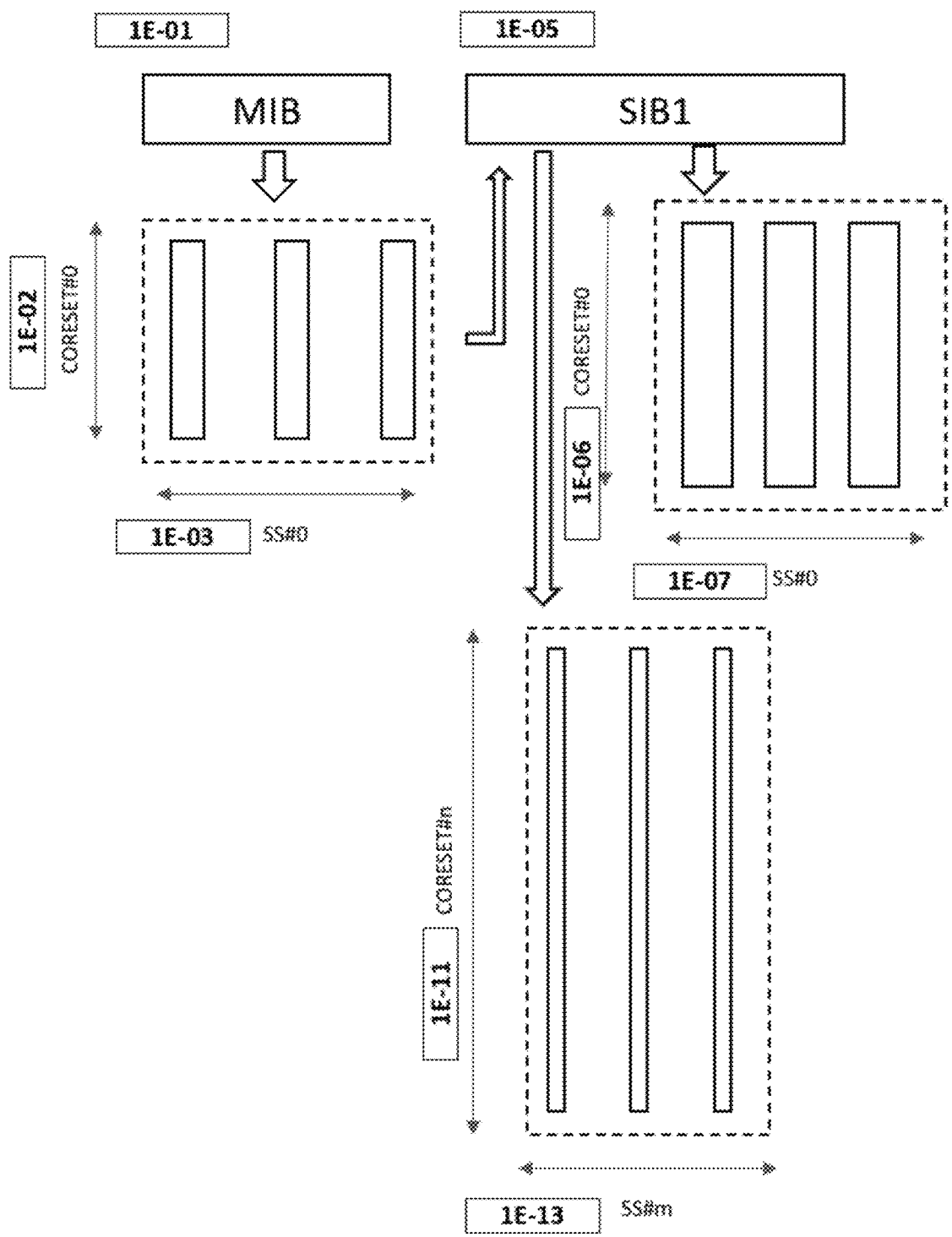
FIG. 1E is a diagram illustrating an example of a search space and a control resource set.

FIG. 1C is a diagram illustrating an example RRC state transition.

Between RRC_CONNECTED 1C-11 and RRC_INACTIVE 1C-13, a state transition occurs due to the exchange of the Resume message and the Release message containing the Suspend IE.

A state transition occurs between RRC_CONNECTED 1C-11 and RRC_IDLE 1C-15 through RRC connection establishment and RRC connection release.

A wireless device may include, or may be referred to as, a user equipment, a user device, a wireless user device, a vehicle, a connected car, a flying object, a drone, a terminal, a user terminal, a road side unit (RSU), a mobile device, etc. The wireless device may perform one or more operations and/or processes described herein. The wireless device may receive (e.g., from a base station and/or from another wireless device) at least one Radio Resource Control (RRC) message. The at least one RRC message may comprise: first configuration information associated with at least one first cell; and second configuration information associated with at least one second cell. The wireless device may perform (e.g., while the first configuration information and the second configuration information are configured for the wireless device), one or more operations described herein. In an example, (e.g., while the first configuration information and the second configuration information are configured for the wireless device) the wireless device may perform, based on the second configuration information, wireless communication via at least one cell of the at least one second cell; receive a first MAC CE (e.g., the first MAC CE may comprise an identifier associated with the first configuration information); and based on the first MAC CE, perform, using at least one parameter of the first configuration information, wireless communication via at least one cell of the at least one first cell.

The wireless device may switch, based on the identifier comprised in the first MAC CE, from the at least one cell of the at least one second cell to the at least one cell of the at least one first cell. The first MAC CE may be a MAC CE associated with a layer-2 triggered mobility and may indicate the switching to the at least one cell of the at least one first cell. The at least one first cell may be comprised in a first layer-2 mobility group, and the at least one second cell may be comprised in a second layer-2 mobility group.

The wireless device may receive a second MAC CE (e.g., while the first configuration information and the second configuration information are configured for the wireless device). The second MAC CE may comprise an identifier associated with the second configuration information. Based on the second MAC CE, the wireless device may perform, using at least one parameter of the second configuration information, wireless communication via at least one cell of the at least one second cell (e.g., while the first configuration information and the second configuration information are configured for the wireless device).

The wireless device may switch, based on the identifier comprised in the second MAC CE, from the at least one cell of the at least one first cell to at least one cell of the at least one second cell. The second MAC CE may be a MAC CE associated with a layer-2 triggered mobility and may indicate the switching to the at least one cell of the at least one second cell.

The at least one first cell may be a first set of serving cells (e.g., associated with a first mobility group). The at least one second cell may be a second set of serving cells (e.g., associated with a second mobility group).

The wireless device may start to apply the first configuration information, for example, at a first time point. The first time point may be a first time duration after receiving the first MAC CE. The wireless device may start to apply the second configuration information, for example, at a second time point. The second time point may be a second time duration after receiving the second MAC CE. The first time duration and the second time duration may be the same or may be different from each other.

The first time point may be after a first HARQ feedback transmission (e.g., an HARQ ACK) responsive to the first MAC CE. A time duration between the first HARQ feedback transmission and the first time point may be configured (e.g., via RRC signaling, DCI, and/or a MAC CE, etc.). The time duration between the first HARQ feedback transmission and the first time point may be configured as a slot offset (e.g., slot offset k, when the first HARQ feedback transmission occurs in slot n and the first time point is in slot n+k). The slot n and the slot n+k may be uplink slots of the at least one cell of the at least one first cell (e.g., at least one cell of a first mobility group). The slot offset k may be configured (e.g., preconfigured) in a device (e.g., a base station, the wireless device, etc.) as a fixed value and/or may be configured via a message (e.g., RRC signaling).

The second time point may be after a second HARQ feedback transmission (e.g., an HARQ ACK) responsive to the second MAC CE. A time duration between the second HARQ feedback transmission and the second time point may be configured (e.g., via RRC signaling, DCI, and/or a MAC CE, etc.). The time duration between the second HARQ feedback transmission and the second time point may be configured as a slot offset (e.g., slot offset k, when the second HARQ feedback transmission occurs in slot m and the second time point is in slot m+k). The slot m and the slot m+k may be uplink slots of the at least one cell of the at least one second cell (e.g., at least one cell of a second mobility group). The slot offset k may be configured (e.g., preconfigured) in a device (e.g., a base station, the wireless device, etc.) as a fixed value and/or may be configured via a message (e.g., RRC signaling).

The wireless device may determine the first time point (e.g., slot n+k), for example, based on a number of slots (e.g., a quantity of slots corresponding to slot offset k) and a slot (e.g., slot n described above) in which the first HARQ feedback transmission occurs. The slot n and slot n+k may be uplink slots of the at least one cell of the at least one first cell.

The wireless device may determine the second time point (e.g., slot m+k), for example, based on a number of slots (e.g., a quantity of slots corresponding to slot offset k) and a slot (e.g., slot m described above) in which the second HARQ feedback transmission occurs. The slot m and slot m+k may be uplink slots of the at least one cell of the at least one second cell.

The wireless device may initiate a first random access procedure (e.g., including a transmission of a random access preamble), for example, based on the first configuration information and based on the first MAC CE. The first random access procedure may be started at the first time point, or a third time point associated with the first time point (e.g., the third time point may be offset from the first time point with a configured offset). The wireless device may initiate a second random access procedure (e.g., including a transmission of a random access preamble), for example, based on the second configuration information and based on the second MAC CE. The second random access procedure may be started at the second time point, or a fourth time point associated with the second time point (e.g., the fourth time point may be offset from the second time point with a configured offset).

The wireless device may receive, from a base station, at least one Radio Resource Control (RRC) message, wherein the at least one RRC message comprises: first configuration information indicating a Transmission Configuration Index (TCI) state list of a first cell; and second configuration information indicating a TCI state list of a second cell.

The wireless device may receive, from the base station and via the second cell, a first Medium Access Control (MAC) Control Element (CE), wherein the first MAC CE comprises an identifier associated with the first configuration information and associated with a first TCI state identifier, and wherein the first TCI state identifier indicates a first TCI state of the TCI state list of the first cell.

The wireless device may monitor, based on the first MAC CE and based on the first TCI state, Physical Downlink Control Channel (PDCCH) associated with the first cell.

The wireless device may receive, from the base station and via the first cell, a second MAC CE, wherein the second MAC CE comprises an identifier associated with the second configuration information and associated with a second TCI state identifier, and wherein the second TCI state identifier indicates a second TCI state of the TCI state list of the second cell.

The wireless device may monitor, based on the second MAC CE and based on the second TCI state, PDCCH associated with the second cell.

The receiving the first MAC CE may comprise: while the first configuration information and the second configuration information are configured for the wireless device, receiving the first MAC CE, and wherein the receiving the second MAC CE may comprise: while the first configuration information and the second configuration information are configured for the wireless device, receiving the second MAC CE.

The wireless device may apply, based on the first MAC CE, at least one parameter of the first configuration information; and apply, based on the second MAC CE, at least one parameter of the second configuration information.

The wireless device may perform, based on the applied at least one parameter of the first configuration information, wireless communication via the first cell, and perform, based on the applied at least one parameter of the second configuration information, wireless communication via the second cell.

The first cell may be associated with a first layer-2 mobility group, and the second cell may be associated with a second layer-2 mobility group.

The receiving the first MAC CE may comprise: while the first configuration information and the second configuration information are configured for the wireless device: receiving the first MAC CE; and switching, based on the first MAC CE, from the second layer-2 mobility group to the first layer-2 mobility group.

The receiving the second MAC CE may comprise: while the first configuration information and the second configuration information are configured for the wireless device: receiving the second MAC CE; and switching, based on the second MAC CE, from the first layer-2 mobility group to the second layer-2 mobility group.

The receiving the at least one RRC message may comprise: receiving, from the base station, a first RRC message, wherein the first RRC message comprises the first configuration information; and receiving, from the base station, a second RRC message, wherein the second RRC message comprises the second configuration information.

The wireless device may receive, from a base station, at least one Radio Resource Control (RRC) message, wherein the at least one RRC message comprises: first configuration information associated with at least one first cell; and second configuration information associated with at least one second cell.

The wireless device may, while the first configuration information and the second configuration information are configured for the wireless device, perform, based on the second configuration information, wireless communication via at least one cell of the at least one second cell; after performing the wireless communication via at least one cell of the at least one second cell, receive a first Medium Access Control (MAC) Control Element (CE), wherein the first MAC CE comprises an identifier associated with the first configuration information and associated with a Transmission Configuration Index (TCI) state list of the at least one first cell; and, based on the first MAC CE, perform, using at least one TCI state of the TCI state list of the at least one first cell, wireless communication via at least one cell of the at least one first cell.

The first configuration information may indicate the TCI state list of the at least one first cell, and the second configuration information may indicate a TCI state list of the at least one second cell.

The identifier may be associated with a first TCI state identifier, and the first TCI state identifier may indicate a first TCI state of the TCI state list of the at least one first cell.

The wireless device may, while the first configuration information and the second configuration information are configured for the wireless device: after performing the wireless communication via at least one cell of the at least one first cell, receive a second MAC CE, wherein the second MAC CE comprises an identifier associated with the second configuration information and associated with a TCI state list of the at least one second cell; and, based on the second MAC CE, perform, using at least one TCI state of the TCI state list of the at least one second cell, wireless communication via at least one cell of the at least one second cell.

The identifier associated with the second configuration information may be associated with a second TCI state identifier, and the second TCI state identifier may indicate a second TCI state of the TCI state list of the at least one second cell.

The at least one first cell may be associated with a first layer-2 mobility group, and the at least one second cell may be associated with a second layer-2 mobility group.

The wireless device may, while the first configuration information and the second configuration information are configured for the wireless device, switch, based on the first MAC CE, from the second layer-2 mobility group to the first layer-2 mobility group.

The wireless device may, while the first configuration information and the second configuration information are configured for the wireless device, switch, based on a second MAC CE, from the first layer-2 mobility group to the second layer-2 mobility group.

The second MAC CE may comprise an identifier associated with the second configuration information and associated with a TCI state list of the at least one second cell.

The receiving the at least one RRC message may comprise: receiving, from the base station, a first RRC message, wherein the first RRC message comprises the first configuration information; and receiving, from the base station, a second RRC message, wherein the second RRC message comprises the second configuration information.

Figure 2A:
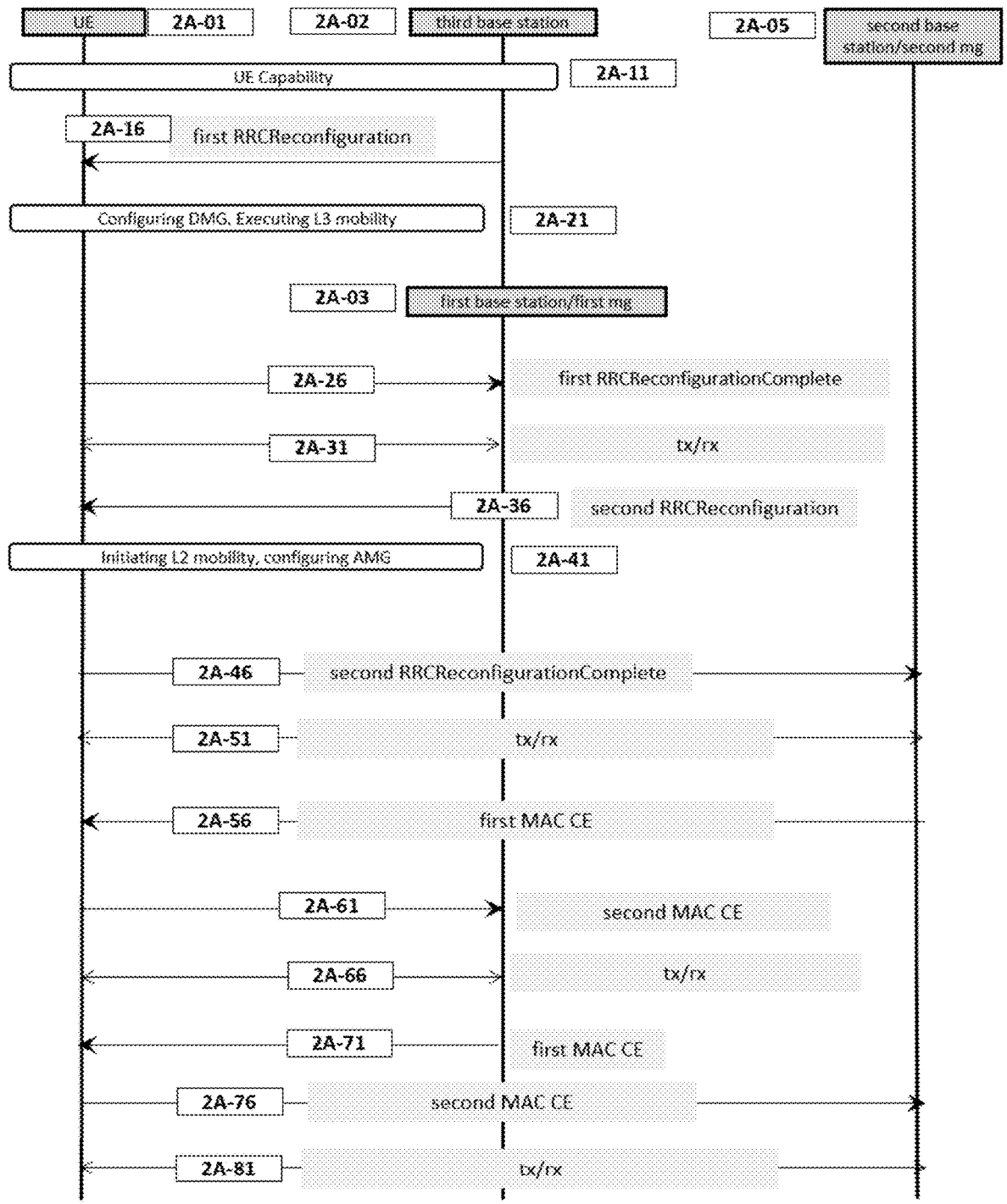
FIG. 2A and FIG. 2B are diagrams illustrating example operations of a terminal and a base station.
Figure 2B:
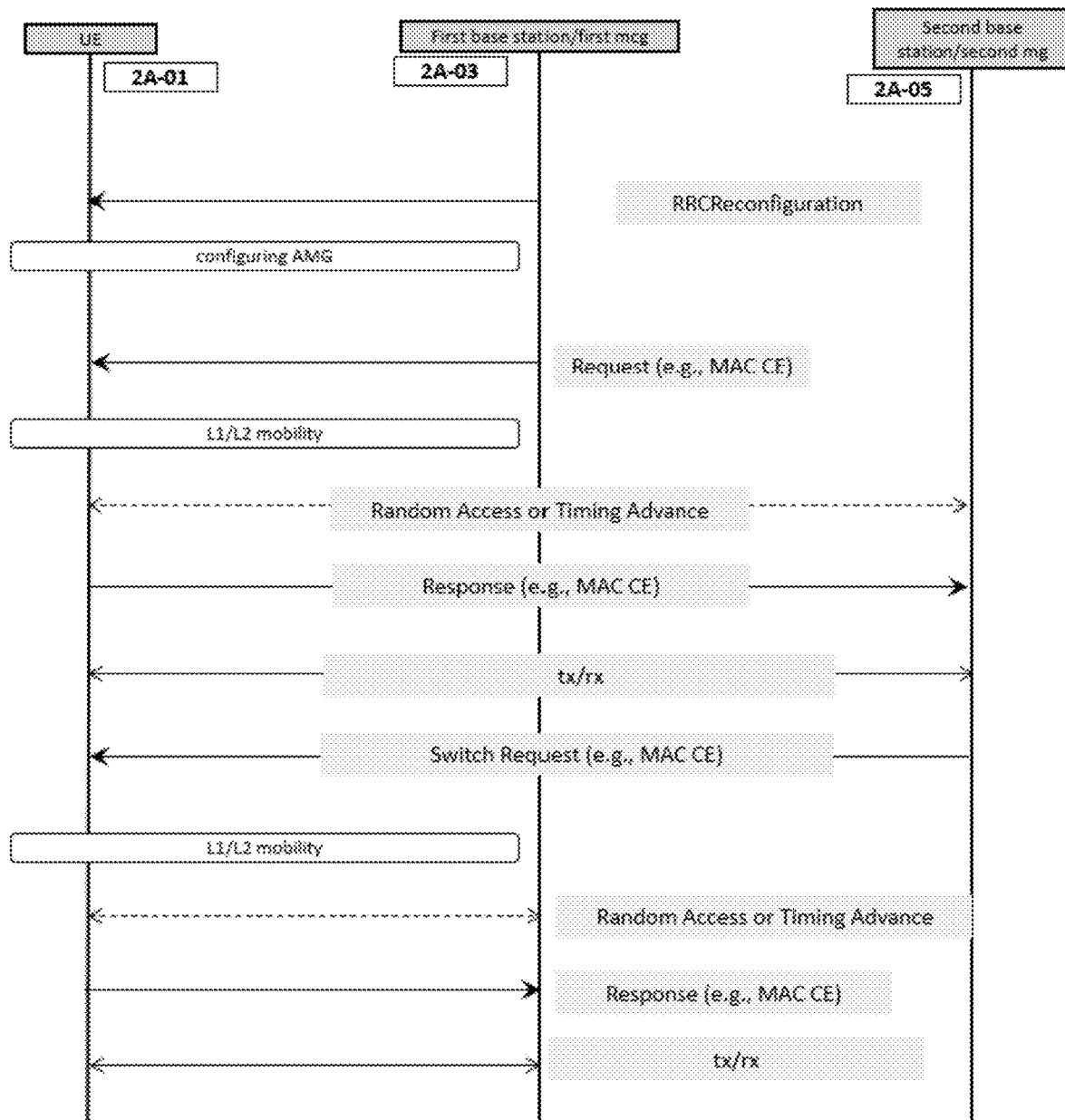

FIG. 2A and FIG. 2B are diagrams illustrating example operations of a terminal and a base station.

A mobile communication system may be associated with a UE 2A-01, a third base station 2A-02, a first base station and a first mobility group 2A-03, and a second base station and a second mobility group 2A-05. The first mobility group may be controlled by the first base station. The second mobility group may be controlled by the second base station. The first mobility group and the second mobility group may include different cells. For example, the first mobility group may be associated with at least one first cell (and/or a first cell group), and the second mobility group may be associated with at least one second cell (and/or a second cell group). At least two of the first base station, the second base station, and the third base station may be the same or different.

In 2A-11, a device (e.g., the UE 2A-01) may transmit to the third base station (e.g., GNB) 2A-02 device capability information (e.g., UECapabilitylnformation). The GNB may receive, from the UE, the device capability information (e.g., UECapabilitylnformation). The device capability information may indicate that the device supports L2 mobility, L3 mobility, etc.

The third base station (e.g., GNB) 2A-02 may determine the configuration to be applied to the UE based on the UE capability and other considerations such as the expected traffic for the UE and the load of cells.

At a point of time, GNB 2A-02 may decide to handover the device (e.g., the UE) from a cell to another cell.

In 2A-16, the third base station (e.g., GNB) 2A-02 may transmit to the device (e.g., UE) a first RRC reconfiguration (e.g., RRCReconfiguration) to indicate/command a handover. The device (e.g., the UE) may receive from the third base station (e.g., GNB) 2A-02, the first RRC Reconfiguration.

The first RRC Reconfiguration (e.g., RRCReconfiguration message) may include following configuration information: RadioBearerConfig, CellGroupConfig, MasterKeyUpdate.

If the first RRC Reconfiguration message includes ReconfigurationWithSync and does not include an L2 mobility configuration (e.g., L2mobilityConfig) within ReconfigurationWithSync, L3 mobility toward a new default mobility group (dmg) may be commanded. The new dmg may include a default PCell and zero or more default SCells.

The ServingCellConfig of the default PCell may be included in SpCellConfig in CellGroupConfig. The ServingCellConfigCommon of the default PCell may be included in ReconfigurationWithSync in SpCellConfig in CellGroupConfig. The ServingCellConfig and the ServingCellConfigCommon of a default SCell may be included in SCellConfig in CellGroupConfig.

If the first RRC Reconfiguration message includes ReconfigurationWithSync and an L2 mobility configuration (e.g., L2mobilityConfig), L2 mobility between the current dmg and a new amg may be commanded. The new additional mobility group (amg) may include an additional PCell and zero or more additional SCells. The ServingCellConfig of the additional PCell may be included in SpCellConfig in CellGroupConfig2. The ServingCellConfigCommon of the additional PCell may be included in ReconfigurationWithSync in SpCellConfig in CellGroupConfig2. The ServingCellConfig and the ServingCellConfigCommon of an additional SCell may be included in SCellConfig in CellGroupConfig2.

In at least some implementations, if the first RRCReconfiguration message includes ReconfigurationWithSync, L3 mobility toward a new dmg may be commanded.

If the first RRC Reconfiguration message includes L2mobilityConfig, L2 mobility with a new amg may be commanded.

The first RRC Reconfiguration message may be included in a downlink MAC PDU. The UE may transmit the HARQ acknowledgement for the MAC PDU at a point of time. The point of time may be indicated by DCI scheduling PDSCH for the MAC PDU.

In 2A-21, UE may perform L3 mobility execution activities (e.g., L3_MOBILITY_EXECUTION_ACTIVITIES) based on the received RRC Reconfiguration message including ReconfigurationWithSync.

In 2A-26, the UE may transmit to the third base station (e.g., GNB) 2A-03 a first RRC reconfiguration complete message (e.g., RRCReconfigurationComplete) in a new default PCell of the new dmg. The third base station (e.g., GNB) may receive the first RRC reconfiguration complete message (e.g., RRCReconfigurationComplete) from the UE via the default PCell of the dmg.

If the RRCReconfigurationComplete is a response to RRCReconfiguration commanding/implying L3 mobility (e.g., RRCReconfiguration including ReconfigurationWithSync in spCellConfig of an MCG), the UE may perform L3 mobility completion activities (e.g., L3_MOBILITY_COMPLETE_ACTIVITIES).

The UE may initiate a random access procedure in the default PCell (e.g., to transmit the RRC Reconfiguration Complete message via SRB1).

After successfully completing the random access procedure, the UE may perform transmission/reception on the currently active mobility group. If the UE is configured with a dmg, the dmg may be the currently active mobility group. If the UE is configured with a dmg and one or more amg, the currently active mobility group may be determined based on the information included in an indication (e.g., a RRC message, DCI, a MAC CE, etc.).

In 2A-31, the UE and the third base station (e.g., GNB) may perform transmission/reception via the serving cells of the new mobility group.

If the currently active mobility group is dmg, the UE may perform transmissions and/or receptions via DMG (e.g., TRANSMISSION_RECEPTION_ACTIVITIES_ON_DMG).

At a point of time, the third base station (e.g., GNB) may decide to apply L2 mobility to the UE. The decision may be made based on at least one of UE capabilities (e.g., whether UE supports L2 mobility), network capabilities (e.g., whether the source PCell and the target PCell support L2 mobility), and traffic characteristics (e.g., whether traffic requires strict QoS and radio condition).

In 2A-36, a first base station (e.g., a first mobility group, GNB) 2A-03 may transmit to the UE a second RRC Reconfiguration (e.g., RRCReconfiguration) to configure L2 mobility. The UE may receive, from the first base station (e.g., GNB) 2A-03, the second RRC Reconfiguration. In some implementations, other base stations (e.g., the third base station 2A-02) may transmit at least one parameter associated with the second RRC Reconfiguration.

The second RRC Reconfiguration message may include following configuration information: CellGroupConfig2.

CellGroupConfig2 may include L2mobilityConfig and other configuration information.

If the second RRC Reconfiguration message includes ReconfigurationWithSync and does not include L2mobilityConfig within ReconfigurationWithSync, L3 mobility toward a new dmg may be commanded. The new dmg may include a default PCell and zero or more default SCells. The ServingCellConfig of the default PCell may be included in SpCellConfig in CellGroupConfig. The ServingCellConfigCommon of the default PCell may be included in ReconfigurationWithSync in SpCellConfig in CellGroupConfig. The ServingCellConfig and the ServingCellConfigCommon of a default SCell may be included in SCellConfig in CellGroupConfig.

If the second RRCReconfiguration message includes ReconfigurationWithSync and L2mobilityConfig, L2 mobility between the current dmg and a new amg may be commanded. The new amg may include an additional PCell and zero or more additional SCells. The ServingCellConfig of the additional PCell may be included in SpCellConfig in CellGroupConfig2. The ServingCellConfigCommon of the additional PCell may be included in ReconfigurationWithSync in SpCellConfig in CellGroupConfig2. The ServingCellConfig and the ServingCellConfigCommon of an additional SCell may be included in SCellConfig in CellGroupConfig2.

In at least some implementations, if the second RRC Reconfiguration message includes ReconfigurationWithSync, L3 mobility toward a new dmg may be commanded.

If the second RRC Reconfiguration message includes L2mobilityConfig, L2 mobility with a new amg may be commanded.

The second RRCReconfiguration message may be included in a downlink MAC PDU. The UE may transmit an HARQ acknowledgement for the MAC PDU at a point of time. The point of time may be indicated by DCI scheduling PDSCH for the MAC PDU.

In 2A-41, the UE may perform L2 mobility execution activities (e.g., L2_MOBILITY_EXECUTION_ACTIVITIES) based on the received RRC Reconfiguration message including L2mobilityConfig.

In 2A-46, the UE may transmit to a second base station (e.g., a second mobility group, GNB) 2A-05 a second RRC reconfiguration completion message (e.g., RRCReconfigurationComplete) in an additional PCell of the amg. The second base station (e.g., GNB) 2A-05 may receive the second RRC reconfiguration completion message (e.g., second RRCReconfigurationComplete) from the UE via the additional PCell of the amg.

If RRCReconfigurationComplete is a response to the RRC Reconfiguration configuring L2 mobility (e.g., RRCReconfiguration including L2mobilityConfig in spCellConfig of an MCG), the UE may perform L2 mobility completion activities (e.g., L2_MOBILITY_COMPLETE_ACTIVITIES).

The UE may initiate a random access procedure in the additional PCell (e.g., to transmit the RRCReconfiguration-Complete message via SRB1).

In at least some implementations, if the RRC Reconfiguration message includes L2mobilityConfig and if the L2mobilityConfig includes a parameter indicating a random access is required (e.g., randomAccessRequired), the UE may initiate a random access procedure in the additional PCell.

After successfully completing the random access procedure triggered by the RRC Reconfiguration configuring an amg, The UE may perform transmission/reception on a currently active mobility group. If the RRC Reconfiguration triggering the random access procedure configures an amg (e.g., RRC Reconfiguration including L2mobilityConfig in spCellConfig of an MCG), the currently active mobility group may be the amg configured by the RRC Reconfiguration.

In at least some implementations, if the RRC Reconfiguration message includes L2mobilityConfig and if the L2mobilityConfig includes a L2mobilityExecution, UE may switche the currently active mobility group to the amg after successfully completing the random access procedure.

In 2A-51, the UE and the second base station (e.g., GNB) 2A-05 may perform transmission/reception via the serving cells of a new mobility group.

If the currently active mobility group is amg, the UE may perform transmission and/or reception on amg (e.g., TRANSMISSION_RECEPTION_ACTIVITIES_ON_AMG).

At a point of time, the second base station (e.g., GNB) may decide to switch the active mobility group from the amg to dmg.

In 2A-56, the second base station (e.g., GNB) 2A-05 may transmit a mobility group switch request (e.g., a MAC CE, a MOBILITY_GROUP_SWITCH_REQUEST MAC CE) to the UE.

The UE may receive the mobility group switch request (e.g., a MAC CE, a MOBILITY_GROUP_SWITCH_REQUEST MAC CE) by receiving PDSCH of a serving cell of the currently active mobility group (amg).

The UE may determine that a mobility group switch (or L2 mobility) is instructed based on the received mobility group switch request (e.g., a MAC CE, a MOBILITY_GROUP_SWITCH_REQUEST MAC CE).

The UE may deactivate the currently active mobility group (e.g., the currently active mobility group, amg) and may activate the mobility group indicated by the mobility group switch request (e.g., a MAC CE, a MOBILITY_GROUP_SWITCH_REQUEST MAC CE).

The UE may deactivate the amg (e.g., the UE deactivates the additional PCell and the additional Scells that was in activated state) at a second point of time and activate the dmg (e.g., the UE activates the default Pcell and the default Scells that are indicated in the MOBILITY_GROUP_SWITCH_REQUEST MAC CE) at a first point of time.

In 2A-61, when the mobility group (e.g., dmg) is activated and a UL grant is available, the UE may transmit a mobility group switch response (e.g., a MAC CE, a MOBILITY_GROUP_SWITCH_RESPONSE MAC CE) to the first base station (e.g., GNB) 2A-03 on the PUSCH of the Pcell of the activated mobility group (e.g., the default Pcell).

UE may perform mobility group switch response transmission activities (e.g., MOBILITY_GROUP_SWITCH_RESPONSE_TRANSMISSION_ACTIVITIES).

In 2A-66, the UE and the first base station (e.g., GNB) 2A-03 may perform transmission/reception via the serving cells of the currently active mobility group (e.g., dmg).

If the currently active mobility group is dmg, the UE may perform transmission and/or reception via dmg (e.g., TRANSMISSION_RECEPTION_ACTIVITIES_ON_DMG).

At a point of time, the first base station (e.g., GNB) 2A-03 may decide to switch the active mobility group from the dmg to amg.

In 2A-71, the first base station (e.g., GNB) 2A-03 may transmit a mobility group switch request (e.g., a MAC CE, a MOBILITY_GROUP_SWITCH_REQUEST MAC CE) to the UE.

The UE may receive the mobility group switch request (e.g., a MAC CE, a MOBILITY_GROUP_SWITCH_REQUEST MAC CE) by receiving PDSCH of a serving cell of the currently active mobility group (e.g., dmg).

The UE may determine that a mobility group switch is instructed based on the received mobility group switch request (e.g., a MAC CE, a MOBILITY_GROUP_SWITCH_REQUEST MAC CE).

The UE may deactivate the currently active mobility group (e.g., the currently active mobility group, dmg) and activate the mobility group indicated by the mobility group switch request (e.g., a MAC CE, a MOBILITY_GROUP_SWITCH_REQUEST MAC CE).

The UE may deactivate the dmg (e.g., the UE deactivates the default Pcell and the default Scells that was/were in activated state immediately before deactivating dmg) at a second point of time and activate the amg (e.g., the UE activates the additional Pcell and the additional Scells that are indicated in the MOBILITY_GROUP_SWITCH_REQUEST MAC CE) at a first point of time.

In 2A-76, when the mobility group is activated and a UL grant is available, the UE may transmit a mobility group switch response (e.g., a MAC CE, a MOBILITY_GROUP_SWITCH_RESPONSE MAC CE) to the second base station (e.g., GNB) 2A-05 on the PUSCH of the Pcell of the activated mobility group (e.g., the additional Pcell).

The UE may perform mobility group switch response transmission activities (e.g., MOBILITY_GROUP_SWITCH_RESPONSE_TRANSMISSION_ACTIVITIES).

In 2A-81, the UE and the second base station (e.g., GNB) 2A-05 may perform transmission/reception via the serving cells of a mobility group.

If the currently active mobility group is amg, the UE may perform transmission and/or reception via amg (e.g., TRANSMISSION_RECEPTION_ACTIVITIES_ON_AMG).

At a point of time, the GNB decides to change default Pcell.

In 2A-86, a base station (e.g., a third base station, a GNB, or any other base station described herein) may transmit a third RRC Reconfiguration message (e.g., RRCReconfiguration message) to the UE.

The third RRC Reconfiguration may include following information:
  First information for Pcell change: An indication that default Pcell change is needed.
  Second information for Pcell change: The identifier of new default Pcell. The new default Pcell is one of additional Pcell. If there is only one additional Pcell, this information is absent and the additional Pcell is the new default Pcell.
  Third information for Pcell change: An indication whether the current Pcell becomes new additional Pcell or is released. If the indication is present, the current Pcell becomes new additional Pcell. If the indication is absent, the current Pcell is released.

Above information may be included in a L2mobilityConfig IE.

Upon receiving the RRC Reconfiguration message, the UE may perform a default Pcell change (e.g., DEFAULT_PCELL_CHANGE).

When the UE moves into the territory of the new default Pcell, the additional Pcell (and amg) may be no longer suitable/sustainable.

In 2A-91, a base station (e.g., a third base station, a GNB, or any other base station described herein) transmit a fourth RRC Reconfiguration (e.g., RRCReconfiguration) to the UE.

The fourth RRC Reconfiguration may include the following information:
  First information for Pcell release: The identifier of additional Pcell to be released.
  Second information for Pcell release: List of identifiers of additional Scells to be released. This list is included if the additional Pcell is not released. If the additional Pcell is released, all the associated additional Scells are released together.

Above information may be included in a L2mobilityConfig IE.

Upon receiving the RRC Reconfiguration message, the UE may perform an additional Pcell Release (e.g., ADDITIONAL_PCELL_RELEASE).

DEFAULT_PCELL_CHANGE may be as follows. The activities may be performed in order.
///START///
  The UE receives the third RRC Reconfiguration in slot n of a serving cell of amg or of dmg.
  The UE transmits the acknowledgement (HARQ ACK for the MAC PDU containing the third RRC Reconfiguration) in slot q.
  The UE considers a second serving cell to be the default PCell in slot n+m.
  The UE considers the SCells associated with the second serving cells as default SCells in slot n+m.
  The UE considers a first serving cell is an additional PCell in slot n+m if the third information for the PCell change is present.
  The UE considers the SCells associated with the first serving cell are additional SCells in slot n+m.
  The UE considers that the first serving cell is released in slot q+p if the third information for PCell change is not present.
  The UE considers that the SCells associated with the first serving cell are released in slot q+p.
  The second serving cell is the additional PCell if it is not indicated in the third RRC Reconfiguration (if the second information for PCell change is not present).
  The second serving cell is the one indicated by the third RRC Reconfiguration (if the second information for PCell change is present).
  The first serving cell is the default PCell when the third RRC Reconfiguration is received.
  m may be an integer representing UE processing delay for switching. m may vary depending on the subcarrier spacing of the DL BWP where the third RRC Reconfiguration is received.
  p may be an integer representing UE processing delay for releasing a serving cell. p may vary depending on the subcarrier spacing of the UL BWP where the acknowledgement for the third RRCReconfiguration is transmitted.
/// END ///

ADDITIONAL_PCELL_RELEASE may be as follows.
///START///

The UE receives the fourth RRC Reconfiguration in slot n of a serving cell of dmg.

The UE transmits the acknowledgement (HARQ ACK for the MAC PDU containing the fourth RRC Reconfiguration) in slot q.

The UE considers a third serving cell is released in slot q+p.

The UE considers the SCells associated with the third serving cells are released in slot q+p.
/// END ///

To facilitate mobility between cells with less interruption and better performance, multiple mobility groups may be configured for a UE. Each of the multiple mobility groups may cover a different geographic area and connected with different DUs. A UE communicates with a mobility group among the multiple mobility groups and switches back and forth among the mobility groups depending on the UE's geographical location.

In this disclosure, UE operations and GNB operations are explained with two mobility groups, but aspects of the present disclosure are not limited thereto. More than two mobility groups may be configured in one or more implementations.

A mobility group may include one or more cells controlled by a single base station. A UE may be configured with multiple mobility groups and communicate with a single mobility group at a time.

A mobility group may be either a default mobility group (hereafter dmg) or an additional mobility group (hereafter amg). A mobility group may include a PCell (or a PSCell) and zero or more SCells. A PCell/PSCell and a SCell in dmg may be called default PCell/PSCell and default SCell, respectively. A PCell/PSCell and a SCell in amg may be called additional PCell/PSCell and additional SCell, respectively.

Both a default mobility group and an additional mobility group may be master cell group (in case of L2 PCell change) or both are secondary cell group (in case of L2 SCG change).

dmg may be default MCG. amg may be additional MCG.

dmg may be default SCG. amg may be additional SCG.

The default PCell and the additional PCell may be configured in the same center frequency (e.g., absoluteFrequencySSB in FrequencyInfoDL in ServingCellConfigCommon of the default PCell and absoluteFrequencySSB in FrequencyInfoDL in ServingCellConfigCommon of the additional PCell are same).

The default PCell and the additional PCell may be assigned with a same serving cell index (e.g., ServCellIndex) which may be zero.

The default PSCell and the additional PSCell may be configured in the same center frequency (e.g., absoluteFrequencySSB in FrequencyInfoDL in ServingCellConfigCommon of the default PSCell and absoluteFrequencySSB in FrequencyInfoDL in ServingCellConfigCommon of the additional PSCell are same).

The default PSCell and the additional PSCell may be assigned with a same ServCellIndex. The base station may ensure that the same ServCellIndex is allocated to the default PSCell and the additional PSCell.

A default SCell with the ServCellIndex n and an additional SCell with the ServCellIndex n may be configured in the same center frequency (e.g., absoluteFrequencySSB in FrequencyInfoDL in ServingCellConfigCommon of the default SCell n and absoluteFrequencySSB in FrequencyInfoDL in ServingCellConfigCommon of the additional SCell n are same).

A default SCell and an additional SCell configured with the same absoluteFrequencySSB may be assigned with a same Serv CellIndex. The base station may ensure that the same ServCellIndex is allocated to the default SCell and the additinal SCell having the same absoluteFrequencySSB.

At any point of time, at least one PCell between the default PCell and the additional PCell may be in an activated state (e.g., at least one serving cell with servCellIndex 0 is activated in any time).

At any point of time, anSCell with servCellIndex n between the default SCell with servCellIndex n and the additional SCell with servCellIndex n may be in an activated state. All SCells with servCellIndex n may be in deactivated state.

The default PCell may be the PCell when RRC Reconfiguration configuring L2 mobility (RRCReconfiguration including L2mobilityConfig is received).

The additional PCell may be the PCell added by an RRC Reconfiguration configuring L2 mobility.

In L3 mobility (e.g., a handover), an RRC Reconfiguration message with ReconfigurationWithSync IE may be used to configure the target configuration after L3 mobility and to initiate the L3 mobility.

In L2 mobility, an RRC Reconfiguration message with ReconfigurationWithSync IE and with L2MobilityInd IE may be used to configure the target configuration during L2 mobility and to command the initial L2 mobility. In L2 mobility, a MAC CE may be used to command L2 mobility between mobility groups.

During the L3 mobility, L1 (e.g., a physical layer, a transceiver) switches from a group of cells to another group of cells, a MAC entity may be reset, RLC entities may be reestablished, PDCP entities may be reestablished, and security keys may be updated.

During the L2 mobility, L1 may switch repeatedly between a group of cells and another group of cells. MAC and RLC and PDCP may continue the operation. The same security keys may be used.

L2 mobility from dmg to amg triggered by an RRC Reconfiguration message may be performed with a random access procedure in the additional PCell.

L2 mobility from amg to dmg triggered by MAC CE may be performed with or without a random access procedure in accordance with an indication (e.g., a 1-bit indication) in the MAC CE.

L2 mobility from dmg to amg triggered by MAC CE may be performed with or without a random access procedure in accordance with an indication (e.g., a 1-bit indication) in the MAC CE.

In L3 mobility, the security key used for the PDCP packets exchanged in the target PCell may be derived from PCI of the target PCell.

In L2 mobility, the security key used for the PDCP packets exchanged in an additional PCell may be derived from PCI of the default PCell.

L3_MOBILITY_EXECUTION_ACTIVITIES are as follows. These activities may be performed in order.
///START///

The UE starts the T304 for the target default PCell with the timer value set to t304 as included in the ReconfigurationWithSync.

The UE starts to synchronize with the DL of the default target PCell.

If the frequencyInfoDL is included in the ReconfigurationWithSync, the target default PCell on the SSB frequency may be indicated by the frequencyInfoDL with a physical cell identity indicated by the physCellId.

If the frequencyInfoDL is not included in the ReconfigurationWithSync, the default target PCell may be on the SSB frequency of the source default PCell with a physical cell identity indicated by the physCellId.

The UE resets the MAC entity of dmg. The MAC entity of dmg is called default MAC entity.

The UE applies the value of the newUE-Identity as the C-RNTI for dmg.

The UE configures lower layers for the target default PCell in accordance with the received spCellConfigCommon in the ReconfigurationWithSync in the CellGroupConfig.

The UE reconfigures the RLC entity or entities in accordance with the received rlc-Config in the RLC-BearerConfig in the CellGroupConfig.

The UE reconfigures the logical channel in accordance with the received mac-LogicalChannelConfig in the CellGroupConfig.

The UE reconfigures the MAC main configuration of the cell group in accordance with the received mac-CellGroupConfig in the CellGroupConfig.

The UE configures the default SCells in accordance with the received SCellConfigCommon field (comprising ServingCellConfigCommon) and the SCellConfigDedicated field (comprising ServingCellConfig) that are included in the CellGroupConfig.

The UE derives or updates the GNB_Security_Key in accordance with the received MasterKeyUpdate.

If the keySetChangeIndicator is set to true, the UE derives or updates the GNB_Security_Key based on the AMF_Security_Key.

If the keySetChangeIndicator is not set to true, the UE derives or updates the GNB_Security_Key based on the current GNB_Security_Key or the NH (Next Hop), using the nextHopChainingCount.

The UE applies the security keys derived from the GNB_Security_Key to the PDCP entities.

The UE reestablishes a PDCP entity if the reestablishPDCP is set.

The UE reconfigure the PDCP entity in accordance with the received pdcp-Config.
///END///

Examples of L3_MOBILITY_COMPLETE_ACTIVITIES are as follows. These activities may be performed in order.
///START///

If the UE was configured with a successHO-Config when connected to the source default PCell, the UE stores the successful handover information in the VarSuccessHO-Report upon successfully completing the Random Access procedure triggered for the ReconfigurationWithSync in the spCellConfig of the MCG.

If the UE has successful handover information available in the VarSuccessHO-Report and if the RPLMN is included in the plmn-IdentityList stored in the VarSuccessHO-Report, the UE includes the successHO-InfoAvailable in the RRCReconfigurationComplete message.

The UE includes the successL2mobility-InfoAvailable in the RRCReconfigurationComplete message, if the UE has successful L2 mobility information available in the VarSuccessL2mobility-Report and if the RPLMN is included in the plmn-IdentityList stored in the VarSuccessL2mobility-Report.
///END///

Examples of L2_MOBILITY_EXECUTION_ACTIVITIES are as follows. These activities may be performed in order.
///START///

The UE starts T3041 for the additional PCell with the timer value set to t3041, as included in the L2mobilityConfig.

The UE starts to synchronize with the DL of the additional PCell.

If the frequencyInfoDL is included in the L2mobilityConfig, the additional PCell is on the SSB frequency indicated by the frequencyInfoDL with a physical cell identity indicated by the physCellId.

If the frequencyInfoDL is not included in the L2mobilityConfig, the additional PCell is on the SSB frequency of the default PCell with a physical cell identity indicated by the physCellId.

If the newUE-Identity is included in the L2mobilityConfig, the UE applies the value of the newUE-Identity as the C-RNTI for amg (or the additional PCell).

If the newUE-Identity is not included in L2mobilityConfig, UE applies C-RNTI of the default PCell (or dmg) as the C-RNTI for amg (or the additional PCell).

The UE configures lower layers for the additional PCell in accordance with the received spCellConfigCommon in L2mobilityConfig in CellGroupConfig2.

The UE creates an additional MAC entity with the same configuration as the default MAC entity (the same configuration as the mac-CellGroupConfig is included in the CellGroupConfig in the first RRCReconfiguration) and reconfigures the MAC main configuration for the additional MAC entity in accordance with the received mac-CellGroupConfig in the CellGroupConfig2 in the second RRCReconfiguration.

The UE establishes, for each radio bearer, an additional RLC entity for the radio bearer with the same configuration as the default RLC entity (the same configuration as the rlc-BearerConfig in the CellGroupConfig in the first RRCReconfiguration) and reconfigures the additional RLC entity in accordance with the received RLC-BearerConfig in the CellGroupConfig2 in the second RRCReconfiguration.

The UE establishes an additional logical channel with the same configuration as the default logical channel and reconfigures the additional logical channel in accordance with the received MAC-LogicalChannelConfig in the CellGroupConfig2 in the second RRCReconfiguration.

The UE configures the additional SCells in accordance with the received SCellConfigCommon field (comprising ServingCellConfigCommon) and SCellConfigDedicated field (comprising ServingCellConfig) that are included in CellGroupConfig2 in the second RRCReconfiguration.
///END///

Examples of L2_MOBILITY_COMPLETE_ACTIVITIES are as follows. These activities may be performed in order.
///START///

If the UE was configured with successL2mobility-Config when connected to the source default PCell, the UE stores the successful L2 mobility information in VarSuccessL2mobility-Report upon successfully completing the Random Access procedure triggered for the L2mobilityConfig in the spCellConfig of the MCG.

The UE includes the successL2mobility-InfoAvailable in the RRCReconfigurationComplete message, if the UE has successful L2 mobility information available in the VarSuccessL2mobility-Report and if the RPLMN is included in the plmn-IdentityList stored in the VarSuccessL2mobility-Report.

The UE includes the successHO-InfoAvailable in the RRCReconfigurationComplete message, if the UE has successful handover information available in the VarSuccessHO-Report and if the RPLMN is included in the plmn-IdentityList stored in the VarSuccessHO-Report.
///END///

The UE variable VarSuccessHO-Report includes the successful handover information. The VarSuccessHO-Report comprises successHO-Report and plmn-IdentityList.

The successHO-Report comprises the following information: c-RNTI (the C-RNTI assigned by the target PCell of the handover for which the successful HO report was generated), shr-Cause (the cause of the successful HO report), upInterruptionTimeAtHO (the time elapsed between the time of arrival of the last PDCP PDU received from the source cell and the time of arrival of the first non-duplicate PDCP PDU received from the target cell), MeasResultSuccessHONR for source PCell (Cell level measuremnt results on SS/PBCH of the source PCell), and MeasResultSuccessHONR for target PCell (Cell level measuremnt results on SS/PBCH of the target PCell).

The plmn-IdentityList contains a list of EPLMN(Equivalent PLMNs) stored by the UE. This list of EPLMNs is provided by the AMF during a registration procedure. The UE can perform PLMN reselection across EPLMNs without informing the AMF.

The UE variable VarSuccessL2mobility-Report includes the successful L2 mobility information. TheVarSuccessL2mobility-Report is composed of one or more successL2mobility-Reports.

The successL2mobility-Report comprises the following information: default c-RNTI, additional c-RNTI, timestamp (SFN and subframe number corresponding to the time point when L2 mobility is triggered), direction (indicating whether from dmg to amg or vice versa), upInterruptionTimeAtL2mobility (the time elapsed between the time of arrival of the last PDCP PDU received from the source cell and the time of arrival of the first non-duplicate PDCP PDU received from the target cell), MeasResultSuccessL2mobilityNR for source PCell (beam level measuremnt results on SS/PBCH of the source PCell), and MeasResultSuccessL2mobilityNR for target PCell (beam level measuremnt results on SS/PBCH of the target PCell).

Examples of TRANSMISSION_RECEPTION_ACTIVITIES_ON_DMG are as follows. These activities may be performed continuously.
///START///For the reception of a paging message, the UE monitors a paging channel of the default PCell. The UE monitors PDCCH of the default PCell for the P-RNTI. The P-RNTI contains a fixed value.

If a PCH assignment has been received on the PDCCH of the default PCell for the P-RNTI, the UE attempts to decode the TB on the PCH as indicated by the PDCCH information. If the TB on the PCH has been successfully decoded, the decoded MAC PDU is delivered to the upper layers (i.e., RRC sublayer).

The PCH is associated with PDCCH and PDSCH.

The UE acquires a system information in the default PCell. The UE monitors the PDCCH of the default PCell for the SI-RNTI. If the downlink assignment has been received on the PDCCH of the default PCell for the SI-RNTI, the UE attempts to decode the TB on the DL-SCH as indicated by the PDCCH information. If the TB on the DL-SCH has been successfully decoded, the decoded MAC PDU is delivered to the upper layers (i.e., RRC sublayer). The SI-RNTI has a fixed value different from the P-RNTI.

The DL-SCH is associated with PDCCH and PDSCH.

For the reception of a Short Message, the UE monitors the PDCCH of the default PCell for the P-RNTI.

If the DCI format 1_0 is received in the PDCCH for the P-RNTI, the UE performs followings.

If the bit 1 (most significant bit) is set to 1, the UE determines a BCCH modification other than SIB6, SIB7 and SIB8 occurs for the default PCell. The UE acquires the SIB1 of the default PCell. The UE acquires the SIBs that are included in the si-SchedulingInfo and the ones that the UE needs to acquire. The UE determines whether the UE needs to acquire a SIB based on the valueTag associated with the SIB.

If the bit 2 is set to 1, the UE determines the ETWS primary notification and/or an ETWS secondary notification and/or a CMAS notification is indicated. The UE immediately re-acquires the SIB1 of the default PCell. The UE acquires the SIB6 of the default PCell immediately if the si-SchedulingInfo (in the SIB1) includes scheduling information for SIB6. The UE acquires the SIB7 of the default PCell immediately if the si-SchedulingInfo (in the SIB1) includes scheduling information for the SIB7. The UE acquires SIB8 of the default PCell immediately if the si-SchedulingInfo (in the SIB1) includes the scheduling information for SIB8.

For the transfer of DTCH/DCCH user information, the UE monitors the PDCCH of the default PCell and the default SCells for the C-RNTI of dmg.

The TCI state of the PDCCH of the default PCell is indicated among TCI states configured by one or more PDSCH-config in the ServingCellConfig of the default PCell.

The TCI state of the PDCCH of the default SCell is indicated among TCI states configured by one or more PDSCH-config in the ServingCellConfig of the default SCell.

For the transfer of DTCH/DCCH user information, the UE receives the PDSCH of the default PCell or the default SCell as indicated by the PDCCH information containing the downlink assignment addressed by the C-RNTI of dmg.

For the transfer of DTCH/DCCH user information, the UE transmits the PUSCH of the default PCell or default SCell as indicated by the PDCCH information containing the uplink grant addressed by the C-RNTI.

The UE transmits the CSI on the PUCCH of the default PCell as configured by the CSI-MeasConfig included in the ServingCellConfig of the default PCell.

The UE transmits the SRS on the active uplink BWP of the default PCell as configured by the SRS-config of the uplink BWP of the default PCell.

The spatial relation between a reference RS and the SRS is indicated by one or more TCI states among TCI states configured in one or more PDSCH-config in the ServingCellConfig of the default PCell.

The UE transmits the SRS on the active uplink BWP of the default SCell as configured by the SRS-config of the uplink BWP of the default SCell.

The spatial relation between a reference RS and the SRS is indicated by one or more TCI states among TCI states configured in one or more PDSCH-config in the ServingCellConfig of the default SCell.

For the transmission power control of the PUSCH of the default PCell and default SCells, the UE monitors the PDCCH of the default PCell for the tpc-PUSCH-RNTI of dmg (i.e., tpc-PUSCH-RNTI in PhysicalCellGroupConfig in CellGroupConfig in the first RRCReconfiguration). The UE determines the PUSCH TPC commands on the DCI addressed by the tpc-PUSCH-RNTI of dmg and applies the command for PUSCH transmission on the default PCell and on the default SCells.

For the transmission power control of the PUCCH of the default PCell, the UE monitors the PDCCH of the default PCell for the tpc-PUCCH-RNTI of dmg (i.e., tpc-PUCCH-RNTI in PhysicalCellGroupConfig in CellGroupConfig in the first RRCReconfiguration). The UE determines PUCCH TPC commands on the DCI addressed by the tpc-PUCCH-RNTI of dmg and applies the command for PUCCH transmission on the default PCell.

The UE determines the maximum transmission power for PUSCH, the maximum transmission power for PUCCH, the maximum transmission power of SRS in the serving cells of dmg based on the p-NR-FR1 of dmg (i.e., p-NR-FR1 in PhysicalCellGroupConfig in CellGroupConfig in the first RRCReconfiguration), and on the p-UE-FR1 of dmg (i.e., p-UE-FR1 in PhysicalCellGroupConfig in CellGroupConfig in the first RRCReconfiguration).

For the transmission power control of SRS of the default PCell, the UE monitors the PDCCH of the default PCell for the tpc-SRS-RNTI of dmg (i.e., tpc-SRS-RNTI in PhysicalCellGroupConfig in CellGroupConfig in the first RRCReconfiguration). The UE determines the SRS TPC commands for the default PCell on DCI addressed by the tpc-SRS-RNTI of dmg and applies the command for the SRS transmission on the default PCell.

For the transmission power control of the SRS of a default SCell, the UE monitors the PDCCH of the default SCell for the tpc-SRS-RNTI of dmg (i.e., tpc-SRS-RNTI in PhysicalCellGroupConfig in CellGroupConfig in the first RRCReconfiguration). The UE determines the SRS TPC commands for the default SCell on DCI addressed by the tpc-SRS-RNTI of dmg and then applies the command for SRS transmission on the default SCell.

TRANSMISSION_RECEPTION_ACTIVITIES_ON_AMG are as follows. These activities may be performed continuously.

///START///

If the currently active mobility group is amg, the UE may not receive a paging message and may not monitor a paging channel. The UE monitors the PDCCH of the additional PCell for the P-RNTI for the Short Message reception but the UE does not receive PDSCH for a paging message reception.

If the currently active mobility group is amg, the UE may not acquire any system information other than SIB6, SIB7, and SIB8.

For the reception of the Short Message, the UE monitors the PDCCH of the additional PCell for the P-RNTI.

If the DCI format 1_0 is received in the PDCCH of the additional PCell for the P-RNTI, the UE may perform the following.

If the bit 1 (most significant bit) is set to 1, the UE may determine that the BCCH modification for ones other than SIB6, SIB7, and SIB8 occurs for the additional PCell. The UE may not react on the bit 1 being set to 1.

If the bit 2 is set to 1, the UE may determine an ETWS primary notification and/or an ETWS secondary notification and/or a CMAS notification is indicated. The UE may be switched to dmg (i.e., UE deactivate the amg and activate the dmg) and immediately re-acquire the SIB1 of the default PCell. The UE acquires the SIB6 of the default PCell immediately if the si-SchedulingInfo (in the SIB1) includes the scheduling information for SIB6. The UE acquires the SIB7 of the default PCell immediately if the si-SchedulingInfo (in the SIB1) includes scheduling information for SIB7. The UE acquires the SIB8 of the default PCell immediately if the si-SchedulingInfo (in the SIB1) includes the scheduling information for SIB8.

Alternatively, if the bit 2 is set to 1, the UE may immediately re-acquire the SIB1 of the additional PCell. The UE acquires the SIB6 of the additional PCell immediately if the si-SchedulingInfo (in the SIB1) includes the scheduling information for SIB6. The UE acquires SIB7 of the additional PCell immediately if the si-SchedulingInfo (in the SIB1) includes scheduling information for SIB7. The UE acquires the SIB8 of the additional PCell immediately if the si-SchedulingInfo (in the SIB1) includes scheduling information for SIB8.

For the transfer of DTCH/DCCH user information, the UE may monitor the PDCCH of the additional Pcell and additional Scells.

The TCI state of the PDCCH of the additional Pcell is indicated among the TCI states configured in one or more PDSCH-configs in the ServingCellConfig of the additional Pcell.

The TCI state of the PDCCH of the additional Scell is indicated among the TCI states configured in one or more PDSCH-configs in ServingCellConfig of the additional Scell.

For the transfer of DTCH/DCCH user information, the UE receives the PDSCH of the additional Pcell or additional Scell as indicated by the PDCCH information containing a downlink assignment addressed by a second C-RNTI.

For the transfer of DTCH/DCCH user information, the UE transmits the PUSCH of the additional Pcell or additional Scell as indicated by the PDCCH information containing an uplink grant addressed by a C-RNTI of amg.

The C-RNTI of amg may be the value of the newUE-Identity in L2mobilityConfig (if newUE-Identity is included in L2mobilityConfig) or the C-RNTI of dmg (if newUE-Identity is not included in L2mobilityConfig).

The same C-RNTI may be used for dmg and amg if the C-RNTI is not configured for amg.

Different C-RNTIs may be used for dmg and amg respectively if the C-RNTI is configured for amg in the L2mobilityConfig.

The UE may transmit a CSI on the PUCCH of the additional Pcell as configured by the CSI-MeasConfig included in the ServingCellConfig of the additional Pcell (i.e., ServingCellConfig in L2mobilityConfig in CellGroupConfig2).

The UE may transmit a SRS on the active uplink BWP of the additional Pcell as configured by the SRS-config of the uplink BWP of the additional Pcell (i.e., SRS-config in ServingCellConfig in L2mobilityConfig in CellGroupConfig2).

The spatial relation between a reference RS and the SRS may be indicated by one or more TCI states among TCI states configured in one or more PDSCH-configs in ServingCellConfig of the additional Pcell.

The UE may transmit a SRS on the active uplink BWP of the additional Scell as configured by SRS-config of the uplink BWP of the additional Scell(i.e., SRS-config in ServingCellConfig in ScellConfig in CellGroupConfig2).

The spatial relation between a reference RS and the SRS may be indicated by one or more TCI states among TCI states configured in one or more PDSCH-configs in the ServingCellConfig of the additional Scell.

For the transmission power control of the PUSCH of additional Pcells and additional Scells, the UE may monitor the PDCCH of the additional Pcell for the tpc-PUSCH-RNTI of amg (i.e., tpc-PUSCH-RNTI in PhysicalCellGroupConfig in CellGroupConfig2 in the second RRCReconfiguration). The UE may determine the PUSCH TPC commands on the DCI addressed by the tpc-PUSCH-RNTI of amg and applies the command for PUSCH transmission on additional Pcell and on additional Scells.

For the transmission power control of the PUCCH of additional Pcells, the UE may monitor the PDCCH of the additional Pcell for the tpc-PUCCH-RNTI of amg (i.e., tpc-PUCCH-RNTI in PhysicalCellGroupConfig in CellGroupConfig2 in the second RRCReconfiguration). The UE may determine the PUCCH TPC commands on the DCI addressed by the tpc-PUCCH-RNTI of amg and applies the command for the PUCCH transmission on the additional Pcell.

The UE may determine the maximum transmission power for the PUSCH and the maximum transmission power for the PUCCH and the maximum transmission power of the SRS based on the p-NR-FR1 of amg (i.e., p-NR-FR1 in PhysicalCellGroupConfig in CellGroupConfig2 in the second RRCReconfiguration) and on the p-UE-FR1 of amg (i.e., p-UE-FR1 in PhysicalCellGroupConfig in CellGroupConfig2 in the second RRCReconfiguration).

For the transmission power control of the SRS of additional Pcell, the UE may monitor the PDCCH of the additional Pcell for the tpc-SRS-RNTI of amg (i.e., tpc-SRS-RNTI in PhysicalCellGroupConfig in CellGroupConfig2 in the second RRCReconfiguration). The UE may determine the SRS TPC commands for the additional Pcell on the DCI addressed by the tpc-SRS-RNTI of amg and applies the command for the SRS transmission on the additional Pcell.

MOBILITY_GROUP_SWITCH_RESPONSE_TRANSMISSION_ACTIVITIES are as follows. These activities may be performed in order.

///START///

The UE may trigger a MAC CE (e.g., a MAC CE for a mobility group switch, MOBILITY_GROUP_SWITCH_RESPONSE MAC CE) at a third point in time.

If the UL-SCH resources are available for a new transmission in an active UL BWP of an activated serving cell of the activated mobility group, and if the UL-SCH resources can accommodate a MAC CE(e.g., a MAC CE for a mobility group switch, MOBILITY_GROUP_SWITCH_RESPONSE MAC CE) plus its subheader, the UE generates a MAC CE (e.g., a MAC CE for a mobility group switch, MOBILITY_GROUP_SWITCH_RESPONSE MAC CE).

If the UL-SCH resources are available for a new transmission in an active UL BWP of an activated serving cell of the activated mobility group, and if the UL-SCH resources cannot accommodate a MAC CE(e.g., a MAC CE for a mobility group switch, MOBILITY_GROUP_SWITCH_RESPONSE MAC CE) plus its subheader and can accommodate a MAC CE(e.g., a MAC CE for a truncated mobility group switch, TRUNCATED_MOBILITY_GROUP_SWITCH_RESPONSE MAC CE) plus its subheader, the UE generates a MAC CE(e.g., a MAC CE for a truncated mobility group switch, TRUNCATED_MOBILITY_GROUP_SWITCH_RESPONSE MAC CE).

If the UL-SCH resources are available for a new transmission in an active UL BWP of an activated serving cell of the activated mobility group, and if the UL-SCH resources cannot accommodate a MAC CE(e.g., a MAC CE for a truncated mobility switch, TRUNCATED_MOBILITY_GROUP_SWITCH_RESPONSE MAC CE) plus its subheader, the UE may trigger the SR in the activated Pcell of the activated mobility group.

If the UL-SCH resources are not available for a new transmission in any of the active UL BWPs of the activated serving cell of the activated mobility group, the UE may trigger the SR in the activated Pcell of the activated mobility group.

If a MAC PDU is transmitted and this PDU includes a MAC CE (e.g., a MAC CE for a truncated mobility group switch, TRUNCATED_MOBILITY_GROUP_SWITCH_RESPONSE MAC CE) or a MAC CE (e.g., a MAC CE for a mobility group switch, MOBILITY_GROUP_SWITCH_RESPONSE MAC CE), the UE may cancel the pending SR and stop the corresponding sr-ProhibitTimer.

If no valid PUCCH resource is configured for the SR on the active UL BWP of the activated Pcell of the activated mobility group, the UE may initiate a Random Access procedure on the activated Pcell.

If a valid PUCCH resource is configured for the SR on the active UL BWP of the activated Pcell of the activated mobility group, the UE may perform the following actions when the UE has an SR transmission occasion on the valid PUCCH resource for the SR configured.

If the SR_COUNTER is smaller than the sr-TransMax, the UE may signal the SR on one valid PUCCH resource for SR and increments of the SR_COUNTER by 1 and start the sr-ProhibitTimer.

The UE may trigger the BSR and PHR for the MAC entity associated with the activated mobility group at the fourth point in time.

The UE may transmit the BSR and PHR in an active UL BWP of an active serving cell of the activated mobility group. If the activated mobility group is deactivated before the transmission of BSR and/or of PHR, the triggered BSR and/or PHR may be cancelled when the mobility group is deactivated.

If more than one of the SR configurations are configured, the UE may perform the following.

If at least one MAC CE (e.g., a MAC CE for a mobility group switch, MOBILITY_GROUP_SWITCH_RESPONSE MAC CE) is triggered, the UE may cancel the already triggered a MAC CE (e.g., a MAC CE for a mobility group switch, MOBILITY_GROUP_SWITCH_RESPONSE MAC CE) message, if any, and trigger a new MAC CE (e.g., a MAC CE for a mobility group switch, MOBILITY_GROUP_SWITCH_RESPONSE MAC CE) message.

If a MAC CE (e.g., a MAC CE for a mobility group switch, MOBILITY_GROUP_SWITCH_RESPONSE MAC CE) message has been triggered, and not cancelled, and if the UL-SCH resources are available for a new transmission and these UL-SCH resources can accommodate a MAC CE(e.g., a MAC CE for a mobility group switch, MOBILITY_GROUP_SWITCH_RESPONSE MAC CE) message plus its subheader as a result of logical channel prioritization, the UE may cancel the triggered a MAC CE (e.g., a MAC CE for a mobility group switch, MOBILITY_GROUP_SWITCH_RESPONSE MAC CE) message and generates a MAC CE(e.g., a MAC CE for mobility group switch MOBILITY_GROUP_SWITCH_RESPONSE MAC CE) message.

If a MAC CE (e.g., a MAC CE for a mobility group switch, MOBILITY_GROUP_SWITCH_RESPONSE MAC CE) message has been triggered, and not cancelled, and if the UL-SCH resources are not available for a new transmission, the UE may trigger a Scheduling Request for a MAC CE (e.g., a MAC CE for a mobility group switch, MOBILITY_GROUP_SWITCH_RESPONSE MAC CE) message without triggering the BSR.

The UE may apply a first SR configuration to the scheduling request procedure triggered for a MAC CE (e.g., a MAC CE for a mobility group switch, MOBILITY_GROUP_SWITCH_RESPONSE MAC CE) message.

The UE may be configured with one or more SR configurations. The first SR configuration may be selected from the one or more SR configurations implicitly or explicitly. The UE may perform a scheduling requestprocedure_for_scheduling_request_procedure_for_a MAC CE (e.g., a MAC CE for a mobility group switch, MOBILITY_GROUP_SWITCH_RESPONSE).

The first point of time is after a MAC CE (e.g., a MAC CE for a mobility group switch, MOBILITY_GROUP_SWITCH_REQUEST MAC CE) reception and before the n1 slot1s elapsed since the reception of the MAC CE (e.g., a MAC CE for a mobility group switch, MOBILITY_GROUP_SWITCH_REQUEST MAC CE). Alternatively, the first point of time is after HARQ feedback transmission for the MAC CE (e.g., a MAC CE for a mobility group switch, MOBILITY_GROUP_SWITCH_REQUEST MAC CE) starts and before the n2 slot3s elapsed since the end of the HARQ feedback transmission.

Upon receiving a MAC CE (e.g., a MAC CE for a mobility group switch, MOBILITY_GROUP_SWITCH_REQUEST MAC CE) in slot x, the UE shall be able to receive the PDCCH with the target TCI state (as indicated by the TCI state ID of the serving cell (as indicated by Serving Cell ID at the first slot that is after slot x+T_HARQ+(n3+n4)*slot_number_subframe)).

Upon receiving a MAC CE (e.g., a MAC CE for a mobility group switch, MOBILITY_GROUP_SWITCH_REQUEST MAC CE) in slot x, the UE shall be able to transmit the PUCCH/CSI with the target TCI state (as indicated by the TCI state ID) of the serving cell (as indicated by the Serving Cell ID) at the first PUCCH occasion that is after slot x+T_HARQ+(n3+n5)*slot_number_subframe.

Upon receiving a MAC CE(e.g., a MAC CE for a mobility group switch, MOBILITY_GROUP_SWITCH_REQUEST MAC CE) in slot x, the UE shall be able to transmit the SRS with the target TCI state (as indicated by the TCI state ID) of the serving cell (as indicated by the Serving Cell ID) at the first SRS occasion that is after slot x+T_HARQ+(n3+n4)*slot_number_subframe.

The target TCI state is indicated in the MAC CE (e.g., a MAC CE for a mobility group switch, MOBILITY_GROUP_SWITCH_REQUEST MAC CE).

The T_HARQ is the timing between the DL data transmission and acknowledgement. The T_HARQ is the number of slots between the PDSCH carrying (or MAC PDU including the MOBILITY_GROUP_SWITCH_REQUEST MAC CE) and the HARQ acknowledgement for the PDSCH (or the MAC PDU).

The slot_number_subframe is the number of slots per subframe in the BWP of the serving cell. The n3 is a constant representing the UE requirement on TCI state change. The n4 (T_first-SSB) is a variable representing the variable time until the first SSB is available. The n4 is determined based on the time to the first SSB transmission after the MAC CE is decoded by the UE. The n5 is a variable representing the variable time until the first PUCCH occasion after the first SSB is available.

Upon receiving the MAC CE (e.g., a MAC CE for a mobility group switch, MOBILITY_GROUP_SWITCH_REQUEST MAC CE) in slot x, the UE shall be able to perform an uplink transmission and downlink reception in the serving cells indicated in the MAC CE after (n3+n4) ms elapsed since the end of the HARQ feedback transmission for the MAC CE (e.g., a MAC CE for a mobility group switch, MOBILITY_GROUP_SWITCH_REQUEST MAC CE).

The second point of time is after the MAC CE (e.g., a MAC CE for a mobility group switch, MOBILITY_GROUP_SWITCH_REQUEST MAC CE) reception and before the m1 slot1s elapsed since the reception of the MAC CE. Alternatively, the second point in time is after the HARQ feedback transmission for the MAC CE (e.g., a MAC CE for a mobility group switch, MOBILITY_GROUP_SWITCH_REQUEST MAC CE) starts and before the m2 slot3s elapsed since the end of the HARQ feedback transmission.

Upon receiving the MAC CE (e.g., a MAC CE for a mobility group switch, MOBILITY_GROUP_SWITCH_REQUEST MAC CE) in slot x, the UE shall continue to receive the PDCCH with an old TCI state until slot x+T_HARQ+n3*slot_number_subframe and stop at slot x+T_HARQ+n3*slot_number_subframe.

Upon receiving the MAC CE (e.g., a MAC CE for a mobility group switch, MOBILITY_GROUP_SWITCH_REQUEST MAC CE) in slot x, the UE shall be able to transmit the PUCCH/CSI with an old TCI state until slot x+T_HARQ+n3*slot_number_subframe and stop at slot x+T_HARQ+n3*slot_number_subframe.

Upon receiving the MAC CE (e.g., a MAC CE for a mobility group switch, MOBILITY_GROUP_SWITCH_REQUEST MAC CE) in slot x, the UE shall be able to transmit the SRS with an old TCI state until slot x+T_HARQ+n3*slot_number_subframe and stop at slot x+T_HARQ+n3*slot_number_subframe.

Upon receiving the MAC CE (e.g., a MAC CE for a mobility group switch, MOBILITY_GROUP_SWITCH_REQUEST MAC CE) in slot x, the UE shall stop the uplink transmission and downlink reception when the n3 ms is elapsed, since the end of the HARQ feedback transmission for the MAC CE (e.g., a MAC CE for a mobility group switch, MOBILITY_GROUP_SWITCH_REQUEST MAC CE).

The third point in time is after the second point in time and before the k1 slot2s elapsed since the second point in time. Alternatively, the third point in time is after the HARQ feedback transmission for the MAC CE (e.g., a MAC CE for a mobility group switch, MOBILITY_GROUP_SWITCH_REQUEST MAC CE) starts and before the k2 slot3s elapsed since the end of the HARQ feedback transmission.

The fourth point in time is after the third point in time and before the h1 slot2s elapsed since the second point in time. Alternatively, the fourth point in time is after the HARQ feedback transmission for the MAC CE (e.g., a MAC CE for a mobility group switch, MOBILITY_GROUP_SWITCH_REQUEST MAC CE) starts and before the h2 slot3s elapsed since the end of the HARQ feedback transmission.

The following relations may be held.

$$n1 =< m1$$
$$n2 =< m2 =< k2 =< h2$$

The slot1 is the slot of the DL BWP where a MAC CE (e.g., a MAC CE for a mobility group switch, MOBILITY_GROUP_SWITCH_REQUEST MAC CE) may be received. The length of the slot1 may be determined by the SCS of the DL BWP.

The slot2 may be the slot of the DL BWP of the default PCell or the additional PCell. The length of the slot2 may be determined by SCS of the DL BWP.

The slot3 may be the slot of the UL BWP where the HARQ feedback for a MAC CE (e.g., a MAC CE for a mobility group switch, MOBILITY_GROUP_SWITCH_REQUEST MAC CE) may be transmitted. The length of the slot3 may be determined by the SCS of the DL BWP.

The priority of the logical channels and MAC CEs may be in the following order (highest priority is listed first).

The C-RNTI MAC CE or the data from the UL-CCCH;
the MAC CE (e.g., a MAC CE for a mobility group switch, MOBILITY_GROUP_SWITCH_RESPONSE MAC CE) or a MAC CE (e.g., a MAC CE for a truncated mobility group switch, TRUNCATED_MOBILITY_GROUP_SWITCH_RESPONSE MAC CE);
the Configured Grant Confirmation MAC CE or the MAC CEs for a BFR or a Multiple Entry Configured Grant Confirmation MAC CE;
the LBT failure MAC CE;
the MAC CE for a Timing Advance Report;
the MAC CE for a BSR, with an exception of the BSR included for padding;
a Single Entry PHR MAC CE or Multiple Entry PHR MAC CE;
the data from any Logical Channel (including a RRCReconfigurationComplete, except the data from the UL-CCCH;
a MAC CE for a Recommended bit rate query;
the MAC CE for the BSR included for padding.

The UECapabilityInformation may include the following L3 mobility related capability information and L2 mobility related capability information.

The L2mobilityIntraF indicates whether the UE supports intra-frequency L2 mobility. The intra-frequency L2 mobility refers to the case where the centre frequency of a default PCell and a centre frequency of an additional PCell may be the same.

The handoverFDD-TDD indicates whether the UE supports the HO (L3 mobility) between the FDD and the TDD. It may be mandated if the UE supports both the FDD and the TDD.

The L2mobilityFDD-TDD indicates whether the UE supports the L2 mobility between the FDD and the TDD. This parameter can only be set if the handoverFDD-TDD is supported and if the L2mobilityIntraF is supported. The L2 mobility between the FDD and the TDD refers to the case where one of a the default PCells and an additional PCell is the FDD and the TDD, respectively.

The handoverFR1-FR2 indicates whether the UE supports the HO between the FR1 and the FR2-1. Support is mandatory for the UE supporting both the FR1 and the FR2-1.

The L2mobilityFR1-FR2 indicates whether the UE supports the L2 mobility between the FR1 and the FR2-1. This parameter can only be set if the handoverFR1-FR2 is supported and if L2mobilityIntraF is supported. The L2 mobility between the FR1 and the FR2-1 refers to the case where one of the default PCells and an additional PCell is FR1 and theFR2-1, respectively.

The handoverFR1-FR2-2 indicates whether the UE supports the HO between the FR1 and the FR2-2.

The L2mobilityFR1-FR2-2 indicates whether the UE supports the L2 mobility between the FR1 and the FR2-2. This parameter can only be set if the handoverFR1-FR2-2 is supported and if the L2mobilityIntraF is supported. The L2 mobility between the FR1 and the FR2-2 refers to the case where one of the default PCells and an additional PCell is the FR1 and theFR2-2, respectively.

The handoverFR2-1-FR2-2 indicates whether the UE supports the HO between the FR2-1 and the FR2-2.

The L2mobilityFR2-1-FR2-2 indicates whether the UE supports the L2 mobility between the FR2-1 and the FR2-2. This parameter can only be set if the handoverFR2-1-FR2-2 is supported and if the L2mobilityIntraF is supported. The L2 mobility between the FR2-1 and the FR2-2 refers to the case where one of the default PCells and an additional PCell is FR2-1 and the FR2-2, respectively.

The handoverInterF indicates whether the UE supports inter-frequency HO.

The L2mobilityInterF indicates whether the UE supports inter-frequency L2 mobility. The inter-frequency L2 mobility refers to the case where the centre frequency of a default PCell and the centre frequency of an additional PCell are different.

The above parameters may be the per-UE parameter.

The GroupL2mobility indicates whether the UE supports a mobility group based L2 mobility for a bandCombination. The Mobility Group based L2 mobility for a bandCombination refers to the case where a default PCell and default SCells may be configured in a band combination and a additional PCell and additional SCells may be configured in the band combination (or part of the band combination).

The GroupL2mobility may be a per band combination parameter.

The RadioBearerConfig is used to add signalling radio bearers and data radio bearers. The RadioBearerConfig comprises of zero, one, or more SRB configurations and zero, one, or more DRB configurations. The SRB configuration may be comprised of a SRB identity and a PDCP-Config. The DRB configuration may be comprised of a DRB identity and a PDCP-Config.

A PDCP-Config may be used to set the configurable PDCP parameters for the PDCP entity of a radio bearer. The PDCP-Config may include parameters for the PDCP sequence number field and a parameter for the discard timer and other parameters.

The MasterKeyUpdate may be to provide parameters for security key derivation.

The MasterKeyUpdate may be comprised of the keySetChangeIndicator (indicating whether UE shall derive a new GNB security key) and the NextHopChainingCount (used to update the GNB security key).

The CellGroupConfig may be used to configure a master cell group (MCG) or a secondary cell group (SCG). A cell group may be comprised of one MAC entity and a set of logical channels with the associated RLC entities and a primary cell (SpCell) and one or more secondary cells (SCells). The CellGroupConfig may include the following fields: zero or one spCellConfig (i.e., serving cell configuration for a default PCell), zero, one, or more SCellConfig (i.e., serving cell configuration for a default SCell), one or more RLC-BearerConfig, a MAC-CellGroupConfig, a PhysicalCellGroupConfig, zero or one simultaneousU-TCI-UpdateList1, zero or one simultaneousU-TCI-UpdateList2, zero or one simultaneousU-TCI-UpdateList3, zero or one simultaneousU-TCI-UpdateList4.

A CellGroupConfig may also be used to configure a default mobility group.

A CellGroupConfig2 may be used to configure an additional mobility group. TheCellGroupConfig2 may include the following fields: zero or one spCellConfig (i.e., serving cell configuration for an additional PCell), zero, one, or more SCellConfig (i.e., serving cell configuration for an additional SCell), one or more RLC-BearerConfig, a MAC-CellGroupConfig, a PhysicalCellGroupConfig, zero or one simultaneousU-TCI-UpdateList1, zero or one simultaneousU-TCI-UpdateList2, zero or one simultaneousU-TCI-UpdateList3, zero or one simultaneousU-TCI-UpdateList4.

Alternatively, the CellGroupConfig2 may include the following fields: zero or one spCellConfig (i.e., serving cell configuration for an additional PCell), zero, one, or more SCellConfig (i.e., serving cell configuration for an additional SCell), zero or one simultaneousU-TCI-UpdateList1, zero or one simultaneousU-TCI-UpdateList2, zero or one simultaneousU-TCI-UpdateList3, zero or one simultaneousU-TCI-UpdateList4.

The simultaneousU-TCI-UpdateList1, simultaneousU-TCI-UpdateList2, simultaneousU-TCI-UpdateList3 and simultaneousU-TCI-UpdateList4 may be a list of serving cells which can be updated simultaneously for a TCI relation with a MAC CE. These different lists shall not contain the same serving cells. Each list may contain one or more ServCellIndex.

A RLC-BearerConfig may be used to configure an RLC entity and a corresponding logical channel in MAC, and the linking to a PDCP entity.

The RLC-BearerConfig may comprise a first identity and a second identity and a RLC-Config and a LogicalChannel-Config.

The first identity may be the logical channel identity. The first identity may be the identity corresponding to the rlc-Bearer. The second identity may be either a SRB identity or a DRB identity. The second identity may be the identity corresponding to the radio bearer that the rlc-Bearer is connected to.

The RLC-Config may be used to specify the RLC configuration. The RLC-Config may include the parameter for the RLC sequence number field and the parameter for the reassembly timer and other parameters.

The LogicalChannelConfig may be used to configure the logical channel parameters of a logical channel. The LogicalChannelConfig may include parameters for priority and prioritized bit rate and logical channel restrictions.

The MAC-CellGroupConfig may be used to configure the MAC parameters for a cell group (or mobility group), including the DRX. The mac-CellGroupConfig may be composed of a bsr-Config, a phr-Config, a drx-Config, and the likes.

The BSR-Config may be used to configure buffer status reporting. The BSR-Config may be comprised of the parameters for the periodic timer and the retransmission timer.

The DRX-Config may be used to configure the DRX related parameters. The DRX-Config may include the parameters for the DRX timers and the time domain offset.

The PHR-Config may be used to configure the parameters for the power headroom reporting. The PHR-Config may be comprised of the parameters for timers and a format (e.g., single entry format or multi entry format).

The PhysicalCellGroupConfig may be used to configure the cell-group specific (or mobility group specific) L1 parameters. The physicalCellGroupConfig may be comprised of a tpc-SRS-RNTI, a tpc-PUCCH-RNTI, a tpc-PUSCH-RNTI, a cs-RNTI, a mcs-C-RNTI, a p-UE-FR1, and a p-NR-FR1.

The cs-RNTI may be a RNTI value for the downlink SPS and the uplink configured grant.

The p-NR-FR1 may be the maximum total transmit power to be used by the UE in this NR cell group across all serving cells in the frequency range 1 (FR1).

The p-UE-FR1 may be the maximum total transmit power to be used by the UE across all serving cells in the frequency range 1 (FR1) across all cell groups.

The tpc-PUCCH-RNTI may be the RNTI used for the PUCCH TPC commands on the DCI.

The tpc-PUSCH-RNTI may be the RNTI used for the PUSCH TPC commands on the DCI.

The tpc-SRS-RNTI may be the RNTIused for the SRS TPC commands on the DCI.

The UE may adjust its uplink transmission power based on the TPC command on the DCI.

The DCI format 2_2 with the CRC scrambled by a TPC-PUCCH-RNTI, a TPC-PUSCH-RNTI, or a TPC-SRS-RNTI may carry a significant number of TPC commands. Each of the numerous TPC commands may be mapped to a specific UE.

The UE may adjust the PUCCH transmission power of the default PCell by the amount indicated in the TPC command included in the DCI format 2_2 with CRC scrambled by a first TPC-PUCCH-RNTI received in the default PCell.

The UE may adjust the PUSCH transmission power of a serving cell of dmg by the amount indicated in the TPC command included in the DCI format 2_2 with CRC scrambled by a first TPC-PUSCH-RNTI received in the serving cell.

The UE may adjust the SRS transmission power of a serving cell of dmg by the amount indicated in the TPC command included in the DCI format 2_2 with the CRC scrambled by a first TPC-SRS-RNTI received in the serving cell.

The UE may adjust the PUCCH transmission power of the additional PCell by the amount indicated in the TPC command included in the DCI format 2_2 with the CRC scrambled by a second TPC-PUCCH-RNTI received in the additional PCell.

The UE may adjust the PUSCH transmission power of a serving cell of amg by the amount indicated in the TPC command included in the DCI format 2_2 with CRC scrambled by a second TPC-PUSCH-RNTI received in the serving cell.

The UE may adjust the SRS transmission power of a serving cell of amg by the amount indicated in the TPC command included in the DCI format 2_2 with the CRC scrambled by a second TPC-SRS-RNTI received in the serving cell.

The first TPC-PUCCH-RNTI may be configured by (indicated in) the PhysicalCellGroupConfig of the first RRCReconfiguration.

The first TPC-PUSCH-RNTI may be configured by (indicated in) the PhysicalCellGroupConfig of the first RRCReconfiguration.

The first TPC-SRS-RNTI may be configured by (indicated in) the PhysicalCellGroupConfig of the first RRCReconfiguration.

The second TPC-PUCCH-RNTI may be configured by (indicated in) the PhysicalCellGroupConfig of the second RRCReconfiguration.

The second TPC-PUSCH-RNTI may be configured by (indicated in) the PhysicalCellGroupConfig of the second RRCReconfiguration.

The second TPC-SRS-RNTI may be configured by (indicated in) the PhysicalCellGroupConfig of the second RRCReconfiguration.

The spCellConfig may be the parameters for the SpCell of this cell group (PCell of MCG or PSCell of SCG). The spCellConfig may include the following fields: a servCellIndex, a ReconfigurationWithSync or a L2mobilityConfig, a SSB-MTC, and a ServingCellConfig.

The SCellConfig may be the parameters for the SCell. The spCellConfig may include the following fields: a sCellIndex, a ServingCellConfigCommon, a SSB-MTC, and a ServingCellConfig.

The SCellIndex may be a short identity to identify an SCell.

The ReconfigurationWithSync may be the parameters for the SpCell. If the spCellConfig in the CellGroupConfig in the RRCReconfiguration includes the ReconfigurationWithSync, the handover is initiated. The ReconfigurationWithSync may include the following fields: a ServingCellConfigCommon, a newUE-Identity, t304, and a rachConfigDedicated.

The newUE-Identity may indicate the C-RNTI to be used in the target cell (and in the new dmg) after the L3 handover.

The ReconfigurationWithSync may be the parameters for the default PCell.

The first C-RNTI may be the C-RNTI for dmg. The first C-RNTI may be the C-RNTI allocated to the default PCell. The first C-RNTI may be indicated in the RRCReconfiguration1.

The L2mobilityConfig may be the parameters for the additional PCell. The L2mobilityConfig may include the following fields: a ServingCellConfigCommon, a newUE-Identity, t3041, and a rach-ConfigDedicated.

The second C-RNTI may be the C-RNTI for amg. The second C-RNTImay be the C-RNTI allocated to the additional PCell. The second C-RNTI may be indicated in RRCReconfiguratino2.

The ServingCellConfigCommon may be used to configure the cell-specific parameters of a terminal's serving cell.

The servingCellConfigCommon may be comprised of parameters such as a ssb-PositionsInBurst, a SubcarrierSpacing, and other IEs.

The ssb-PositionsInBurst may indicate the time domain positions of the transmitted SS-blocks in a half frame with the SS/PBCH blocks. The first/leftmost bit may correspond to the SS/PBCH block index 0 and the second bit corresponds to the SS/PBCH block index 1 and so on. The value 0 in the bitmap may indicate that the corresponding SS/PBCH block is not transmitted while value 1 may indicate that the corresponding SS/PBCH block is transmitted.

The SubcarrierSpacing may indicate the subcarrier spacing of SSB.

The ServingCellConfigCommon may include one DownlinkConfigCommon and two UplinkConfigCommon. One UplinkConfigCommon may be for a NUL (normal uplink) and the other UplinkConfigCommon may be for a SUL (supplementary uplink). The UplinkConfigCommon for a SUL may be located after the UplinkConfigCommon is for a NUL.

The DownlinkConfigCommon may include a FrequencyInfoDL and a BWP-DownlinkCommon. The BWP-DownlinkCommon may be for the initial DL BWP and may include the PDCCH-ConfigCommon and the PDSCH-ConfigCommon.

The UplinkConfigCommon may include a FrequencyInfoUL, a TimeAlignmentTimer, and a BWP-UplinkCommon. The BWP-UplinkCommon may be for the initial UL BWP. The BWP-UplinkCommon may include the RACH-ConfigCommon, the PUSCH-ConfigCommon, the PUCCH-ConfigCommon, and numerous RACH-ConfigCommon-fc.

The DownlinkConfigCommon may be a common downlink configuration of the serving cell. It may consist of subfields such as a FrequencyInfoDL and a BWP-DownlinkCommon.

The FrequencyInfoDL may be a basic parameter of a downlink carrier. It may consist of subfields such as a frequency band list and carrier bandwidth for each SCS.

The BWP-DownlinkCommon may be the configuration of the second downlink IBWP. It may consist of subfields such as BWP, PDCCH-ConfigCommon, and PDSCH-ConfigCommon. The first IBWP may have a frequency domain corresponding to the first CORESET #0 of the MIB and may have subcarrier spacing indicated by the MIB. The first IBWP may be the IBWP indicated by the MIB and receiving 1, the second IBWP may be the IBWP indicated by the 1 and receiving the 2, paging, random access response message, and the like.

The BWP is the IE that may configure the general parameters of BWP. It may consist of subfields such as locationAndBandwidth which may indicate the bandwidth and location of the BWP, and subcarrierSpacing which may indicate the SCS of the BWP.

The ServingCellConfig may be used to configure the terminal with a serving cell.

The ServingCellConfig may be composed of terminal specific parameters and cell specific parameters. The ServingCellConfig may be composed of the configuration information for additional bandwidth parts. The terminal specific parameters may be composed of a csi-MeasConfig.

The ServingCellConfig may include a BWP-DownlinkDedicated (for the second initial downlink BWP),zero, one, or more BWP-Downlink IEs (for dedicate downlink BWPs), a UplinkConfig IE (for normal uplink), a UplinkConfig IE (for supplementary uplink), and a CSI-MeasConfig. The UplinkConfig IE may include a BWP-UplinkDedicated (for the second initial uplink BWP) and zero,one, or more BWP-Uplink IEs (for dedicate uplink BWPs).

A BWP-Downlink may consist of a BWP-Id IE, a BWP-DownlinkCommon IE, and a BWP-DownlinkDedicated IE.

A BWP-Uplink may consist of a BWP-Id IE, a BWP-UplinkCommon IE, and a BWP-UplinkDedicated IE.

A BWP-DownlinkDedicated may consist of a PDCCH-Config and a PDSCH-Config. The PDCCH-Config may be used to configure the UE specific PDCCH parameters such as control resource sets (CORESET), search spaces, and additional parameters for acquiring the PDCCH. The PDSCH-Config may be used to configure the UE specific PDSCH parameters.

A BWP-UplinkDedicated may consist of a PUCCH-Config, a PUSCH-Config, and a ul-TCIState. The PUCCH- Config may be used to configure the UE specific PUCCH parameters. The PUSCH-Config may be used to configure the UE specific PUSCH parameters.

The CSI-MeasConfig may be used to configure the following.
1: the CSI-RS (reference signals) belonging to the serving cell in which the CSI-MeasConfig is included; and
2: the channel state information reports to be transmitted on the PUCCH of the serving cell in which the CSI-MeasConfig is associated with; and
3: the channel state information reports on the PUSCH triggered by the DCI received on the serving cell in which CSI-MeasConfig is associated with.

The CSI-MeasConfig may include the following fields: a csi-ReportConfigToAddModList (including one or more csi-ReportConfig), a csi-ResourceConfigToAddModList (including one or more csi-ResourceConfig), a nzp-CSI-RS-ResourceSetToAddModList (including one or more nzp-CSI-RS-ResourceSet), and a nzp-CSI-RS-ResourceToAddModList (including one or more nzp-CSI-RS-Resource and other fields).

The CSI-ReportConfig may be used to configure the following.
1: a periodic or semi-persistent report sent on the PUCCH on the cell in which the CSI-ReportConfig is associated with; or
2: a semi-persistent or aperiodic report sent on the PUSCH triggered by the DCI received on the cell in which the CSI-ReportConfig is associated with.

The CSI-ReportConfig may include the following fields.

The reportConfigId field may indicate the identity of the CSRI-ReportConfig (or CSI report setting).

The carrier field may indicate in which serving cell the CSI-ResourceConfigs are to be found. If the field is absent, the resources may be on the same serving cell as this report configuration.

The cqi-FormatIndicator field may indicate whether the UE shall report a single (wideband) or multiple (subband) CQI.

The nrofReportedRS field may indicate the number (N) of measured RS resources to be reported per report setting in a non-group-based report.

The p0alpha may indicate the index of the p0-alpha set determining the power control for this CSI report transmission.

The reportConfigType may indicate the time domain behavior of the reporting configuration. It may have a choice structure between periodic and semiPersistentOnPUCCH, and semiPersistentOnPUSCH and aperiodic.

The reportFreqConfiguration may indicate the Reporting configuration in the frequency domain.

The resourcesForChannelMeasurement may indicate a CSI-ResourceConfigId. It may have the resources for channel measurement. It may be the csi-ResourceConfigId of a CSI-ResourceConfig included in the configuration of the serving cell indicated with the field "carrier" above. The CSI-ResourceConfig indicated here may contain only NZP-CSI-RS resources and/or SSB resources. This CSI-ReportConfig may be associated with the DL BWP indicated by bwp-Id in that CSI-ResourceConfig.

The pucch-Resource may be a PUCCH resource for the associated uplink BWP.

Only a PUCCH-Resource of format 2, 3 and 4 is supported. The actual PUCCH-Resource may be configured in a PUCCH-Config and referred to by its ID.

The CSI-ResourceConfig may define a group of one or more NZP-CSI-RS-ResourceSet, CSI-IM-ResourceSet, and/or CSI-SSB-ResourceSet. It may include the following fields: csi-ResourceConfigId, csi-RS-ResourceSetList (including one or more NZP-CSI-RS-ResourceSetIds and others), bwp-Id.

The NZP-CSI-RS-ResourceSet may be a set of Non-Zero-Power (NZP) CSI-RS resources (their IDs), and set-specific parameters. It may include repetition (indicating whether repetition is on/off), trs-Info (indicating that the antenna port for all NZP-CSI-RS resources in the CSI-RS resource set is same), and one or more nzp-CSI-RS-Resources.

The NZP-CSI-RS-Resource may be used to configure Non-Zero-Power (NZP) CSI-RS transmitted in the cell where the IE is included and in which the UE may be configured to measure on. It may include the NZP-CSI-RS-ResourceId, periodicityAndOffset, powerControlOffset, qcl-InfoPeriodicCSI-RS, and resourceMapping The qcl-InfoPeriodicCSI-RS may contain a reference to one TCI-State in the TCI-States for providing the QCL source and QCL type. For the periodic CSI-RS, the source can be SSB or another periodic-CSI-RS.

The resourceMapping may indicate the OFDM symbol locations in a slot and the subcarrier occupancy in a PRB of the CSI-RS resource.

The PDSCH-Config may be used to configure the UE specific PDSCH parameters.

It may include the following fields.

The dataScramblingIdentityPDSCH may indicate the Identifier used to initialize data scrambling (c_init) for the PDSCH.

The maxMIMO-Layers may indicate the maximum number of MIMO layers to be used for the PDSCH in this DL BWP. If not configured, the UE may use the maxMIMO-Layers configuration in the IE PDSCH-ServingCellConfig of the serving cell to which this BWP belongs, when the UE operates in this BWP.

The tci-StatesToAddModList may be a list of Transmission Configuration Indicator (TCI) states indicating a transmission configuration which may include the QCL-relationships between the DL RSs in one RS set and the PDSCH DMRS ports. A TCI-State may include the following IEs: a TCI-StateId and one or two QCL-Info.

The QCL-Info IE may include a mobilityGroupIndicator-field (indicating UE's mobility group which the referenceSignal is configured), a cell field (indicating UE's serving cell in which the referenceSignal is configured), a bwp-Id field (indicating the DL BWP which the RS is located in), and a referenceSignal (indicating reference signal with which quasi-collocation information is provided). The referenceSignal field may include either a NZP-CSI-RS-ResourceId or a SSB-Index.

A QCL-Info may be associated with a referenceSignal and may correspond to a TCI-State.

If the mobilityGroupIndicator is absent, it may apply to the mobility group in which the TCI-State is configured.

If the cell is absent, it may apply to the serving cell in which the TCI-State is configured.

The mobility group in which the TCI state is configured may be the mobility group which is configured by a CellGroupConfig2. The CellGroupConfig2 may include a ServingCellConfig. The ServingCellCofnig may include a BWP-DownlinkDedicated. The BWP-DownlinkDedicated may include a PDSCH-Config. The PDSCH-Config may include a tci-stateToAddModList. The tci-stateToAddModList may include a TCI-State IE corresponding to the TCI-State.

The serving cell in which the TCI state is configured may be the serving cell configured by a ServingCellConfig. The ServingCellCofnig may include a BWP-DownlinkDedicated. The BWP-DownlinkDedicated may include a PDSCH-Config. The PDSCH-Config may include a tci-stateToAddModList. The tci-stateToAddModList may include a TCI-State IE corresponding to the TCI-State.

The SSB-MTC may be used to configure measurement timing configurations, i.e., timing occasions at which the terminal measures SSBs. The SSB-MTC may be composed of a periodicityAndOffset and a duration.

The duration may indicate the duration of the measurement window in which to receive SS/PBCH blocks.

The periodicityAndOffset may indicate the periodicity and offset of the measurement window in which to receive SS/PBCH blocks.

For each mobility group, the UE may be configured with zero or more SR configurations.

Each SR configuration may correspond to one or more logical channels and/or to SCell beam failure recovery and/or to a MAC CE, (e.g., a MAC CE for a mobility group switch, MOBILITY_GROUP_SWITCH_RESPONSE MAC CE). For each logical channel, the SCell beam failure recovery may be mapped to zero or one SR configuration, which is configured by the RRC. A MAC CE (e.g., a MAC CE for a mobility group switch, MOBILITY_GROUP_SWITCH_RESPONSE MAC CE) may be mapped to at least one SR configuration. The SR configuration of the logical channel that triggered a BSR or the SCell beam failure recovery or a MAC CE (e.g., a MAC CE for a mobility group switch, MOBILITY_GROUP_SWITCH_RESPONSE MAC CE) may be considered as the corresponding SR configuration for the triggered SR.

A scheduling_request_procedure_for a mobility group switch response (e.g.,_MOBILITY_GROUP_SWITCH_RESPONSE) may be as follows.

If an SR is triggered by a MAC CE (e.g., a MAC CE for a mobility group switch, MOBILITY_GROUP_SWITCH_RESPONSE MAC CE) and there are no other SRs pending correspondence to the same SR configuration, the UE/MAC entity shall set the SR_COUNTER of the corresponding SR configuration to 0.

When an SR is triggered, it shall be considered as pending until it is cancelled.

If the SR is triggered by a MAC CE (e.g., a MAC CE for a mobility group switch, MOBILITY_GROUP_SWITCH_RESPONSE MAC CE) and a MAC PDU is transmitted and the MAC PDU includes a Type2Gap L2 request, the UE may cancel the pending SR and stop the sr-ProhibitTimer.

Only the PUCCH resources on a BWP which is active at the time of SR transmission occasion may be considered valid.

If the MAC entity/UE has no valid PUCCH resource configured for the pending SR, the UE may initiate a Random Access procedure on the SpCell (an additional PCell) during the second period, default PCell during the first period and the third period and cancel the pending SR.

If the MAC entity/UE has a valid PUCCH resource configured for the pending SR and if the sr-ProhibitTimer is not running at the time of the SR transmission occasion for the SR configured and if the PUCCH resource for the SR transmission occasion does not overlap with a measurement gap and if the SR_COUNTER is smaller than the sr-TransMax, the UE may perform the following actions; the UE may signal the SR on one valid PUCCH resource for the SR and the UE increments SR_COUNTER by 1 and the UE may start the sr-ProhibitTimer.

The valid PUCCH resource configured for the SR triggered by a MAC CE (e.g., a MAC CE for a mobility group switch, MOBILITY_GROUP_SWITCH_RESPONSE MAC CE) may be the PUCCH resource on the active UL BWP and associated with the SR configuration selected for a MAC CE (e.g., a MAC CE for a mobility group switch, MOBILITY_GROUP_SWITCH_RESPONSE MAC CE).

During the second period, the UE may apply a SR configuration selected from the SR configurations in the MAC-CellGroupConfig in the CellGroupConfig2 in RRCReconfiguation2 (i.e. SR configurations configured for the amg).

During the first period and the third period, the UE may apply a SR configuration selected from the SR configurations in the MAC-CellGroupConfig in the CellGroupConfig in the RRCReconfiguation1 (i.e. one of SR configurations configured for the dmg).

The MAC-CellGroupConfig may be used to configure. the MAC parameters for a cell group, including the DRX and the SR configurations.

The MAC-CellGroupConfig may include a schedulingRequestToAddModList field (List of Scheduling Request configurations to add or modify), a schedulingRequestToReleaseList field (List of Scheduling Request configurations to release), a schedulingRequestID-BFR-SCell field (the scheduling request configuration applicable for BFR on SCell), and a schedulingRequestID-MGS field(the scheduling request configuration applicable for a MAC CE (e.g., a MAC CE for a mobility group switch, MOBILITY_GROUP_SWITCH_RESPONSE MAC CE)). The SchedulingRequestID-BFR-SCell field and the schedulingRequestID-MGS field may include corresponding SchedulingRequestIDs respectively.

The schedulingRequestToAddModList field may comprise of one or more SchedulingRequestToAddMod IEs.

A SchedulingRequestToAddMod IE may comprise of the following fields: schedulingRequestId, sr-ProhibitTimer (Prohibit timer for SR transmission on PUCCH), and sr-TransMax (Maximum number of SR transmissions).

The schedulingRequestToReleaseList field may comprise of one or more schedulingRequestIds.

The PUCCH-Config may be used to configure the UE specific PUCCH parameters (per BWP).

The PUCCH-Config may comprise of the following fields.

A resourceSetToAddModList field (Lists for adding PUCCH resource sets); comprising of one or more PUCCH-ResourceSet and a resourceSetToReleaseList field (Lists for releasing PUCCH resource sets); comprising of one or more PUCCH-ResourceSetId and a spatialRelationInfoToAddModList field (Configuration of the spatial relation between a reference RS and PUCCH); comprising of one or more PUCCH-SpatialRelationInfo and a spatialRelationInfo-ToReleaseList field (Lists of spatial relation configurations between a reference RS and PUCCH to be released by the UE); comprising of one or more PUCCH-SpatialRelationInfold.

A resourceToAddModList field (Lists for adding PUCCH resources applicable for the UL BWP and a serving cell in which the PUCCH-Config is defined); comprising of one or more PUCCH-Resource and a resourceToReleaseList field (Lists for releasing PUCCH resources applicable for the UL BWP and serving cell in which the PUCCH-Config is defined); comprising of one or more PUCCH-ResourceId.

A schedulingRequestResourceToAddModList field (List for adding the scheduling request resource for the UL BWP and a serving cell in which the PUCCH-Config is defined)

and a schedulingRequestResourceToReleaseList field (List for releasing the scheduling request resource for the UL BWP and a serving cell in which the PUCCH-Config is defined).

The SchedulingRequestResourceConfig may determine the physical layer resources on a PUCCH where the UE may send the dedicated scheduling request. A SchedulingRequestResourceConfig may be associated with a SchedulingRequestConfig. A SchedulingRequestResourceConfig may comprise of the following fields.

The schedulingRequestResourceId field (used to identify the scheduling request resources on PUCCH), the schedulingRequestID field (The ID of the SchedulingRequestConfig that uses this scheduling request resource), the periodicityAndOffset (the SR periodicity and offset in number of symbols or slots) and the resource (ID of the PUCCH resource in which the UE shall send the scheduling request).

The actual PUCCH-Resource may be configured in the PUCCH-Config of the same UL BWP and a serving cell as this SchedulingRequestResourceConfig.

The PUCCH-ResourceSet may comprise of the following fields. A pucch-ResourceSetId field and a resourceList field (one or more PUCCH-ResourceId).

The PUCCH-Resource may comprise of the following fields. A pucch-ResourceId field (Identifier of the PUCCH resource), a startingPRB field, a nrofSymbols field (the number of symbols used per PUCCH resource), and a nrofPRBs field (the number of PRBs used per PUCCH resource).

The PUCCH-SpatialRelationInfo may be used to configure the spatial setting for PUCCH transmission and the parameters for the PUCCH power control. The PUCCH-SpatialRelationInfo may comprise of the following fields: pucch-SpatialRelationInfoId, servingCellId, referenceSignal and pucch-PathlossReferenceRS-Id.

The ServingCellId field may indicate the serving cell where the referenceSignal is configured. If this field is absent, the UE may apply the ServCellId of the serving cell in which this PUCCH-SpatialRelationInfo is configured.

The ReferenceSignal field may indicate a SSB-Index or a NZP-CSI-RS-ResourceId.

The pucch-PathlossReferenceRS-Id field may indicate the pucch-PathlossReferenceRS to be used for PUCCH power control.

A spatial setting for a PUCCH transmission by a UE may be provided by a PUCCH-SpatialRelationInfo.

The DCI format 1_0 may be used for the scheduling of the PDSCH in one DL cell. The following information may be transmitted by means of the DCI format 1_0 with the CRC scrambled by the P-RNTI. Short Messages Indicator, Short Messages, Frequency domain resource assignment, Time domain resource assignment, and other information.

The Short Messages may be transmitted on PDCCH using the P-RNTI with or without the associated Paging message using the Short Message field in the DCI format 1_0.

The table below defines these Short Messages. Bit 1 is the most significant bit.

TABLE 5

| Bit | Short Message |
|---|---|
| 1 | systemInfoModification<br>If set to 1: indication of a BCCH modification other than SIB6, SIB7 and SIB8. |
| 2 | etwsAndCmasIndication<br>If set to 1: indication of an ETWS primary notification and/or an ETWS secondary notification and/or a CMAS notification. |

TABLE 5-continued

| Bit | Short Message |
|---|---|
| 3 | stopPagingMonitoring<br>This bit can be used for only operation with shared spectrum channel access and if nrofPDCCH-MonitoringOccasionPerSSB-InPO is present. |
| 4 | systemInfoModification-eDRX<br>If set to 1: indication of a BCCH modification other than SIB6, SIB7 and SIB8. This indication applies only to UEs using eDRX cycle longer than the BCCH modification period. |
| 5-8 | Not used in this release of the specification, and shall be ignored by UE if received. |

The MAC CE (e.g., a MAC CE for a mobility group switch, MOBILITY_GROUP_SWITCH_REQUEST MAC CE) may comprise a MOBILITY_GROUP_ID_FIELD, a RAMDOM_ACCESS_REQUIRED_FIELD, and one or more TCI_STATE_FIELD_GROUP_FIELD_FIELDs.

The MOBILITY_GROUP_ID_FIELD may indicate the identity of the mobility group for which the MAC CE (e.g., a MAC CE for a mobility group switch, MOBILITY_GROUP_SWITCH_REQUEST MAC CE) applies. The MOBILITY_GROUP_ID_FIELD may indicate the identity of the target mobility group for L2 mobility. The value 0 may correspond to the default mobility group (or default PCell).

Other values may correspond to additional mobility groups (or additional PCells). The RAMDOM_ACCESS_REQUIRED_FIELD may indicate whether the Random Access procedure is to be performed in the PCell of the mobility group to be activated (default PCell if dmg is activated and additional PCell if amg is activated).

A TCI_STATE_FIELD_GROUP_FIELD may comprise of a SERVING_CELL_ID_FIELD, a DL_BWP_ID field, a UL_BWP_ID field, and one or two TCI_state_ID fields.

The SERVING_CELL_ID_FIELD may indicate the identity of the Serving Cell that are activated upon the mobility group switching and for which the DL_BWP_ID field, the UL_BWP_ID field, and one or two TCI_state_ID fields applies.

The DL_BWP_ID field may indicate a DL BWP that is first active upon the mobility group switching and the DL BWP for which the corresponding TCI state applies. The UL_BWP_ID field may indicate a UL BWP that is first active upon mobility group switching and the UL BWP for which the corresponding TCI state applies.

If the two TCI_state_ID fields are included, the first TCI_state_ID field may indicate the TCI state of the DL BWP indicated by the DL_BWP_ID field and the second TCI_state_ID field may indicate the TCI state of the UL BWP indicated by the UL_BWP_ID

FIELD

If a TCI_state_ID fields is included, the TCI_state_ID field may indicate the joint TCI state of the DL BWP indicated by the DL_BWP_ID field and the UL BWP indicated by the UL_BWP_ID field.

The first MAC CE may be a MAC CE (e.g., a MAC CE for a mobility group switch, MOBILITY_GROUP_SWITCH_REQUEST MAC CE) instructing a mobility group switch from a amg to a dmg (or L2 switch from an additional PCell to a default PCell).

The second MAC CE may be a MAC CE (e.g., a MAC CE for a mobility group switch, MOBILITY_GROUP_SWITCH_REQUEST MAC CE) instructing a mobility group switch from a dmg to a amg (or L2 switch from a default PCell to an additional PCell).

The MAC CE (e.g., a MAC CE for a mobility group switch, MOBILITY_GROUP_SWITCH_RESPONSE MAC CE) may comprise a MOBILITY_GROUP_ID_FIELD and one or more echoed_TCI_STATE_FIELD_GROUP_FIELDs.

The MOBILITY_GROUP_ID_FIELD may indicate the identity of the source (old) mobility group from which the mobility group switch take place. The MOBILITY_GROUP_ID_FIELD may indicate the identity of the source mobility group for L2 mobility. The value 0 may correspond to the default mobility group (or default PCell).

Other values may correspond to additional mobility groups (or additional PCell).

An echoed_TCI_STATE_FIELD_GROUP_FIELD may comprise a SERVING_CELL_ID_FIELD, a DL_BWPTID field, a UL_BWP_ID field, and one or two TCI_state_ID fields. The echoed_TCI_STATE_FIELD_GROUP_FIELD may contain the TCI_STATE_FIELD_GROUP_FIELD received in the MAC CE (e.g., a. MAC CE for a mobility group switch, MOBILITY_GROUP_SWITCH_REQUEST MAC CE).

Alternatively, the MAC CE (e.g., a MAC CE for a mobility group switch, MOBILITY_GROUP_SWITCH_RESPONSE MAC CE) may comprise a MOBILITY_GROUP_ID_FIELD and zero, one, or more RS_ID field groups.

A RS_ID field group may comprise of a SERVING_CELL_ID_FIELD, a DL_BWP_ID field, a UL_BWP_ID field, and one or two RS_ID fields.

The RS_ID field may be set to the index of an SSB (of the corresponding serving cell) with best SS-RSRP (or SS-RSRP) above a configured threshold.

The MAC CE (e.g., a MAC CE for a truncated mobility group switch, TRUNCATED_MOBILITY_GROUP_SWITCH_RESPONSE MAC CE) may comprise a MOBILITY_GROUP_ID_FIELD and one echoed_TCI_STATE_FIELD_GROUP_FIELDs. The echoed_TCI_STATE_FIELD_GROUP_FIELD may be the one associated with the PCell.

Alternatively, the MAC CE (e.g., a MAC CE for a truncated mobility group switch, TRUNCATED_MOBILITY_GROUP_SWITCH_RESPONSE MAC CE) may comprise a MOBILITY_GROUP_ID_FIELD and one RS_ID field groups. The echoed_TCI_STATE_FIELD_GROUP_FIELD may be the one associated with the Pcell.

The Scell Activation/Deactivation MAC may beidentified by a MAC subheader with a LCID. It may have a fixed size and consist of a single octet containing seven C-fields and one R-field.

The Ci field may indicate the activation/deactivation status of the Scell with ScellIndex i. The Ci field may be set to 1 to indicate that the Scell with ScellIndex I shall be activated. The Ci field may be set to 0 to indicate that the sCell with sCellIndex i shall be deactivated.

Upon activation of a sCell, the UE may activate a BWP indicated as the firstActiveBwp of a sCell in a RRCReconfiguration message. The RRCReconfiguration message may include the configuration information of the sCell.

Upon L3 mobility, the UE may activate a BWP as firstActiveBWP of the target pCell in the RRCReconfiguration message1.

Upon L2 mobility, the UE may activate a BWP indicated in a MAC CE (e.g., a MAC CE for a mobility group switch, MOBILITY_GROUP_SWITCH_REQUEST MAC CE).

A scrambling sequence may be applied to the PUSCH transmission. The scrambling sequence may be generated by the scrambling sequence generator. The scrambling sequence generator may be initialed by C_init. C_init is the binary sum (or concatenation of n_ID and n_RNTI).

For a PUSCH in an uplink BWP b of a serving cell s of dmg;
  n_ID may equal the dataScramblingIdentityPUSCH_b_s_dmg if a dataScramblingIdentityPUSCH IE is included in (or is configured by) PUSCH-Config of the BWP b of the serving cells of the dmg. The dataScramblingIdentityPUSCH_b_s_dmg may be indicated by the dataScramblingIdentityPUSCH IE in PUSCH-Config of the BWP b of the serving cell s of the dmg.
  n_ID may equal the physical layer cell identity (PCI of the serving cell s of the dmg if a dataScramblingIdentityPUSCH IE is not included in (or is not configured by PUSCH-Config of the BWP b of the serving cell s of the dmg).
  n_RNTI may equal the C-RNTI of dmg (or C-RNTI of default pCell).

For a PUSCH in an uplink BWP b of a serving cell s of amg;
  n_ID may equal the dataScramblingIdentityPUSCH_b_s_amg if a dataScramblingIdentityPUSCH IE is included in (or is configured by) PUSCH-Config of the BWP b of the serving cells of the amg. The dataScramblingIdentityPUSCH_b_s_amg may be indicated by the dataScramblingIdentityPUSCH IE in PUSCH-Config of the BWP b of the serving cell s of the amg.
  n_ID may equal the physical layer cell identity (PCI) of the serving cells of the amg if a dataScramblingIdentityPUSCH IE is not included in (or is not configured by) PUSCH-Config of the BWP b of the serving cells of the amg.
  n_RNTI may equal the C-RNTI of amg (or C-RNTI of additional pCell) if the C-RNTI is included in (or is configured by) L2mobilityConfig for amg.
  n_RNTI may equal the C-RNTI of dmg (or C-RNTI of default pCell) if the C-RNTI is not included in (or is not configured by) L2mobilityConfig for amg.

A SRS configuration may be provided for each UL BWP. A SRS configuration may be included in a BWP-DedicatedUplink of a serving cell of a mobility group. The SRS configuration may consist of one or more SRS-ResourceSets (hereinafter, SRS resource set).

One SRS resource set may consist of one or more SRS-Resources (hereinafter, SRS resource).

The SRS resource may be defined by the srs-ResourceId (SRS resource identifier), startPosition, nrofSymbols, freqDomainShift, freqHopping, periodicityAndOffset, spatialRelationInfo, and the like.

The startPosition and nrofSymbols may indicate the start position of a symbol in which the SRS is transmitted and the number of symbols in which SRS is transmitted in the SRS slot.

The freqDomainShift and freqHopping may define the frequency resource through which the SRS is transmitted in relation to the frequency domain of the corresponding BWP.

The periodicityAndOffset may indicate the periodicity and the slot at which the SRS slot starts. The SRS slot may mean a slot in which a SRS resource is configured or a slot in which a SRS is transmitted.

The spatialRelationInfo may define a spatial domain transmission filter to be applied to SRS transmission and may be set to a downlink reference signal index of a serving cell, an SSB index of a neighboring cell, and the like. The spatialRelationInfo is set always to serving the cell index as 0 (i.e., pCell for RRC_INACTIVE UE). Any serving cell index or neighboring cell can be used for RRC_CONNECTED.

The SRS resource set may consist of a SRS resource set identifier, SRS resource identifier list, ResourceType, alpha, p0, pathlossReferenceRS and a followUnifiedTCIstateSRS.

The followUnifiedTCIstateSRS may be enumerated with a single value. If this field is present (or set to enabled) for a SRS resource set, the UE may apply to the SRS resource set (or SRS resource of the SRS resource set) associated with one or more TCI states indicated in a PDSCH-config.

If this field is absent for a SRS resource set, the UE may apply to the SRS resources of the SRS resource set by a spatialRelationInfo indicated in the SRS resource.

The SRS resource identifier list is the list of SRS resource identifiers composing the SRS resource set.

The ResourceType may indicate one of "periodic" and "semi-persistent" and "aperiodic". In the present disclosure, a semi-persistent SRS resource set may be described as an example. For the SRS resource set of which ResourceType is indicated as semi-persistent, the SRS transmission of SRS resource set may start only after a specific control message instructs transmission. Only the periodic or semi-persistent are applicable for the UE in the RRC_INACTIVE.

alpha, p0 and pathlossReferenceRS may be the parameters for transmission power control of SRS. alpha and p0 may be the power offsets that are added when determining SRS transmission power, and pathlossReferenceRS may be a reference signal that provides a path loss when determining SRS transmission power.

At some point of time, the UE may receive a SRS Activation/Deactivation MAC CE instructing to start transmission of a specific SRS resource set from the GNB. The UE may activate/deactivate the SRS resource set of the mobility group where the MAC CE is received.

The SRS Activation/Deactivation MAC CE may consist of an A/D field, a Cell ID field, a BWP ID field, a SUL field, and a SRS Resource Set ID.

The A/D field may indicate whether to activate or deactivate the indicated SRS resource set.

The Cell ID field may indicate the identifier of the serving cell to which the SRS resource set to be activated/deactivated belongs. The serving cell may be the cell of the mobility group where the MAC CE is received. The serving cell may be the cell of the currently active mobility group. The serving cell may be one of the currently active serving cells.

The BWP ID field may indicate the identifier of the BWP to which the SRS resource set to be activated/deactivated belongs.

The SUL field may indicate whether the MAC CE is applied to a NUL carrier configuration or a SUL carrier configuration. Or it may indicate whether the activated or deactivated SRS resource set is an SRS resource set of SUL or an SRS resource set of NUL.

The SRS Resource Set ID field may be an identifier of the SRS resource set to be activated or deactivated.

NUL may be the normal uplink and SUL may be the supplementary uplink. One serving cell may only have NUL or may have both, NUL and SUL. The SUL may be configured in the low frequency band comparing to the NUL to increase the uplink coverage of the cell.

The UE may transmit a SRS in the activated SRS resource set. The UE may transmit the SRS from the SRS resources belonging to the SRS resource set by applying the transmission power control parameter of the SRS resource set. The SRS resources may be periodically generated according to the periodicityAndOffset.

The IE PUSCH-Config may be used to configure the UE specific PUSCH parameters applicable to a BWP.

It may consist of the dataScramblingIdentityPUSCH field, pusch-PowerControl field, pusch-TimeDomainAllocationList field, mcs-Table field, frequencyHopping field, and others.

The dataScramblingIdentityPUSCH field may indicate an identifier used to initalize data scrambling (c_init for PUSCH). If the field is absent, the UE may apply the physical cell ID.

The mcs-Table field may indicate which MCS table the UE shall use for PUSCH. If the field is absent, the UE may apply the value 64QAM.

The frequencyHopping may indicate the frequency hopping scheme to be applied. The value intraSlot may enable 'Intra-slot frequency hopping' and the value interSlot may enable 'Inter-slot frequency hopping'. If the field is absent, the frequency hopping may not be configured.

PUSCH-PowerControl may be used to configure the UE specific power control parameter for PUSCH. It may consist of p0-AlphaSets field and p0-NominalWithoutGrant field.

The p0-AlphaSets field may include numerous p0-PUSCH-AlphaSet IEs. A p0-PUSCH-AlphaSet IE may be composed of a p0-PUSCH-AlphaSetId field and a p0 field.

The p0 field may indicate a P0 value for PUSCH with the grant (except msg3) in steps of 1 dB. When the field is absent, the UE may apply the value 0.

The p0-NominalWithoutGrant field may indicate a P0 value for the UL grant-free PUSCH (configured grant based PUSCH).

The UE may monitor the PDCCH addressed by a C-RNTI based at least in part on a SearchSpace indicated in a PDCCH-config of the currently active DL BWP of a serving cell.

The UE may perform a PUSCH transmission based on the PUSCH-Config and the PUSCH-ConfigCommon of the currently active UL BWP of a serving cell.

The C-RNTI may be the first C-RNTI if the current PCell is the default PCell (and the current mg is dmg).

The C-RNTI may be the second C-RNTI if the current PCell is the additional PCell (and the current mg is amg) and the second C-RNTI is indicated in the second RRCReconfiguration.

The C-RNTI may be the first C-RNTI if the current PCell is the additional PCell (and the current mg is amg) and the second C-RNTI is not indicated in the second RRCReconfiguration.

The PDCCH-config may be the one indicated in the first RRCReconfiguration if the current PCell is the default PCell (and the current mg is dmg).

The PDCCH-config may be the one indicated in the second RRCReconfiguration if the current PCell is the additional PCell (and the current mg is amg).

The PUSCH-config may be the one indicated in the first RRCReconfiguration if the current PCell is the default PCell (and the current mg is dmg).

The PUSCH-config may be the one indicated in the second RRCReconfiguration if the current PCell is the additional PCell (and the current mg is amg).

The PUSCH-configCommon may be the one indicated in the first RRCReconfiguration if the current PCell is the default PCell (and the current mg is dmg).

The PUSCH-configCommon may be the one indicated in the second RRCReconfiguration if the current PCell is the additional PCell (and the current mg is amg).

The serving cell may be the default PCell if the current PCell is the default PCell (and the current mg is dmg).

The serving cell may be the additional PCell if the current PCell is the additional PCell (and the current mg is amg).

Upon receiving the DCI including uplink grant in a serving cell of a mg, the UE may determine the time domain relationship between the PDCCH and the PUSCH based at least in part on Z.

If the pusch-TimeDomainResourceAllocationList is included in a PUSCH-Config of active UL BWP of the serving cell of the mg, Z may be the pusch-TimeDomain-ResourceAllocationList in the PUSCH-Config.

If the pusch-TimeDomainResourceAllocationList is not included in a PUSCH-Config of active UL BWP of the serving cell of the mg and the pusch-TimeDomainResourceAllocation is included in a PUSCH-ConfigCommon of the serving cell of the mg, Z may be the pusch-TimeDomainResourceAllocationList in the PUSCH-ConfigCommon.

If the pusch-TimeDomainResourceAllocationList is not included in the PUSCH-ConfigCommon of the serving cell of the mg and the pusch-TimeDomainResourceAllocationList is not included in the PUSCH-Config of active uplink BWP of the serving cell of the mg, Z may be the default PUSCH time domain resource allocation table.

The UE may determine the uplink transmission power of PUSCH based at least in part on a P0-PUSCH and a Alphaincluded in the PUSCH-Config.

The UE may determine the PUSCH transmission power by summing offset, pathloss, and other parameters related with number of PRBs and power control commands.

The offset may be the sum of P0-PUSCH and Alpha.

The UE may perform the PUSCH transmission based at least in part on the transmission power and time domain relationship determined above.

The RRCReconfiguration1 may be a RRC message including a servingCellConfig and a servingCellConfig-Common of the first cell.

The RRCReconfiguration1 may be a RRC message including ReconfigurationWithSync.

The RRCReconfiguration1 may be a RRC message received by the UE in a cell that is different from the first cell.

The RRCReconfiguration1 may be a RRC message instructing the L3 mobility from the current serving cell to the first cell.

The RRCReconfiguration2 may be a RRC message including a servingCellConfig and a servingCellConfig-Common of the second cell.

The RRCReconfiguration2 may be a RRC message including the L2mobilityConfig.

The RRCReconfiguration2 may be a RRC message received by the UE in a cell that is different from the second cell.

The RRCReconfiguration2 may be a RRC message instructing the L2 mobility between the current serving cell and the second cell.

The RRCReconfiguration3 may be a RRC message including a first PCell change information indicating that a default PCell change is needed, and a second PCell change information indicating which additional PCell is a new default PCell, and a third PCell change information indicating whether the current default PCell is released or is a new additional PCell.

The RRCReconfiguration3 may be a RRC message received by the UE in the first cell or in the second cell.

The RRCReconfiguration3 may be a RRC message instructing the default PCell change from the current default PCell to one of additional PCells.

The RRCReconfiguration3 may be a RRC message instructing the default PCell change from the first cell to the second cell.

The RRCReconfiguration3 may be a RRC message instructing an additional PCell change from the current additional PCell to the default PCell.

The RRCReconfiguration3 may be a RRC message instructing an additional PCell change from the second cell to the first cell.

The RRCRecofiguration4 may be a RRC message instructing the release of an additional PCell.

The RRCReconfiguration4 may include additional PCell release information. The additional PCell release information may include an index (or identifier of the additional PCell) to be released.

The first cell may be a default PCell or a default PSCell.

The second cell may be an additional PCell or an additional PSCell.

The second cell may be an additional PCell if the first cell is a default PCell.

The second cell may be an additional PSCell if the first cell is a default PSCell.

A default PCell may be the cell, operating on the primary frequency, in which the UE either performs the initial connection establishment procedure or initiates the connection re-establishment procedure, or is the cell indicated as the primary cell in the handover procedure.

An additional PCell may be the cell, operating on the primary frequency, indicated as an additional primary cell in the L2 mobility procedure.

Only one default PCell may be configured for a UE in the RRC_CONNECTED.

The UE in the RRC_CONNECTED is always configured with the default PCell. A default PCell may be established when the UE enters into the RRC_CONNECTED state. The default PCell may be changed by a RRCReconfiguration1. The default PCell may change from a cell to another cell when the UE receives a RRCReconfiguration1. The default PCell may change from a cell to another cell when the UE receives a RRCReconfiguration3.

The default PCell may be released when the UE leaves the RRC_CONNECTED state (i.e., when UE enters into RRC_INACTIVE or RRC_IDLE). The default PCell may be released when the UE receives a RRCRelease.

Zero, one, or more additional PCells may be configured for a UE in RRC_CONNECTED. An additional PCell may be established by a RRCReconfiguration2. An additional PCell may be released when the UE receives a RRCReconfiguration4. An additional PCell may be changed to a default PCell when the UE receives a RRCReconfiguration3.

The terminal may receive a first RRCReconfiguration from the base station.

The first RRCReconfiguration may include the following.
   a first RadioBearerConfig, one or more default RLC-BearerConfig, a default MAC-CellGroupConfig, a first physicalCellGroupConfig, a default PCell configuration information, and zero, one, or more of the default SCell configuration information.

The terminal may perform a transmission and reception on the default PCell or the default SCell based on the first RadioBearerConfig, one or more default RLC-BearerConfig, a default MAC-CellGroupConfig, a default physical- CellGroupConfig, a default PCell configuration information, and zero, one, or more of the default SCell configuration information.

The terminal may perform a transmission and reception on the default PCell and the default SCell based on the first and third parameters.

The first parameters may be a part of the parameters included in the following IEs.
the first RadioBearerConfig, one or more default RLC-BearerConfig, a default MAC-CellGroupConfig, a first physicalCellGroupConfig, a default PCell configuration information, and zero, one, or more of the default SCell configuration information.

The third parameters may be a part of the parameters included in the following IE.
the first RadioBearerConfig.

The second RRCReconfiguration may include the following.
one or more additional RLC-BearerConfigs, an additional MAC-CellGroupConfig, a second physicalCellGroupConfg, additional PCell configuration information, and zero, one, or more of the additional SCell configuration information.

The terminal may perform the transmission and reception on the additional PCell or the additional SCell based on the first RadioBearerConfig, one or more additional RLC-BearerConfig, the additional MAC-CellGroupConfig, the second physicalCellGroupConfg, the additional PCell configuration information, and zero, one, or more of the additional SCell configuration information.

The terminal may perform the transmission and reception on the additional PCell and the additional SCell based on the second and third parameters.

The second parameters may be a part of the parameters included in one or more additional RLC-BearerConfigs, the additional MAC-CellGroupConfig, the second physicalCellGroupConfig, the additional PCell configuration information, and zero, one, or more of the additional SCell configuration information.

The second RRCReconfiguration may include an additional physicalCellGroupConfg, an additional PCell configuration information, and zero, one, or more of the additional SCell configuration information.

The terminal may perform the transmission and reception on the additional PCell, the additional SCell based on the first RadioBearerConfig, one or more default RLC-BearerConfig, the default MAC-CellGroupConfig, the second physicalCellGroupConfig, the additional PCell configuration information, and zero, one, or more of the additional SCell configuration information.

The terminal may perform the transmission and reception on the default PCell and the default SCell based on the first RadioBearerConfig, one or more default RLC-BearerConfig, the default MAC-CellGroupConfig, the first physicalCellGroupConfig, the default PCell configuration information, and zero, one, or more of the default SCell configuration information.

The RadioBearerConfig may be used to add signalling radio bearers and data radio bearers. The RadioBearerConfig may include zero, one, or more of the SRB configuration and zero, one, or more of the DRB configuration. The SRB configuration may include a SRB identity and a PDCP-Config. The DRB configuration may include a DRB identity and a PDCP-Config.

The PDCP-Config may be used to set the configurable PDCP parameters. The PDCP-Config may include IEs such as a parameter for the size of the PDCP sequence number field and a parameter for the length of discard timer.

The RLC-BearerConfig may be used to configure an RLC entity and a corresponding logical channel in MAC and the linking to a PDCP entity.

The RLC-BearerConfig may include a first identity, a second identity, a RLC-Config, and a LogicalChannelConfig.

The first identity may be a logical channel identity. The second identity may either be a SRB identity or a DRB identity.

The RLC-Config may be used to specify the RLC configuration. The RLC-Config may include IEs such as the parameter for the size of the RLC sequence number field and the length of reassembly timer.

The LogicalChannelConfig may be used to configure the logical channel parameters. The LogicalChannelConfig may include IEs such as a parameter for priority, a parameter for prioritized bit rate, and parameters for logical channel restrictions.

The MAC-CellGroupConfig may be used to configure the MAC parameters for a cell group (or mobility group), including DRX. The mac-CellGroupConfig may include a bsr-Config, a phr-Config, a drx-Config, and other IEs.

The BSR-Config may be used to configure buffer status reporting. The BSR-Config may include a parameter for periodic timer length and a parameter for retransmission timer length.

The DRX-Config may be used to configure DRX related parameters. The DRX-Config may include parameters for DRX timers and a parameter for time domain offset.

The PHR-Config may be used to configure parameters for power headroom reporting. The PHR-Config may include parameters for timers and a parameter for a format (i.e., single entry PHR format or multi entry PHR format).

The IE PhysicalCellGroupConfig may be used to configure cell-group specific L1 parameters. The physicalCellGroupConfig may include IEs such as a tpc-SRS-RNTI field, a tpc-PUCCH-RNTI field, a tpc-PUSCH-RNTI field, a cs-RNTI field, a mcs-C-RNTI field, a p-UE-FR1 field, and a p-NR-FR1 field.

The cs-RNTI field may contain a RNTI value for the downlink SPS and the uplink configured grant.

The p-NR-FR1 field may indicate the maximum total transmit power to be used by the terminal in this NR cell group (and in this mobility group) across all serving cells in frequency range 1 (FR1).

The p-UE-FR1 field may indicate the maximum total transmit power to be used by the terminal across all the serving cells in the frequency range 1 (FR1) across all cell groups.

The tpc-PUCCH-RNTI field may contain a RNTI used for the PUCCH TPC commands on the DCI.

The tpc-PUSCH-RNTI field may contain the RNTI used for the PUSCH TPC commands on DCI.

The tpc-SRS-RNTI field may contain the RNTI used for the SRS TPC commands on the DCI.

The default PCell configuration information may include a servingCellConfig, a servingCellConfigCommon, and a SSB-MTC for the default PCell.

The default SCell configuration information may include a servingCellConfig, a servingCellConfigCommon, and a SSB-MTC for the default SCell.

The ServingCellConfig may be used to configure the terminal with a serving cell.

The ServingCellConfig may include the terminal specific parameters and the cell specific parameters.

The ServingCellConfig may include the configuration information for additional bandwidth parts.

The terminal specific parameters may comprise a csi-MeasConfig.

The ServingCellConfigCommon may be used to configure the cell specific parameters of a terminal's serving cell.

The servingCellConfigCommon may include parameters such as a ssb-PositionsInBurst, a SubcarrierSpacing, and other IEs.

The ssb-PositionsInBurst may indicate the time domain positions of the transmitted SS-blocks in a half frame with SS/PBCH blocks. The first/leftmost bit may correspond to the SS/PBCH block index 0 and the second bit corresponds to the SS/PBCH block index 1 and so on. The value 0 in the bitmap may indicate that the corresponding SS/PBCH block is not transmitted while the value 1 may indicate that the corresponding SS/PBCH block is transmitted.

The SubcarrierSpacing may indicate the subcarrier spacing of the SSB in the initial BWP.

The SSB-MTC may be used to configure the measurement timing configurations (e.g., timing occasions at which the terminal measures SSBs).

The SSB-MTC may include a periodicityAndOffset and a duration. The duration may indicate the duration of the measurement window in which to receive the SS/PBCH blocks. The periodicityAndOffset may indicate the periodicity and offset of the measurement window in which to receive the SS/PBCH blocks.

The terminal may receive, from a first base station, a first RRCReconfiguration.

The first RRCReconfiguration may include:
  information may be related to a first type mobility; and
    the first type mobility may be triggered by a RRC message
    the first type mobility may cause the L1 synchronization to a cell different from the current cell and the L2 reset
  a serving cell configuration for a first cell; and
  a first configuration and a third configuration; and
  a first C-RNTI The first RRCReconfiguration may be RRCReconfiguration1.

The terminal may receive, from the first base station, a second RRCReconfiguration.

The second RRCReconfiguration may include:
  information related to a second type mobility; and
    the second type mobility may be triggered by a MAC CE
    the second type mobility may cause the L1 synchronization to a cell different from the current cell without the L2 reset
  a serving cell configuration for a second cell; and
  a second configuration; and
  optionally a second C-RNTI The second RRCReconfiguration may be RRCReconfiguration2.

Terminal may receive a downlink signal and may transmit an uplink signal in the second cell based on the third and second configuration during a second period.

Terminal may receive the downlink signal and may transmit the uplink signal in the first cell based on the third and first configuration during a first period and during a third period.
  each of the first MAC CE and the second MAC CE may include a first field, a second field, and a third field.
  The first field may indicate information related to the target cell
  The second field may indicate information related to the random access procedure The third field may indicate a BWP and TCI state The first MAC CE may be received in the second cell and the second MAC CE may be received in the first cell.

The first MAC CE may instruct the second type mobility to the first cell and the second MAC CE may instruct the second type mobility to the second cell.

The first field of the first MAC CE may set to a value related to the first cell and the first field of the second MAC CE may set to a value related to the second cell.

The first period may be after the reception of a first MAC CE and may be before the reception of a second MAC CE.

The second period may be during the second period (after the reception of the second MAC CE and before the reception of the first MAC CE).

The third period may be after the reception of the first MAC CE and before the reception of the second MAC CE.

The downlink signal may be PDSCH.

The third configuration may include a PDCP configuration.

The first configuration may include a PDSCH-config of a first BWP of the first cell.
  The first BWP may be the last active DL BWP of the first cell or the first BWP may be indicated in the first MAC CE.

The second configuration may include a PDSCH-config of a second BWP of the second cell.
  The second BWP may be indicated in the second MAC CE.

The terminal may receive the downlink signal in the second cell based on one or more TCI states in the second configuration during the second period The terminal may receive the downlink signal in the first cell based on one or more TCI states in the first configuration during the first period and the third period.

The terminal may receive the downlink signal in an active DL BWP in the second cell based on the dataScramblingIdentityPDSCH in the PDSCH-config of the active DL BWP of the second cell during the second period.

The terminal may receive the downlink signal in an active DL BWP in the first cell based on the dataScramblingIdentityPDSCH in the PDSCH-config of the active DL BWP of the first cell during the first and third period.

The terminal may receive the downlink signal in an active DL BWP in the second cell based on a second dataScramblingIdentityPDSCH during the second period.

The second dataScramblingIdentityPDSCH may be one of one or more dataScramblingIdentityPDSCHs included in the second configuration.

The second configuration may include one or more PDSCH-configs.

Each of one or more PDSCH-configs may correspond to a DL BWP and may include a dataScramblingIdentityPDSCH.

The second dataScramblingIdentityPDSCH may be the one included in the PDSCH-config of the active DL BWP of the second configuration.

The terminal may receive the downlink signal in an active DL BWP in the first cell based on a first dataScramblingIdentityPDSCH during the first and third period.

The first dataScramblingIdentityPDSCH may be one of one or more dataScramblingIdentityPDSCHs included in the first configuration.

The first configuration may include one or more PDSCH-configs.

Each of one or more PDSCH-configs may correspond to a DL BWP and include a dataScramblingIdentityPDSCH.

The first dataScramblingIdentityPDSCH may be the one included in the PDSCH-config of the active DL BWP of the first configuration.

If the maxMIMO-Layers IE is present in the PDSCH-config of the active DL BWP of the second cell, the terminal may receive the downlink signal in the active DL BWP in the second cell based on the maxMIMO-Layers in the PDSCH-config of the DL BWP of the second cell during the second period.

If the maxMIMO-Layers IE is not present in the PDSCH-config of the active DL BWP of the second cell, the terminal may receive the downlink signal in the active DL BWP in the second cell based on the maxMIMO-Layers in the PDSCH-ServingCellConfig of the second cell during the second period.

If the maxMIMO-Layers IE is present in the PDSCH-config of the active DL BWP of the first cell, the terminal may receive the downlink signal in the active DL BWP in the first cell based on the maxMIMO-Layers in the PDSCH-config of the DL BWP of the first cell during the first and third period.

If the maxMIMO-Layers IE is not present in the PDSCH-config of the active DL BWP of the first cell, the terminal may receive the downlink signal in the active DL BWP in the first cell based on the maxMIMO-Layers in the PDSCH-ServingCellConfig of the first cell during the first and third period.

If the second maxMIMO-Layers1 IE is present in the second configuration, the terminal may receive the downlink signal in the active DL BWP in the second cell based on the second maxMIMO-Layers1 during the second period.

If the second maxMIMO-Layers1 IE is not present in the second configuration, the terminal may receive the downlink signal in the active DL BWP in the second cell based on the second maxMIMO-Layers2 of the second configuration during the second period.

The second maxMIMO-Layers1 may be one of one or more maxMIMO-Layers1s included in the second configuration.

The second maxMIMO-Layers1 may be the one included in the PDSCH-config of the active DL BWP of the second cell of the second configuration.

The second maxMIMO-Layers2 may be one of one or more maxMIMO-Layers2s included in the second configuration.

The second maxMIMO-Layers2 may be the one included in the PDSCH-ServingCellConfig of the second cell of the second configuration.

If the first maxMIMO-Layers1 IE is present in the first configuration, the terminal may receive the downlink signal in the active DL BWP in the first cell based on the first maxMIMO-Layers1 during the first and third period.

If the first maxMIMO-Layers1 IE is not present in the first configuration, the terminal may receive the downlink signal in the active DL BWP in the first cell based on first maxMIMO-Layers2 of the first configuration during the first and third period.

The first maxMIMO-Layers1 may be one of one or more maxMIMO-Layers1s included in the first configuration.

The first maxMIMO-Layers1 may be the one included in the PDSCH-config of the active DL BWP of the first cell of the first configuration.

The first maxMIMO-Layers2 may be one of one or more maxMIMO-Layers2s included in the first configuration.

The first maxMIMO-Layers2 may be the one included in the PDSCH-ServingCellConfig of the first cell of the first configuration.

The uplink signal may be PUSCH.

The third configuration may include a PDCP configuration.

The first configuration may include a PUSCH-config of a first UL BWP of the first cell and a PDSCH-Config of a first DL BWP of the first cell.

The first configuration may include one or more PUSCH-Configs and one or more PDSCH-Configs.

Each of one or more PUSCH-Config may correspond to a UL BWP.

Each of one or more PDSCH-Config may correspond to a DL BWP.

The first UL BWP may be the last active UL BWP of the first cell or the first UL BWP may be the one indicated in the first MAC CE.

The first DL BWP may be the last active DL BWP of the first cell or the first DL BWP may be the one indicated in the first MAC CE.

The second configuration may include a PUSCH-config of a second UL BWP of the second cell and a PDSCH-Config of a second DL BWP of the second cell.

The second configuration may include one or more PUSCH-Config and one or more PDSCH-Config.

Each of one or more PUSCH-Configs may correspond to a UL BWP.

Each of one or more PDSCH-Configs may correspond to a DL BWP.

The second UL BWP and the second DL BWP may be the ones indicated in the second MAC CE.

The terminal may transmit the uplink signal in the first cell based on one or more TCI states in the first PDSCH-config and based on an offset determined from the first PUSCH-Config in the first configuration during the first and third period.

The first PDSCH-Config may be the PDSCH configuration of the first downlink BWP of the first cell.

The first PUSCH-Config may be the PUSCH configuration of the first uplink BWP of the first cell.

The first PDSCH-Config and the first PUSCH-Config may be included in the first configuration.

The terminal may transmit the uplink signal in the second cell based on one or more TCI states in the second PDSCH-config and based on an offset determined from the second PUSCH-Config in the second configuration during the second period.

The second PDSCH-Config may be the PDSCH configuration of the second downlink BWP of the second cell.

The second PUSCH-Config may be the PUSCH configuration of the second uplink BWP of the second cell.

The second PDSCH-Config and the second PUSCH-Config may be included in the second configuration.

The terminal may transmit the uplink signal in a first uplink BWP in the first cell based on a first n_RNTI and a first n_ID during the first and third period.

The first n_RNTI may be the first C-RNTI (or the default C-RNTI that was allocated in the first RRCReconfiguration message).

The first RRCReconfiguration message may be RRCReconfiguration1.

The first n_ID may be a first dataScramblingIdentityPUSCH if the first dataScramblingIdentityPUSCH is indicated in the PUSCH-Config in the first RRCReconfiguration message.

The first n_ID may be the PCI of the first cell if the first dataScramblingIdentityPUSCH is not indicated in the first PUSCH-Config in the first RRCReconfiguration message.

The first PUSCH-Config may be the PUSCH configuration of the first uplink BWP of the first cell.

The first PUSCH-Config and the first C-RNTI and the PCI of the first cell may be included in the first configuration.

The first configuration may include one or more PUSCH-Config and one or more PCIs and a single first C-RNTI.

One of one or more PUSCH-Config may correspond to an UL BWP. One of one or more PCI may correspond to a serving cell.

The terminal may transmit the uplink signal in a second uplink BWP in the second cell based on a second n_RNTI and a second n_ID during the second period.

The second n_RNTI may be the second C-RNTI (or additional C-RNTI) that was allocated (or included or indicated) in the second RRCReconfiguration message.

The second n_RNTI may equal the first n_RNTI if the second C-RNTI is not allocated (or if the second C-RNTI is not allocated, included, or indicated in the second RRCReconfiguration message).

The second RRCReconfiguration message may be RRCReconfiguration2.

The second n_ID may be a second dataScramblingIdentityPUSCH if the second dataScramblingIdentityPUSCH is indicated in the second PUSCH-Config in the second RRCReconfiguration message.

The second n_ID may be the PCI of the second cell if the second dataScramblingIdentityPUSCH is not indicated in the second PUSCH-Config in the second RRCReconfiguration message.

The second PUSCH-Config may be the PUSCH configuration of the second uplink BWP of the second cell.

The second PUSCH-Config and the second C-RNTI and the PCI of the second cell may be included in the second configuration.

The second configuration may include one or more PUSCH-Configs and one or more PCIs and a single second C-RNTI or a single first C-RNTI.

Each of one or more PUSCH-Configs may correspond to an UL BWP. Each of one or more PCIs may correspond to a serving cell.

The downlink signal may be PDCCH.

The third configuration may include a PDCP configuration.

The first configuration may include a PDCCH-config for a first DL BWP of the first cell.

The first DL BWP may be the last active DL BWP of the first cell or the first DL BWP may be the one indicated in the first MAC CE.

The second configuration may include a PDCCH-config for a second DL BWP of the second cell.

The second DL BWP may be the last active DL BWP of the second cell or the second DL BWP may be indicated in the second MAC CE.

The PDCCH-config for a BWP may include at least one SearchSpace and at least one CORESET.

The terminal may receive the downlink signal in the first cell based on the SearchSpace and the CORESET in the first configuration during the first and third period.

The terminal may receive the downlink signal in the first cell based on the first C-RNTI.

The terminal may receive the downlink signal in the second cell based on the SearchSpace and the CORESET in the second configuration during the second period.

The terminal may receive the downlink signal in the second cell based on the first C-RNTI if the second C-RNTI is not included in (or indicated in or configured by) the second RRCReconfiguration.

The terminal may receive the downlink signal in the second cell based on the second C-RNTI if the second C-RNTI is included in (or indicated in or configured by) the second RRCReconfiguration.

The first configuration may include one or more PDCCH-Configs and a C-RNTI.

Each of one or more PDCCH-Configs may correspond to a DL BWP and may include one or more SearchSpaces and one or more CORESETs.

The first SearchSpace may be, among one or more SearchSpaces in the first configuration, the one associated with the first DL BWP.

The first CORESET may be, among one or more CORESETs in the first configuration, the one associated with the first DL BWP.

The second configuration may include one or more PDCCH-Configs and optionally a C-RNTI.

Each of one or more PDCCH-Configs may correspond to a DL BWP and may include one or more SearchSpaces and one or more CORESETs.

The second SearchSpace may be, among one or more SearchSpaces in the second configuration, the one associated with the second DL BWP.

The second CORESET may be, among one or more CORESETs in the second configuration, the one associated with the second DL BWP.

The uplink signal may be the PUCCH.

The third configuration may include a PDCP configuration.

The first configuration may include a PUCCH-config for a first UL BWP of the first cell and a CSI-MeasConfig of the first cell.

The first UL BWP may be the last active UL BWP of the first cell or the first UL BWP may be the one indicated in the first MAC CE.

The second configuration may include a PUCCH-config for a second UL BWP of the second cell and a CSI-MeasConfig of the second cell.

The second UL BWP may be indicated in the second MAC CE.

The terminal may transmit the uplink signal in the first cell based on the PUCCH-config of the first UL BWP and the CSI-MeasConfig of the first cell (or based on PUCCH-config and CSI-MeasConfig in the first configuration) during the first period and the third period.

The terminal may transmit the uplink signal in the first cell based on one or more spatialRelationInfos in the first PUCCH-config.

The terminal may transmit the first cell the uplink signal in a resource associated with a first resource ID.
        The first resource ID may be indicated by the first PUCCH-config.
        The resource associated with the first resource ID may be indicated in the first CSI-MeasConfig.

The terminal may transmit the uplink signal in the second cell based on the PUCCH-config of the second UL BWP and the CSI-MeasConfig of the second cell (or based on PUCCH-config and CSI-MeasConfig in the second configuration) during the second period.

The terminal may transmit the uplink signal in the second cell based on one or more spatialRelationInfos in the second PUCCH-config.

The terminal may transmit in the second cell the uplink signal in a resource associated with a second resource ID.
  The second resource ID may be indicated in the second PUCCH-config.
  The resource associated with the second resource ID may be indicated in the second CSI-MeasConfig.
The first configuration may include one or more PUCCH-Configs and one or more CSI-MeasConfigs.
Each of one or more PUCCH-Configs may correspond to a UL BWP.
Each of one or more PUCCH-Config may include a resource ID and one or more spatialRelationInfos.
Each of one of more CSI-MeasConfigs may correspond to a serving cell.
Each of one or more CSI-MeasConfig may include one or more of the resource information.
The first PUCCH-Config may be, among one or more PUCCH-Configs in the first configuration, the one associated with the first UL BWP of the first cell.
The first CSI-MeasConfig may be, among one or more CSI-MeasConfigs in the first configuration, the one associated with the first cell.
The second configuration may include one or more PUCCH-Configs and one or more CSI-MeasConfigs.
Each of one or more PUCCH-Configs may correspond to a UL BWP.
Each of one or more PUCCH-Configs may include a resource ID and one or more spatialRelationInfo.
Each of one or more CSI-MeasConfigs may correspond to a serving cell.
Each of one or more CSI-MeasConfigs may include one or more of the resource information.
The second PUCCH-Config may be, among one or more PUCCH-Configs in the second configuration, the one associated with the second UL BWP of the second cell.
The second CSI-MeasConfig may be, among one or more CSI-MeasConfigs in the second configuration, the one associated with the second cell.
  The uplink signal may be the SR.
  The third configuration may include a PDCP configuration.
  The first configuration may include a PUCCH-config for the first UL BWP of the first cell and a mac-CellGroupConfig of the default mobility group.
    The first UL BWP may be the last active UL BWP of the first cell or the first UL BWP may be the one indicated in the first MAC CE.
    The first cell may be a default PCell.
    The mac-CellGroupConfig of the default mobility group may include one or more SR configurations.
      Each of one or more SR configurations may include an identifier1 (SchedulingRequestId), a first timer value (sr-ProhibitTimer), and a first counter value (sr-TransMax).
    The PUCCH-Config of the first UL BWP may include one or more SR resource configurations.
      Each of one or more SR resource configurations may include an identifier2 (schedulingRequestResourceId), an identifier1 (SchedulingRequestId), an identifier3 (pucch-ResourceId), a parameter representing periodicity, and an offset in the number of symbols or slots.
  The second configuration may include a PUCCH-config for a second UL BWP of the second cell and a mac-CellGroupConfig of the additional mobility group.
    The second UL BWP may be indicated in the second MAC CE.
    The second cell may be an additional PCell.
    The mac-CellGroupConfig of the additional mobility group may include one or more SR configurations.
      Each of one or more SR configurations may include an identifier1 (SchedulingRequestId), a first timer value (sr-ProhibitTimer), and a first counter value (sr-TransMax).
    The PUCCH-Config of the second UL BWP may include one or more SR resource configurations.
      Each of one or more SR resource configurations may include an identifier2 (schedulingRequestResourceId), an identifier1 (SchedulingRequestId), an identifier3 (pucch-ResourceId), a parameter representing periodicity, and an offset in the number of symbols or slots.
  The first configuration may be included in the first RRCReconfiguration message.
  The second configuration may be included in the second RRCReconfiguration message.
  The first RRCReconfiguration message may be a RRCReconfiguration1.
  The second RRCReconfiguration message may be a RRCReconfiguration2.
  The terminal may transmit the uplink signal in the first cell based on the PUCCH-config of the first UL BWP and the a mac-CellGroupConfig of the dmg during the first and third period.
    The terminal may transmit the uplink signal in the first cell based on one or more spatialRelationInfos in the PUCCH-config.
    The terminal may determine the resource for the uplink signal based on the identifier1 indicated in a SR configuration of the mac-CellGroupConfig and the identifier1 and the identifier3 indicated in a SR resource configuration of the PUCCH-Config
      The mac-CellGroupConfig and the PUCCH-Config may be the ones included in the first configuration.
      One mac-CellGroupConfig and one or more PUCCH-Config may be included in the first configuration (in the first RRCReconfiguration)
      Each PUCCH-Config may be the PUCCH configuration of an UL BWP of the default PCell or the default SCell.
      The PUCCH-Config may bet the PUCCH configuration of the first UL BWP of the default PCell.
  The terminal may transmit the uplink signal in the second cell based on the PUCCH-config of the second UL BWP and the mac-CellGroupConfig of the amg during the second period.
    The terminal may transmit the uplink signal in the second cell based on one or more spatialRelationInfos in the PUCCH-config.
    The terminal may determine the resource for the uplink signal based on the identifier1 indicated in a SR configuration of the mac-CellGroupConfig and the identifier1 and the identifier3 indicated in a SR resource configuration of the PUCCH-Config
      The mac-CellGroupConfig and the PUCCH-Config may be the ones included in the second configuration.
      One mac-CellGroupConfig and one or more PUCCH-Config may be included in the second configuration (in the second RRCReconfiguration)

Each PUCCH-Config may be the PUCCH configuration of an UL BWP of an additional PCell or an additional SCell.

The PUCCH-Config may be the PUCCH configuration of the second UL BWP of an additional PCell.

The terminal may be configured with, for each mobility group, h SR configurations, j SR resource configurations, k PUCCH resource configurations, m serving cells, and n UL BWPs. h and j and k may be integers equal to or greater than zero. m and n may be integers equal to or greater than one. h and j and k and m and n may be different from or equal to each other.

Each of the h SR configurations may consist of an identifier1 (SchedulingRequestId), a first timer value (sr-ProhibitTimer), and a first counter value (sr-TransMax).

Each of the h SR configurations may be applied to the terminal in one or more of the UL BWPs. Each of the j SR resource configurations may be applied to the terminal in an UL BWP associated with the SR resource configuration. Each of k PUCCH resource configurations may be applied to the terminal in an UL BWP associated with the PUCCH resource configuration.

The one or more UL BWPs may be the SpCell's UL BWP for which at least one SR resource configuration is configured.

The UL BWP associated with a SR resource configuration may be the UL BWP for which the SR resource configuration is configured.

The UL BWP associated with the PUCCH resource configuration may be the UL BWP for which the PUCCH resource configuration is configured.

Each of the m SR resource configurations may consist of an identifier2 (schedulingRequestResourceId), an identifier1 (SchedulingRequestId), an identifier3 (pucch-ResourceId), a parameter representing periodicity, and an offset in the number of symbols or slots.

A SR resource configuration and a SR configuration may be associated with each other if they have the same identifier1.

A SR configuration may be associated with a PUCCH resource configuration if the PUCCH resource configuration is indicated in the associated SR resource configuration.

A first RRCReconfiguration message may include a CellGroupConfig for dmg.

A second RRCReconfiguration message may include a CellGroupConfig for amg.

A CellGroupConfig may include a mac-CellGroupConfig and one or more ServingCellConfigs.

A ServingCellConfig may include one or more BWP-UplinkDedicateds.

A SR configuration may be included in the mac-CellGroupConfig in the CellGroupConfig.

A PUCCH-Config may be included in a BWP-UplinkDedicated.

A PUCCH-Config may include zero or more SR resource configurations and zero or more PUCCH-Resource configurations.

A SR resource configuration may be included in a PUCCH-Config in a BWP-UplinkDedicated in a ServingCellConfig in a CellGroupConfig.

A PUCCH-resource configuration may be included in a PUCCH-Config in a BWP-UplinkDedicated in a ServingCellConfig in a CellGroupConfig.

The terminal may transmit a SR on the PUCCH resource determined based on the identifier1, the identifier2, and the identifier3.

The uplink signal may be the SRS.

The third configuration may include a PDCP configuration.

The first configuration may include a SRS-config for a first UL BWP of the first cell and a PDSCH-config for a first DL BWP.

The first UL BWP may be the last active UL BWP of the first cell or the first UL BWP may be the one indicated in the first MAC CE.

The first DL BWP may be the last active DL BWP of the first cell or the first DL BWP may be the one indicated in the first MAC CE.

The second configuration may include a SRS-config for a second UL BWP of the second cell and a PDSCH-config for a second DL BWP.

The second UL BWP and the second DL BWP may be indicated in the second MAC CE.

The terminal may transmit the uplink signal in the first cell based on the SRS-config of the first UL BWP during the first and third period, if the SRS-config in the first configuration does not include a followUnifiedTCIstateSRS.

The terminal may transmit in the first cell the uplink signal based on one or more spatialRelationInfos in the SRS-config of the first DL BWP of the first cell.

The terminal may transmit in the first cell the uplink signal in a resource indicated in the SRS-Config of the first UL BWP of the first cell.

The terminal may transmit the uplink signal in the second cell based on the SRS-config of the second UL BWP during the second period if the SRS-config in the second configuration does not include a followUnifiedTCIstateSRS.

The terminal may transmit the uplink signal in the second cell based on one or more spatialRelationInfos in the SRS-config of the second UL BWP of the second cell.

The terminal may transmit in the first cell the uplink signal in a resource indicated in the SRS-Config of the second UL BWP of the second cell.

The terminal may transmit the uplink signal in the first cell based on the SRS-config of the first UL BWP of the first cell and the PDSCH-Config of the first DL BWP of the first cell during the first and third period, if the SRS-config includes a followUnifiedTCIstateSRS.

The terminal may transmit the uplink signal in the first cell based on one or more TCI states in the PDSCH-config of the first DL BWP of the first cell.

The terminal may transmit in the first cell the uplink signal in a resource indicated in the SRS-Config of the first UL BWP of the first cell.

The terminal may transmit the uplink signal in the second cell based on the SRS-config of the second UL BWP of the second cell and the PDSCH-Config of the second DL BWP of the second cell, if the SRS-config includes a followUnifiedTCIstateSRS.

The terminal may transmit the uplink signal in the second cell based on one or more TCI states in the PDSCH-config of the second DL BWP of the second cell.

The terminal may transmit in the first cell the uplink signal in a resource indicated by the SRS-Config of the second UL BWP of the second cell.

The uplink signal may be the PUSCH.

The third configuration may include a PDCP configuration.

The first configuration may include a PUSCH-config of a first UL BWP of the first cell and a PCI of the first cell and a first C-RNTI.

The first UL BWP may be the last active UL BWP of the first cell or the first UL BWP may be the one indicated by the first MAC CE.

The PCI of the first cell may be included in the serving cell configuration of the first cell.

The second configuration may include a PUSCH-config of a second UL BWP of the second cell and a PCI of the second cell and a second C-RNTI.

The second UL BWP may be indicated in the second MAC CE.

The PCI of the second cell may be included in the serving cell configuration of the second cell.

The terminal may transmit the uplink signal in the first cell based on a first scrambling sequence during the first and third period.

The first scrambling sequence may be generated based on the first C-RNTI and a first dataScramblingIdentityPUSCH if the first dataScramblingIdentityPUSCH is included in the PUSCH-Config of the first UL BWP of the first cell.

The first scrambling sequence may be generated based on the first C-RNTI and the PCI of the first cell if the first dataScramblingIdentityPUSCH is not included in the PUSCH-Config of the first UL BWP of the first cell.

The terminal may transmit the uplink signal in the second cell based on a second scrambling sequence during the second period.

The second scrambling sequence may be generated based on the second C-RNTI and a second dataScramblingIdentityPUSCH if the second dataScramblingIdentityPUSCH is included in the PUSCH-Config of the second UL BWP of the second cell and the second C-RNTI is included in the second RRCReconfiguration.

The second scrambling sequence may be generated based on the second C-RNTI and the PCI of the second cell if the second dataScramblingIdentityPUSCH is not included in the PUSCH-Config of the second UL BWP of the second cell and the second C-RNTI is included in the second RRCReconfiguration.

The second scrambling sequence may be generated based on the first C-RNTI and a second dataScramblingIdentityPUSCH if the second dataScramblingIdentityPUSCH is included in the PUSCH-Config of the second UL BWP of the second cell and the second C-RNTI is not included in the second RRCReconfiguration.

The second scrambling sequence may be generated based on the first C-RNTI and the PCI of the second cell if the second dataScramblingIdentityPUSCH is not included in the PUSCH-Config of the second UL BWP of the second cell and the second C-RNTI is not included in the second RRCReconfiguration.

The terminal may receive from the base station a first RRCReconfiguration.

The first RRCReconfiguration may include a PDCP-Config for a DRB, a default RLC-BearerConfig, and a default MAC-MainConfig. The first RRCReconfiguration may be the RRCReconfiguration1.

The terminal may establish a PDCP entity for a DRB in accordance with the PDCP-Config included in the first RRCReconfiguration.

The terminal may establish a default RLC entity in accordance with a default RLC-BearerConfig included in the first RRCReconfiguration.

The terminal may configure a default MAC entity with a default logical channel in accordance with the default RLC-BearerConfig included in the first RRCReconfiguration.

The terminal may associate the default logical channel with the PDCP entity of the DRB in accordance with the default RLC-BearerConfig included in the first RRCReconfiguration.

The terminal may perform transmission and reception of the PDCP PDUs of the DRB via the default RLC entity, the default logical channel, and the default MAC entity.

The terminal may receive from the base station a second RRCReconfiguration.

The second RRCReconfiguration may include an additional RLC-BearerConfig for the DRB and an additional MAC-MainConfig.

The terminal may create an additional MAC entity with the same configuration as the default MAC entity (in accordance with the default MAC-MainConfig) and reconfigure the MAC main configuration for the additional MAC entity in accordance with the received additional MAC-CellGroupConfig if the L2mobilityConfig is included in (or indicated in or configured by) the second RRCReconfiguration (or if the second RRCReconfiguration is a RRCReconfiguration2).

The terminal may reconfigure the MAC main configuration for the default MAC entity in accordance with the received additional MAC-CellGroupConfig if the L2mobilityConfig is not included in (or not indicated in or not configured by) the second RRCReconfiguration (or if the second RRCReconfiguration is not a RRCReconfiguration 2).

The terminal may establish an additional RLC entity for the DRB with the same configuration as the default RLC entity (in accordance with the default RLC-BearerConfig) and reconfigure the additional RLC entity in accordance with the received additional RLC-BearerConfig if the L2mobilityConfig is included in (or indicated in or configured by) the second RRCReconfiguration (or if the second RRCReconfiguration is a RRCReconfiguration2).

The terminal may reconfigure the default RLC entity in accordance with the received additional RLC-BearerConfig if the L2mobilityConfig is not included in (or indicated in or configured by) the second RRCReconfiguration (or if the second RRCReconfiguration is not a RRCReconfiguration 2).

The terminal may establish an additional logical channel with the same configuration as the default logical channel and reconfigure the additional logical channel in accordance with the received additional MAC-LogicalChannelConfig in the second RRCReconfiguration if the L2mobilityConfig is included in (or indicated in or configured by) the second RRCReconfiguration (or if the second RRCReconfiguration is a RRCReconfiguration2).

The terminal may reconfigure the default logical channel in accordance with the received additional MAC-LogicalChannelConfig in the second RRCReconfiguration if the L2mobilityConfig is not included in (or indicated in or configured by) the second RRCReconfiguration (or if the second RRCReconfiguration is not a RRCReconfiguration 2).

The terminal may perform the transmission and reception of the PDCP PDUs of the DRB via the additional RLC entity and the additional logical channel and the additional MAC entity during the second period and via the default RLC entity and the default logical channel and the default MAC entity during the first and third period.

The terminal may perform the buffer status reporting based on the BSR-Config in the MAC-CellGroupConfig in the first RRCReconfiguration during the first and third period.

The terminal may perform the buffer status reporting based on the BSR-Config in the MAC-CellGroupConfig in the second RRCReconfiguration during the second period.

If a second MAC CE is received, the terminal may stop the buffer status reporting based on the BSR-Config in the MAC-CellGroupConfig in the first RRCReconfiguration and start the buffer status reporting based on the BSR-Config in the MAC-CellGroupConfig in the second RRCReconfiguration.

If a first MAC CE is received, the terminal may stop the buffer status reporting based on the BSR-Config in the MAC-CellGroupConfig in the second RRCReconfiguration and start the buffer status reporting based on the BSR-Config in the MAC-CellGroupConfig in the first RRCReconfiguration.

If a second MAC CE is received, the terminal may trigger the BSR based on the BSR-Config in the MAC-CellGroupConfig in the second RRCReconfiguration.

If a first MAC CE is received, the terminal may trigger the BSR based on the BSR-Config in the MAC-CellGroupConfig in the first RRCReconfiguration.

The terminal may perform the power headroom reporting based on the PHR-Config in the MAC-CellGroupConfig in the first RRCReconfiguration during the first and third period.

The terminal may perform the power headroom reporting based on the PHR-Config in the MAC-CellGroupConfig in the second RRCReconfiguration during the second period.

If a second MAC CE is received, the terminal may stop the power headroom reporting based on the PHR-Config in the MAC-CellGroupConfig in the first RRCReconfiguration and start the power headroom reporting based on the PHR-Config in the MAC-CellGroupConfig in the second RRCReconfiguration.

If a first MAC CE is received, the terminal may stop the power headroom reporting based on the PHR-Config in the MAC-CellGroupConfig in the second RRCReconfiguration and start the power headroom reporting based on the PHR-Config in the MAC-CellGroupConfig in the first RRCReconfiguration.

If a second MAC CE is received, the terminal may trigger the PHR based on the PHR-Config in the MAC-CellGroupConfig in the second RRCReconfiguration.

If a first MAC CE is received, the terminal may trigger the PHR based on the PHR-Config in the MAC-CellGroupConfig in the first RRCReconfiguration.

The terminal may perform the DRX operation based on the DRX-Config in the MAC-CellGroupConfig in the first RRCReconfiguration during the first and third period.

The terminal may perform the DRX operation based on the DRX-Config in the MAC-CellGroupConfig in the second RRCReconfiguration during the second period.

If a second MAC CE is received, the terminal may stop the DRX operation based on the DRX-Config in the MAC-CellGroupConfig in the first RRCReconfiguration and start the DRX operation based on the DRX-Config in the MAC-CellGroupConfig in the second RRCReconfiguration.

If a first MAC CE is received, the terminal may stop the DRX operation based on the DRX-Config in the MAC-CellGroupConfig in the second RRCReconfiguration and start the DRX operation based on the DRX-Config in the MAC-CellGroupConfig in the first RRCReconfiguration.

The terminal may receive the PUCCH TPC commands on the DCI based on the tpc-PUCCH-RNTI in the PhysicalCellGroupConfig in the first RRCReconfiguration during the first and third period.

The terminal may receive the PUCCH TPC commands on the DCI based on the tpc-PUCCH-RNTI in the PhysicalCellGroupConfig in the second RRCReconfiguration during the second period.

If a second MAC CE is received, the terminal may stop using the tpc-PUCCH-RNTI in the PhysicalCellGroupConfig in the first RRCReconfiguration and start using the tpc-PUCCH-RNTI in the PhysicalCellGroupConfig in the second RRCReconfiguration.

If a first MAC CE is received, the terminal may stop using the tpc-PUCCH-RNTI in the PhysicalCellGroupConfig in the second RRCReconfiguration and start using the tpc-PUCCH-RNTI in the PhysicalCellGroupConfig in the first RRCReconfiguration.

The terminal may receive the PUCCH TPC commands on the DCI based on the tpc-SRS-RNTI in the PhysicalCellGroupConfig in the first RRCReconfiguration during the first and third period.

The terminal may receive the PUCCH TPC commands on the DCI based on the tpc-SRS-RNTI in the PhysicalCellGroupConfig in the second RRCReconfiguration during the second period.

If a second MAC CE is received, the terminal may stop using tpc-SRS-RNTI in the PhysicalCellGroupConfig in the first RRCReconfiguration and start using the tpc-SRS-RNTI in the PhysicalCellGroupConfig in the second RRCReconfiguration.

If a first MAC CE is received, the terminal may stop using tpc-SRS-RNTI in the PhysicalCellGroupConfig in the second RRCReconfiguration and start using the tpc-SRS-RNTI in the PhysicalCellGroupConfig in the first RRCReconfiguration.

The terminal may receive the PUCCH TPC commands on the DCI based on the tpc-PUSCH-RNTI in the PhysicalCellGroupConfig in the first RRCReconfiguration during the first and third period.

The terminal may receive the PUCCH TPC commands on the DCI based on the tpc-PUSCH-RNTI in the PhysicalCellGroupConfig in the second RRCReconfiguration during the second period.

If a second MAC CE is received, the terminal may stop using the tpc-PUSCH-RNTI in the PhysicalCellGroupConfig in the first RRCReconfiguration and start using the tpc-PUSCH-RNTI in the PhysicalCellGroupConfig in the second RRCReconfiguration.

If a first MAC CE is received, the terminal may stop using the tpc-PUSCH-RNTI in the PhysicalCellGroupConfig in the second RRCReconfiguration and start using the tpc-PUSCH-RNTI in the PhysicalCellGroupConfig in the first RRCReconfiguration.

The first, second, and third period may be consecutive in the time domain. The first, second, and, third period may not overlap with each other in the time domain. The first period and the third period may occur when first MAC CE is received by the UE. The second period may occur when a second MAC CE is received by the UE.

The default mobility group may include a default PCell and zero or more default SCells.

The additional mobility group may include an additional PCell and zero or more additional SCells.

The terminal may receive from the base station a first RRCReconfiguration.

The first RRCReconfiguration may include configuration information for the default mobility group.

The configuration information for the default mobility group may include serving cell configuration information for the default PCell and zero or more serving cell configuration information for the zero or more default SCells.

The terminal may monitor a paging channel of the default PCell. The terminal may acquire the system information via the PDCCH and the PDSCH of the default PCell.

The terminal may monitor the Short Message transmitted with the P-RNTI based on the search space and the coreset of the default PCell.

The search space may be indicated by (configured by) the SearchSpaceZero IE in the ServingCellConfigCommon of the default PCell.

The coreset may be indicated by (configured by) the ControlResourceSetZero IE in the ServingCellConfigCommon of the default PCell.

The terminal may monitor the PDCCH of the default PCell and the PDCCH of the activated default SCells to receive a DTCH packet or a DCCH packet.

The terminal may transmit the PUSCH on the default PCell and on the activated default SCells to deliver a DTCH packet or a DCCH packet to the base station.

The terminal may receive from the base station a second RRCReconfiguration by receiving the PDSCH of the default PCell or the PDSCH of the activated default SCells.

The second RRCReconfiguration may include a configuration information for an additional mobility group.

The configuration information for the additional mobility group may include serving cell configuration information for the additional PCell and zero or more serving cell configuration information for the zero or more additional SCells.

The terminal may receive a MAC CE (e.g., a MAC CE for a mobility group switch, MOBILITY_GROUP_SWITCH_REQUEST MAC CE) by receiving the PDSCH of the default PCell or the PDSCH of an activated default SCell (or by receiving the PDSCH of an active serving cell of the currently active mobility group).

The MAC CE (e.g., a MAC CE for a mobility group switch, MOBILITY_GROUP_SWITCH_REQUEST MAC CE) may include a MOBILITY_GROUP_ID_FIELD and a RAMDOM_ACCESS_REQUIRED_FIELD and one or more TCI_STATE_FIELD_GROUP_FIELDs.

The MOBILITY_GROUP_ID_FIELD may indicate the identity of the mobility group for which the MAC CE applies. The value 0 may correspond to the default mobility group. Other values may correspond to the additional mobility groups.

A TCI_STATE_FIELD_GROUP_FIELD may include a SERVING_CELL_ID_FIELD, a DL_BWP_ID_FIELD, a UL_BWP_ID_FIELD, and one or two TCI_STATE_ID_FIELDs.

The SERVING_CELL_ID_FIELD may indicate the identity of the Serving Cell that are activated upon the switching of the mobility groups and for which the DL_BWP_ID_FIELD, the UL_BWP_ID_FIELD, and one or two TCI_STATE_ID_FIELDs apply.

The DL_BWP_ID_FIELD may indicate a DL BWP that is first active upon the switching of the mobility groups and the DL BWP for which the corresponding TCI state applies. The UL_BWP_ID_FIELD may indicate a UL BWP that is first active upon the switching of the mobility groups and the UL BWP for which the corresponding TCI state applies.

If the two TCI_STATE_ID_FIELDs are included, the first TCI_STATE_ID_FIELD may indicate the TCI state of the DL BWP indicated by the DL_BWP_ID_FIELD and the second TCI_STATE_ID_FIELD indicates the TCI state of the UL BWP indicated by the UL_BWP_ID_FIELD.

If a TCI_STATE_ID_FIELD is included, the TCI_STATE_ID_FIELD may indicate the joint TCI state of the DL BWP indicated by the DL_BWP_ID_FIELD and the UL BWP indicated by the UL_BWP_ID_FIELD.

The terminal may determine the serving cells to be activated upon the mobility group switching based on the received MAC CE (e.g., a MAC CE for a mobility group switch, MOBILITY_GROUP_SWITCH_REQUEST MAC CE).

The terminal may determine, for each serving cell, the DL BWP to be activated upon the mobility group switching based on the received MAC CE (e.g., a MAC CE for a mobility group switch, MOBILITY_GROUP_SWITCH_REQUEST MAC CE).

The terminal may determine, for each serving cell, the UL BWP to be activated upon the mobility group switching based on the received MAC CE (e.g., a MAC CE for a mobility group switch, MOBILITY_GROUP_SWITCH_REQUEST MAC CE).

The terminal may determine, for each DL BWP, the TCI state to be activated (or applied) for the PDCCH monitoring upon the mobility group switching based on the received MAC CE (e.g., a MAC CE for a mobility group switch, MOBILITY_GROUP_SWITCH_REQUEST MAC CE).

The terminal may determine, for each UL BWP, the TCI state to be activated (or applied) for the PUCCH transmission and the SRS transmission upon the mobility group switching based on the received MAC EC (e.g., a MAC CE for a mobility group switch, MOBILITY_GROUP_SWITCH_REQUEST MAC CE).

The TCI state indicated by the TCI_STATE_ID_FIELD may be associated with a reference signal of a serving cell s of a mobility group m. The mobility group m may be indicated by the MOBILITY_GROUP_ID_FIELD. The serving cell s may be indicated by the SERVING_CELL_ID_FIELD. The TCI_STATE_ID_FIELD may indicate a TCI state in the PDSCH-Config of the serving cell indicated by SERVING_CELL_ID_FIELD.

The terminal may switch to the mobility group indicated by the MOBILITY_GROUP_ID_FIELD of the MAC CE (e.g., a MAC CE for a mobility group switch, MOBILITY_GROUP_SWITCH_REQUEST MAC CE).

The terminal may deactivate the mobility group that was active before the reception of the MAC CE (e.g., a MAC CE for a mobility group switch, MOBILITY_GROUP_SWITCH_REQUEST MAC CE) at a second point in time.

The terminal may activate the mobility group that is indicated in the MAC CE (e.g., a MAC CE for a mobility group switch, MOBILITY_GROUP_SWITCH_REQUEST MAC CE) at a first point in time.

The terminal may apply a predefined uplink timing advance and initiate a Random Access procedure in the PCell if the RAMDOM_ACCESS_REQUIRED_FIELD indicates a first value. The predefined uplink timing advance may be fixed per duplex mode.

The terminal may apply the stored(maintained) uplink timing advance (N_TA); the Timing advance between the downlink and the uplink for the PCell if the RAMDOM_ACCESS_REQUIRED_FIELD indicates a second value.

The terminal may transmit (or trigger) a MAC CE (e.g., a MAC CE for a mobility group switch, MOBILITY_GROUP_SWITCH_RESPONSE MAC CE) on the additional PCell at a third point in time.

The first point in time is after the MAC CE (e.g., a MAC CE for a mobility group switch, MOBILITY_GROUP_SWITCH_REQUEST MAC CE) reception and before the n slotls elapsed since the reception of the MAC CE. Alternatively, the first point in time is after the HARQ feedback transmission for the MAC CE (e.g., a MAC CE for a mobility group switch, MOBILITY_GROUP_SWITCH_REQUEST MAC CE) starts and before the n slot3s elapsed since the end of the HARQ feedback transmission.

The second point in time is after the MAC CE (e.g., a MAC CE for a mobility group switch, MOBILITY_GROUP_SWITCH_REQUEST MAC CE) reception and before the m slotls elapsed since the reception of the MAC CE (e.g., a MAC CE for a mobility group switch, MOBILITY_GROUP_SWITCH_REQUEST MAC CE). Alternatively, the second point of time may be after HARQ feedback transmission for the MAC CE (e.g., a MAC CE for a mobility group switch, MOBILITY_GROUP_SWITCH_REQUEST MAC CE) starts and before the m slot3s elapsed since the end of the HARQ feedback transmission.

The n may be greater than the m.

The third point in time may be after the second point in time and before the k slot2s elapsed since the second point in time.

The slot1 may be the slot of the DL BWP where the MAC CE (e.g., a MAC CE for a mobility group switch, MOBILITY_GROUP_SWITCH_REQUEST MAC CE) is received. The slot2 may be the slot of the DL BWP of the default PCell or the additional PCell. The slot3 is the slot of the UL BWP where the HARQ feedback for MAC CE (e.g., a MAC CE for a mobility group switch, MOBILITY_GROUP_SWITCH_REQUEST MAC CE) is transmitted.

The MAC CE (e.g., a MAC CE for a mobility group switch, MOBILITY_GROUP_SWITCH_RESPONSE MAC CE) may include one or more TCI_STATE_FIELD_GROUP_FIELDs. The terminal may include in the TCI_STATE_FIELD_GROUP_FIELD of the MAC CE (e.g., a MAC CE for a mobility group switch, MOBILITY_GROUP_SWITCH_RESPONSE MAC CE) the TCI_STATE_FIELD_GROUP_FIELDs received in the MAC CE (e.g., a MAC CE for a mobility group switch, MOBILITY_GROUP_SWITCH_REQUEST MAC CE).

The MAC CE (e.g., a MAC CE for a mobility group switch, MOBILITY_GROUP_SWITCH_RESPONSE MAC CE) may be the response to the MAC CE (e.g., a MAC CE for a mobility group switch, MOBILITY_GROUP_SWITCH_REQUEST MAC CE). The MAC CE (e.g., a MAC CE for a mobility group switch, MOBILITY_GROUP_SWITCH_REQUEST MAC CE) may be identified by a first two-octet eLCID index. The MAC CE (e.g., a MAC CE for a mobility group switch, MOBILITY_GROUP_SWITCH_RESPONSE MAC CE) may be identified by a second two-octet eLCID index.

The MAC CE (e.g., a MAC CE for a mobility group switch, MOBILITY_GROUP_SWITCH_RESPONSE MAC CE) may include the first part of the MAC CE (e.g., a MAC CE for a mobility group switch, MOBILITY_GROUP_SWITCH_REQUEST MAC CE). The first part of the MAC CE (e.g., a MAC CE for a mobility group switch, MOBILITY_GROUP_SWITCH_REQUEST MAC CE) may exclude the MOBILITY_GROUP_ID_FIELD and include the TCI_STATE_FIELD_GROUP_FIELDs.

The terminal may stop monitoring a paging channel if an amg is active and dmg is deactivated (if an additional PCell is active and a default PCell is deactivated). The terminal may stop acquiring system information if an amg is active and dmg is deactivated (if an additional PCell is active and a default PCell is deactivated.

The terminal may monitor the Short Message transmitted with the P-RNTI in the additional PCell, if the amg is active and the dmg is deactivated (if the additional PCell is active and the default PCell is deactivated), in accordance with the TCI state indicated for the additional PCell in the MAC CE (e.g., a MAC CE for a mobility group switch, MOBILITY_GROUP_SWITCH_REQUEST MAC CE).

The terminal may receive the PDCCH and the PDSCH in the additional PCell and in the activated additional SCells in accordance with the TCI states indicated in the MAC CE (e.g., a MAC CE for a mobility group switch, MOBILITY_GROUP_SWITCH_REQUEST MAC CE).

The terminal may transmit the PUSCH, the PUCCH, and the SRS in the additional PCell and in the activated additional SCells in accordance with the TCI states indicated in the MAC CE (e.g., a MAC CE for a mobility group switch, MOBILITY_GROUP_SWITCH_REQUEST MAC CE).

The terminal may receive a downlink message from the base station in a default PCell.

The downlink message may include information about an additional PCell.

The terminal may transmit a MAC PDU including an uplink message to the base station in the additional PCell.

The uplink message may be a response to the downlink message.

A priority of the uplink message may be higher than the BSR if the downlink message is a MAC CE (or a layer2 control message).

The priority of the uplink message may be lower than the BSR if the downlink message is a RRC message (or a layer3 control message).

The higher the priority of the uplink message, the earlier the uplink resource may be allocated to the uplink message.

The uplink data with the higher priority may be allocated with the uplink resource before the uplink data with the lower priority is.

The uplink data may include the MAC SDU and the MAC CE.

The terminal may receive a downlink MAC PDU including a downlink message from the base station in a default PCell at a 5th point of time.

The downlink message may include information on an additional PCell.

The terminal may transmit a HARQ acknowledgement for the downlink MAC PDU at a sixth point in time.

The terminal may transmit an uplink MAC PDU including an uplink message to the base station in the additional PCell at a seventh point in time if the downlink message is a MAC CE and at an eigth point in time if the downlink message is a RRC message.

The uplink message may be a response to the downlink message.

The seventh point in time may be determined based on the fifth point in time.

The eighth point in time may be determined based on the sixth point in time.

The terminal may monitor the PDCCH of a first PCell for a first tpc-PUCCH-RNTI for the PUCCH power control and monitors for a P-RNTI for paging monitoring and Short Message monitoring when the first PCell is activated.

The terminal may monitor the PDCCH of a second PCell for a second tpc-PUCCH-RNTI for PUCCH power control and monitors for the P-RNTI for Short Message monitoring when the second PCell is activated.

The first tpc-PUCCH-RNTI may be allocated in a first RRCReconfiguration.

The second tpc-PUCCH-RNTI may be allocated in a second RRCReconfiguration.

The first tpc-PUCCH-RNTI may be common for the first group of terminals. The first group of terminals may be associated with the first PCell.

The second tpc-PUCCH-RNTI may be common for a second group of terminals.

The second group of terminals may be associated with the second PCell.

The first RRCReconfiguration message may be characterized as including a CellGroupConfig with a ReconfigurationWithSync.

The second RRCReconfiguration message may be characterized as including a CellGroupConfig2 with a L2mobilityConfig.

The first PCell may be the default PCell. The second PCell may be an additional PCell.

FIG. 3A illustrates operations of terminal.

In 3A-05, the UE may receive a first RRCReconfiguration in a third cell. The first RRCReconfiguration may include a first configuration and a third configuration.

In 3A-10, the UE may receive a second RRCReconfiguration in the first cell. The second RRCReconfiguration may include a second configuration.

In 3A-15, the UE my perform a L2 mobility operation between the first cell and a second cell based on a received MAC CE and the first configuration, the second configuration, and the third configuration.

In L2 mobility operation, the UE may switch from the second cell to the first cell at the first point of time if UE receives a first MAC CE at a third point of time. The UE may activate the first BWP of the first cell. The first BWP may be indicated in the first MAC CE.

In L2 mobility operation, the UE may switche from the first cell to the second cell at the second point of time if the UE receives a second MAC CE at a third point of time. The UE may activate the second BWP of the second cell. The second BWP may be indicated in the second MAC CE.

FIG. 3B illustrates operations of base station.

In 3B-05, A GNB may transmit a first RRCReconfiguration to a UE in a third cell.

In 3B-10, The GNB may transmit a second RRCReconfiguration to a UE in a first cell.

In 3B-15, The GNB may perform with the UE L2 mobility operation between the first cell and the second cell based on a transmitted MAC CE and the first configuration, the second configuration, and the third configuration.

In L2 mobility operation, a GNB may switch the UE from the second cell to the first cell at the first point of time if the GNB transmits a first MAC CE at a third point of time. The GNB may activate the first BWP of the first cell. The first BWP may be indicated in the first MAC CE.

In L2 mobility operation, the GNB may switch the UE from the first cell to the second cell at the second point of time if the GNB transmits a second MAC CE at a third point of time. The GNB may activate the second BWP of the second cell. The second BWP may be indicated in the second MAC CE.

Figure 4A:
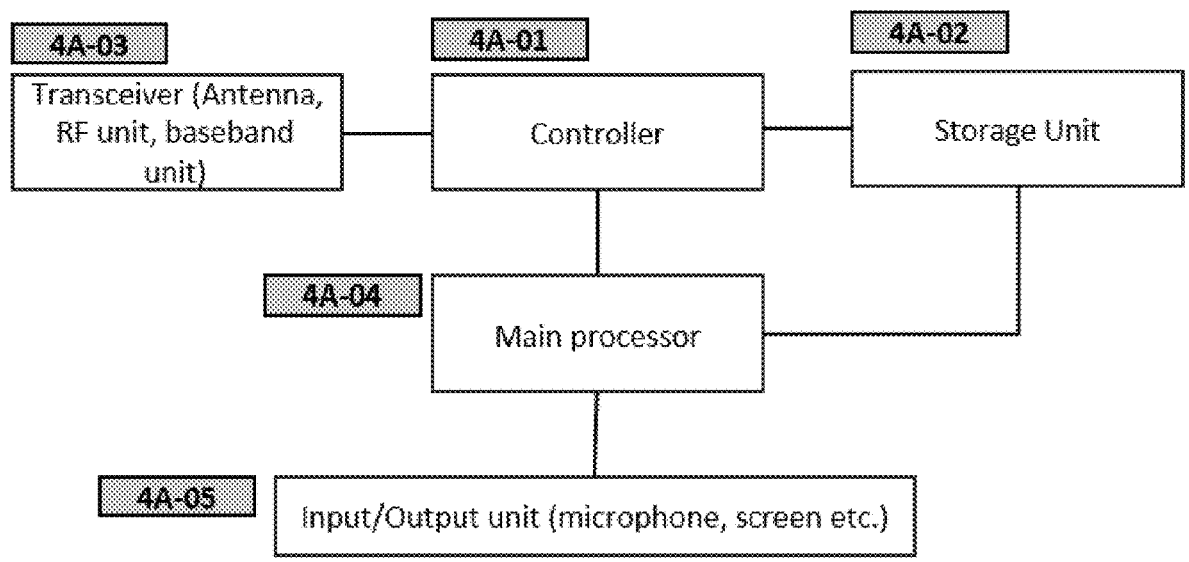
FIG. 4A is a block diagram illustrating an example internal structure of a terminal.

FIG. 4A is a block diagram illustrating the internal structure of a UE to which the disclosure is applied.

Referring to the diagram, the UE includes a controller 4A-01, a storage unit 4A-02, a transceiver 4A-03, a main processor 4A-04 and I/O unit 4A-05.

The controller 4A-01 may control the overall operations of the UE in terms of mobile communication. For example, the controller 4A-01 may receive/transmit signals through the transceiver 4A-03. In addition, the controller 4A-01 may record and read data in the storage unit 4A-02. To this end, the controller 4A-01 may include at least one processor. For example, the controller 4A-01 may include a communication processor (a CP that performs control for communication) and an application processor (an AP that controls the upper layer, such as an application program). The controller may control the storage unit and the transceiver such that the UE operations illustrated in FIG. 2A and FIG. 2b and FIG. 3A are performed.

The storage unit 4A-02 may store data for the operation of the UE, such as a basic program, an application program, and configuration information. The storage unit 4A-02 may provide the stored data at a request of the controller 4A-01.

The transceiver 4A-03 may consist of a RF processor, a baseband processor and plurality of antennas. The RF processor may perform functions for transmitting/receiving signals through a wireless channel, such as signal band conversion, amplification, and the like. Specifically, the RF processor up-converts a baseband signal provided from the baseband processor into an RF band signal, transmits the same through an antenna, and down converts an RF band signal received through the antenna into a baseband signal. The RF processor may include a transmission filter, a reception filter, an amplifier, a mi10r, an oscillator, a digital-to-analog converter (DAC), an analog-to-digital converter ((ADC), and the like. The RF processor may perform MIMO and may receive multiple layers when performing the MIMO operation. The baseband processor may perform a function of conversion between a baseband signal and a bit string according to the physical layer specification of the system. For example, during data transmission, the baseband processor may encode and modulate a transmission bit string, thereby generating complex symbols. In addition, during data reception, the baseband processor may demodulate and decode a baseband signal provided from the RF processor, thereby restoring a reception bit string.

The main processor 4A-04 may control the overall operations other than the mobile operation. The main processor 4A-04 may process the user input received from the I/O unit 4A-05, store the data in the storage unit 4A-02, control the controller 4A-01 for required mobile communication operations, and forward the user data to the I/O unit (905).

The I/O unit 4A-05 may consist of the equipment for inputting user data and for outputting user data such as a microphone and a screen. The I/O unit 4A-05 may perform the input and output of data based on the main processor's instruction.

Figure 4B:
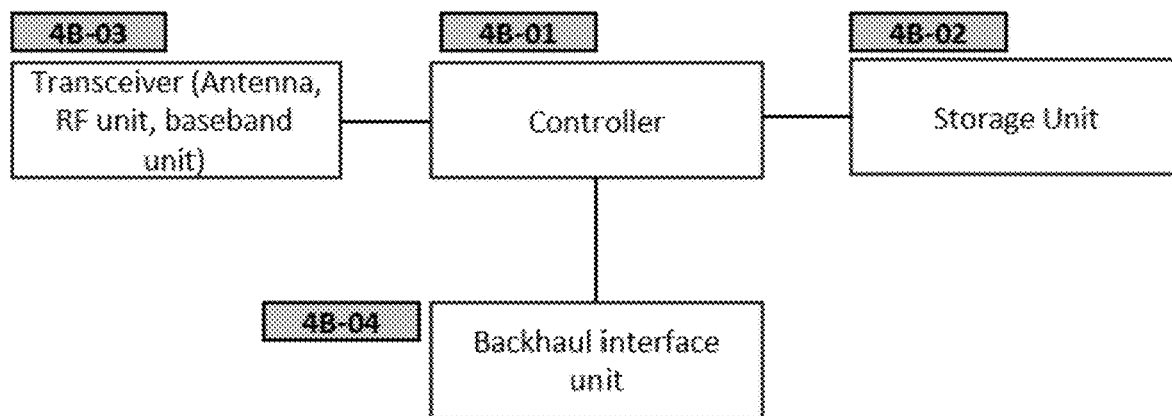
FIG. 4B is a block diagram illustrating an example configuration of a base station.

FIG. 4B is a block diagram illustrating the configuration of a base station according to the disclosure.

As illustrated in the diagram, the base station includes a controller 4B-01, a storage unit 4B-02, a transceiver 4B-03 and a backhaul interface unit 4B-04.

The controller 4B-01 may control the overall operations of the main base station. For example, the controller 4B-01 may receive/transmit the signals through the transceiver 4B-03, or through the backhaul interface unit 4B-04. In addition, the controller 4B-01 may record and read data in the storage unit 4B-02. To this end, the controller 4B-01 may include at least one processor. The controller may control the transceiver, storage unit and backhaul interface such as that base station operation illustrated in FIG. 2A and FIG. 2b are performed.

The storage unit 4B-02 may store data for operation of the main base station, such as a basic program, an application program, and configuration information. Particularly, the storage unit 4B-02 may store information regarding a bearer allocated to an accessed UE, a measurement result reported from the accessed UE, and the like. In addition, the storage unit 4B-02 may store information serving as a criterion to deter mine whether to provide the UE with multi-connection or to discontinue the same. In addition, the storage unit 4B-02 may provide stored data at the request of the controller 4B-01.

The transceiver 4B-03 may consist of a RF processor, a baseband processor and plurality of antennas. The RF processor may perform functions for the transmitting/receiving of signals through a wireless channel, such as signal band conversion, amplification, and the like. Specifically, the RF processor up—may convert a baseband signal provided from the baseband processor into an RF band signal, transmit the same through an antenna, and down-convert an RF band signal received through the antenna into a baseband signal. The RF processor may include a transmission filter, a reception filter, an amplifier, a mixer, an oscillator, a DAC, an ADC, and the like. The RF processor may perform a down link MIMO operation by transmitting at least one layer. The baseband processor may perform a function of conversion between a baseband signal and a bit string according to the physical layer specification of the first radio access technology. For example, during data transmission, the baseband processor may encode and modulate a transmission bit string, thereby generating complex symbols. In addition, during data reception, the baseband processor may demodulate and decode a baseband signal provided from the RF processor, thereby restoring a reception bit string.

The backhaul interface unit 4B-04 may provide an interface for communicating with other nodes inside the network. The backhaul interface unit 4B-04 may convert a bit string transmitted from the base station to another node—for example, another base station or a core network-into a physical signal, and convert a physical signal received from the other node into a bit string.

What is claimed is:

1. A wireless device comprising:
a wireless transceiver;
at least one processor; and
a memory storing instructions that, when executed by the at least one processor, cause the wireless device to:
  receive, from a base station, at least one Radio Resource Control (RRC) message, wherein the at least one RRC message comprises:
    first configuration information indicating a Transmission Configuration Index (TCI) state list of a first cell; and
    second configuration information indicating a TCI state list of a second cell;
  receive, from the base station and via the second cell, a first Medium Access Control (MAC) Control Element (CE), wherein the first MAC CE comprises an identifier associated with the first configuration information and associated with a first TCI state identifier, and wherein the first TCI state identifier indicates a first TCI state of the TCI state list of the first cell;
  monitor, based on the first MAC CE and based on the first TCI state, Physical Downlink Control Channel (PDCCH) associated with the first cell;
  receive, from the base station and via the first cell, a second MAC CE, wherein the second MAC CE comprises an identifier associated with the second configuration information and associated with a second TCI state identifier, and wherein the second TCI state identifier indicates a second TCI state of the TCI state list of the second cell; and
  monitor, based on the second MAC CE and based on the second TCI state, PDCCH associated with the second cell.

2. The wireless device of claim 1, wherein the instructions, when executed by the at least one processor, cause the wireless device to, while the first configuration information and the second configuration information are configured for the wireless device,
receive the first MAC CE; and
receive the second MAC CEb.

3. The wireless device of claim 1, wherein the instructions, when executed by the at least one processor, cause the wireless device to:
apply, based on the first MAC CE, at least one parameter of the first configuration information; and
apply, based on the second MAC CE, at least one parameter of the second configuration information.

4. The wireless device of claim 3, wherein the instructions, when executed by the at least one processor, cause the wireless device to:
perform, based on the applied at least one parameter of the first configuration information, wireless communication via the first cell; and
perform, based on the applied at least one parameter of the second configuration information, wireless communication via the second cell.

5. The wireless device of claim 1, wherein the first cell is associated with a first layer-2 mobility group, and wherein the second cell is associated with a second layer-2 mobility group.

6. The wireless device of claim 5, wherein the instructions, when executed by the at least one processor, cause the wireless device to, while the first configuration information and the second configuration information are configured for the wireless device,
receive the first MAC CE; and
switch, based on the first MAC CE, from the second layer-2 mobility group to the first layer-2 mobility group.

7. The wireless device of claim 6, wherein the instructions, when executed by the at least one processor, cause the wireless device to:
while the first configuration information and the second configuration information are configured for the wireless device,
receive the second MAC CE; and
switch, based on the second MAC CE, from the first layer-2 mobility group to the second layer-2 mobility group.

8. The wireless device of claim 1, wherein the instructions, when executed by the at least one processor, cause the wireless device to receive the at least one RRC message by:

receiving, from the base station, a first RRC message, wherein the first RRC message comprises the first configuration information; and receiving, from the base station, a second RRC message, wherein the second RRC message comprises the second configuration information.

9. A wireless device comprising:
a wireless transceiver;
at least one processor; and
a memory storing instructions that, when executed by the at least one processor, cause the wireless device to:
receive, from a base station, at least one Radio Resource Control (RRC) message, wherein the at least one RRC message comprises:
first configuration information associated with at least one first cell; and
second configuration information associated with at least one second cell; and
while the first configuration information and the second configuration information are configured for the wireless device:
perform, based on the second configuration information, wireless communication via at least one cell of the at least one second cell;
after performing the wireless communication via at least one cell of the at least one second cell, receive a first Medium Access Control (MAC) Control Element (CE), wherein the first MAC CE comprises an identifier associated with the first configuration information and associated with a Transmission Configuration Index (TCI) state list of the at least one first cell; and
based on the first MAC CE, perform, using at least one TCI state of the TCI state list of the at least one first cell, wireless communication via at least one cell of the at least one first cell.

10. The wireless device of claim 9, wherein:
the first configuration information indicates the TCI state list of the at least one first cell; and
the second configuration information indicates a TCI state list of the at least one second cell.

11. The wireless device of claim 9, wherein:
the identifier is associated with a first TCI state identifier; and
the first TCI state identifier indicates a first TCI state of the TCI state list of the at least one first cell.

12. The wireless device of claim 9, wherein the instructions, when executed by the at least one processor, cause the wireless device to:
while the first configuration information and the second configuration information are configured for the wireless device, and after performing the wireless communication via at least one cell of the at least one first cell, receive a second MAC CE, wherein the second MAC CE comprises an identifier associated with the second configuration information and associated with a TCI state list of the at least one second cell; and
based on the second MAC CE, perform, using at least one TCI state of the TCI state list of the at least one second cell, wireless communication via at least one cell of the at least one second cell.

13. The wireless device of claim 12, wherein:
the identifier associated with the second configuration information is associated with a second TCI state identifier; and
the second TCI state identifier indicates a second TCI state of the TCI state list of the at least one second cell.

14. The wireless device of claim 9, wherein the at least one first cell is associated with a first layer-2 mobility group, and wherein the at least one second cell is associated with a second layer-2 mobility group.

15. The wireless device of claim 14, wherein the instructions, when executed by the at least one processor, cause the wireless device to:
while the first configuration information and the second configuration information are configured for the wireless device, switch, based on the first MAC CE, from the second layer-2 mobility group to the first layer-2 mobility group.

16. The wireless device of claim 15, wherein the instructions, when executed by the at least one processor, cause the wireless device to:
while the first configuration information and the second configuration information are configured for the wireless device, switch, based on a second MAC CE, from the first layer-2 mobility group to the second layer-2 mobility group, and
wherein the second MAC CE comprises an identifier associated with the second configuration information and associated with a TCI state list of the at least one second cell.

17. The wireless device of claim 9, wherein the instructions, when executed by the at least one processor, cause the wireless device to receive the at least one RRC message by:
receiving, from the base station, a first RRC message, wherein the first RRC message comprises the first configuration information; and
receiving, from the base station, a second RRC message, wherein the second RRC message comprises the second configuration information.

* * * * *